(12) United States Patent
Gandhi et al.

(10) Patent No.: US 7,876,489 B2
(45) Date of Patent: Jan. 25, 2011

(54) DISPLAY APPARATUS WITH OPTICAL CAVITIES

(75) Inventors: Jignesh Gandhi, Burlington, MA (US); Nesbitt W. Hagood, Wellesley, MA (US); Roger W. Barton, Andover, MA (US)

(73) Assignee: Pixtronix, Inc., Andover, MA (US)

( * ) Notice: Subject to any disclaimer, the term of this patent is extended or adjusted under 35 U.S.C. 154(b) by 957 days.

(21) Appl. No.: 11/528,191

(22) Filed: Sep. 26, 2006

(65) Prior Publication Data

US 2007/0279727 A1 Dec. 6, 2007

Related U.S. Application Data

(60) Provisional application No. 60/811,054, filed on Jun. 5, 2006, provisional application No. 60/840,249, filed on Aug. 25, 2006.

(51) Int. Cl.
*G02F 1/03* (2006.01)

(52) U.S. Cl. ......................... 359/242; 359/290

(58) Field of Classification Search ................. 359/290, 359/291, 223, 224, 230, 233
See application file for complete search history.

(56) References Cited

U.S. PATENT DOCUMENTS

| | | | |
|---|---|---|---|
| 4,067,043 A | 1/1978 | Perry | |
| 4,074,253 A | 2/1978 | Nadir | |
| 4,559,535 A | 12/1985 | Watkins et al. | |
| 4,564,836 A | 1/1986 | Vuilleumier et al. | |
| 4,582,396 A | 4/1986 | Bos et al. | |
| 4,673,253 A | 6/1987 | Tanabe et al. | |
| 4,744,640 A | 5/1988 | Phillips | |
| 4,958,911 A | 9/1990 | Beiswenger et al. | |
| 4,991,941 A | 2/1991 | Kalmanash | |
| 5,005,108 A | 4/1991 | Pristash et al. | |
| 5,042,900 A | 8/1991 | Parker | |
| 5,050,946 A | 9/1991 | Hathaway et al. | |
| 5,061,049 A | 10/1991 | Hornbeck | |
| 5,062,689 A | 11/1991 | Koehler | |
| 5,093,652 A | 3/1992 | Bull et al. | |
| 5,096,279 A | 3/1992 | Hornbeck et al. | |
| 5,128,787 A | 7/1992 | Blonder | |
| 5,136,480 A | 8/1992 | Pristash et al. | |
| 5,136,751 A | 8/1992 | Coyne et al. | |
| 5,142,405 A | 8/1992 | Hornbeck | |

(Continued)

FOREIGN PATENT DOCUMENTS

| | | |
|---|---|---|
| EP | 0 359 450 B1 | 11/1994 |
| EP | 0 495 273 B1 | 9/1996 |
| EP | 0 415 625 B1 | 1/1997 |
| EP | 0 884 525 A2 | 12/1998 |
| EP | 0 751 340 B1 | 5/2000 |

(Continued)

OTHER PUBLICATIONS

U.S. Appl. No. 11/973,187, Unpublished, Kim et al.
U.S. Appl. No. 11/975,397, Unpublished, Hagood et al.
U.S. Appl. No. 11/975,411, Unpublished, Hagood et al.
U.S. Appl. No. 11/975,622, Unpublished, Fijol et al.
U.S. Appl. No. 11/975,398, Unpublished, Hagood et al.

(Continued)

*Primary Examiner*—Timothy J Thompson
(74) *Attorney, Agent, or Firm*—Ropes & Gray LLP

(57) ABSTRACT

A display includes an array of light modulators that define a display plane, a light guide and front- and rear-facing reflective surfaces. The light guide includes a plurality of geometric light redirectors, and at least 50% of the light guide's rear surface is parallel to the display plane. The rear-facing reflective surface is parallel to the display plane and includes a plurality of apertures.

57 Claims, 32 Drawing Sheets

U.S. PATENT DOCUMENTS

| | | |
|---|---|---|
| 5,198,730 A | 3/1993 | Vancil |
| 5,202,950 A | 4/1993 | Arego et al. |
| 5,233,385 A | 8/1993 | Sampsell |
| 5,233,459 A | 8/1993 | Bozler et al. |
| 5,278,652 A | 1/1994 | Urbanus et al. |
| 5,280,277 A | 1/1994 | Hornbeck |
| 5,319,491 A | 6/1994 | Selbrede |
| 5,339,116 A | 8/1994 | Urbanus et al. |
| 5,339,179 A | 8/1994 | Rudisill et al. |
| 5,359,345 A | 10/1994 | Hunter |
| 5,396,350 A | 3/1995 | Beeson et al. |
| 5,416,631 A | 5/1995 | Yagi |
| 5,440,197 A | 8/1995 | Gleckman |
| 5,452,024 A | 9/1995 | Sampsell |
| 5,461,411 A | 10/1995 | Florence et al. |
| 5,465,175 A | 11/1995 | Woodgate et al. |
| 5,467,104 A | 11/1995 | Furness, III et al. |
| 5,477,086 A | 12/1995 | Rostoker et al. |
| 5,479,279 A | 12/1995 | Barbier et al. |
| 5,493,439 A | 2/1996 | Engle |
| 5,497,172 A | 3/1996 | Doherty |
| 5,504,389 A | 4/1996 | Dickey |
| 5,510,824 A | 4/1996 | Nelson |
| 5,519,565 A | 5/1996 | Kalt et al. |
| 5,523,803 A | 6/1996 | Urbanus et al. |
| 5,526,051 A | 6/1996 | Gove et al. |
| 5,528,262 A | 6/1996 | McDowall et al. |
| 5,548,301 A | 8/1996 | Kornher et al. |
| 5,559,389 A | 9/1996 | Spindt et al. |
| 5,568,964 A | 10/1996 | Parker et al. |
| 5,578,185 A | 11/1996 | Bergeron et al. |
| 5,579,035 A | 11/1996 | Beiswenger |
| 5,579,240 A | 11/1996 | Buus |
| 5,596,339 A | 1/1997 | Furness, III et al. |
| 5,613,751 A | 3/1997 | Parker et al. |
| 5,618,096 A | 4/1997 | Parker et al. |
| 5,619,266 A | 4/1997 | Tomita et al. |
| 5,655,832 A | 8/1997 | Pelka et al. |
| 5,659,327 A | 8/1997 | Furness, III et al. |
| 5,666,226 A | 9/1997 | Ezra et al. |
| 5,684,354 A | 11/1997 | Gleckman |
| 5,724,062 A | 3/1998 | Hunter |
| 5,731,802 A | 3/1998 | Aras et al. |
| 5,745,193 A | 4/1998 | Urbanus et al. |
| 5,745,203 A | 4/1998 | Valliath et al. |
| 5,771,321 A | 6/1998 | Stern |
| 5,781,331 A | 7/1998 | Carr et al. |
| 5,784,189 A | 7/1998 | Bozler et al. |
| 5,794,761 A | 8/1998 | Renaud et al. |
| 5,801,792 A | 9/1998 | Smith et al. |
| 5,835,255 A | 11/1998 | Miles |
| 5,835,256 A | 11/1998 | Huibers |
| 5,854,872 A | 12/1998 | Tai |
| 5,867,302 A | 2/1999 | Fleming |
| 5,876,107 A | 3/1999 | Parker et al. |
| 5,884,872 A | 3/1999 | Greenhalgh |
| 5,889,625 A | 3/1999 | Chen et al. |
| 5,894,686 A | 4/1999 | Parker et al. |
| 5,895,115 A | 4/1999 | Parker et al. |
| 5,921,652 A | 7/1999 | Parker et al. |
| 5,936,596 A | 8/1999 | Yoshida et al. |
| 5,953,469 A | 9/1999 | Zhou |
| 5,975,711 A | 11/1999 | Parker et al. |
| 5,986,628 A | 11/1999 | Tuenge et al. |
| 5,986,796 A | 11/1999 | Miles |
| 5,990,990 A | 11/1999 | Crabtree |
| 6,008,781 A | 12/1999 | Furness, III et al. |
| 6,008,929 A | 12/1999 | Akimototo et al. |
| 6,028,656 A | 2/2000 | Buhrer et al. |
| 6,030,089 A | 2/2000 | Parker et al. |
| 6,034,807 A | 3/2000 | Little et al. |
| 6,040,796 A | 3/2000 | Matsugatani et al. |
| 6,040,937 A | 3/2000 | Miles |
| 6,046,840 A | 4/2000 | Huibers |
| 6,055,090 A | 4/2000 | Miles |
| 6,079,838 A | 6/2000 | Parker et al. |
| 6,154,586 A | 11/2000 | MacDonald et al. |
| 6,158,867 A | 12/2000 | Parker et al. |
| 6,162,657 A | 12/2000 | Schiele et al. |
| 6,168,395 B1 | 1/2001 | Quenzer et al. |
| 6,172,657 B1 | 1/2001 | Kamakura et al. |
| 6,172,797 B1 | 1/2001 | Huibers |
| 6,174,064 B1 | 1/2001 | Kalantar et al. |
| 6,195,196 B1 | 2/2001 | Kimura et al. |
| 6,201,633 B1 | 3/2001 | Peeters et al. |
| 6,201,664 B1 | 3/2001 | Le et al. |
| 6,206,550 B1 | 3/2001 | Fukushima et al. |
| 6,219,119 B1 | 4/2001 | Nakai |
| 6,249,269 B1 | 6/2001 | Blalock et al. |
| 6,249,370 B1 | 6/2001 | Takeuchi et al. |
| 6,266,240 B1 | 7/2001 | Urban et al. |
| 6,282,951 B1 | 9/2001 | Loga et al. |
| 6,285,270 B1 | 9/2001 | Lane et al. |
| 6,288,824 B1 | 9/2001 | Kastalsky |
| 6,296,383 B1 | 10/2001 | Henningsen |
| 6,300,154 B2 | 10/2001 | Clark et al. |
| 6,317,103 B1 | 11/2001 | Furness, III et al. |
| 6,323,834 B1 | 11/2001 | Colgan et al. |
| 6,329,967 B1 | 12/2001 | Little et al. |
| 6,367,940 B1 | 4/2002 | Parker et al. |
| 6,379,016 B1 * | 4/2002 | Boyd et al. ................. 362/625 |
| 6,388,661 B1 | 5/2002 | Richards |
| 6,402,335 B1 | 6/2002 | Kalantar et al. |
| 6,404,942 B1 | 6/2002 | Edwards et al. |
| 6,424,329 B1 | 7/2002 | Okita |
| 6,429,625 B1 | 8/2002 | LeFevre et al. |
| 6,471,879 B2 | 10/2002 | Hanson et al. |
| 6,473,220 B1 | 10/2002 | Clikeman et al. |
| 6,476,886 B2 | 11/2002 | Krusius et al. |
| 6,483,613 B1 | 11/2002 | Woodgate et al. |
| 6,498,685 B1 | 12/2002 | Johnson |
| 6,504,985 B2 | 1/2003 | Parker et al. |
| 6,507,138 B1 | 1/2003 | Rodgers et al. |
| 6,508,563 B2 | 1/2003 | Parker et al. |
| 6,523,961 B2 | 2/2003 | Ilkov et al. |
| 6,529,265 B1 | 3/2003 | Henningsen |
| 6,531,947 B1 | 3/2003 | Weaver et al. |
| 6,535,256 B1 | 3/2003 | Ishihara et al. |
| 6,535,311 B1 | 3/2003 | Lindquist |
| 6,556,258 B1 | 4/2003 | Yoshida et al. |
| 6,556,261 B1 | 4/2003 | Krusius et al. |
| 6,559,827 B1 | 5/2003 | Mangerson |
| 6,567,063 B1 | 5/2003 | Okita |
| 6,567,138 B1 | 5/2003 | Krusius et al. |
| 6,574,033 B1 | 6/2003 | Chui et al. |
| 6,576,887 B2 | 6/2003 | Whitney et al. |
| 6,582,095 B1 | 6/2003 | Toyoda |
| 6,583,915 B1 | 6/2003 | Hong et al. |
| 6,589,625 B1 | 7/2003 | Kothari et al. |
| 6,591,049 B2 | 7/2003 | Dohnishi |
| 6,593,677 B2 | 7/2003 | Behin et al. |
| 6,600,474 B1 | 7/2003 | Heines et al. |
| 6,633,301 B1 | 10/2003 | Dallas et al. |
| 6,639,570 B2 | 10/2003 | Furness, III et al. |
| 6,639,572 B1 | 10/2003 | Little et al. |
| 6,650,455 B2 | 11/2003 | Miles |
| 6,650,822 B1 | 11/2003 | Zhou |
| 6,671,078 B2 | 12/2003 | Flanders et al. |
| 6,674,562 B1 | 1/2004 | Miles |
| 6,677,709 B1 | 1/2004 | Ma et al. |
| 6,678,021 B2 * | 1/2004 | Ohkawa ..................... 349/65 |
| 6,867,896 B2 | 1/2004 | Miles |
| 6,687,896 B1 | 2/2004 | Royce et al. |
| 6,690,422 B1 | 2/2004 | Daly et al. |

| | | | | | | |
|---|---|---|---|---|---|---|
| 6,701,039 B2 | 3/2004 | Bourgeois et al. | 7,050,141 B2 | 5/2006 | Yokoue et al. | |
| 6,707,176 B1 | 3/2004 | Rodgers | 7,050,219 B2 | 5/2006 | Kimura | |
| 6,710,538 B1 | 3/2004 | Ahn et al. | 7,057,790 B2 | 6/2006 | Selbrede | |
| 6,710,908 B2 | 3/2004 | Miles et al. | 7,060,895 B2 | 6/2006 | Kothari et al. | |
| 6,710,920 B1 | 3/2004 | Mashitani et al. | 7,071,611 B2 | 7/2006 | Yonekubo et al. | |
| 6,712,481 B2 | 3/2004 | Parker et al. | 7,110,158 B2 | 9/2006 | Miles | |
| 6,731,355 B2 | 5/2004 | Miyashita | 7,116,464 B2 | 10/2006 | Osawa et al. | |
| 6,731,492 B2 | 5/2004 | Goodwin-Johansson | 7,123,216 B1 | 10/2006 | Miles | |
| 6,733,354 B1 | 5/2004 | Cathey et al. | 7,123,796 B2 | 10/2006 | Steckl et al. | |
| 6,738,177 B1 | 5/2004 | Gutierrez et al. | 7,126,738 B2 | 10/2006 | Miles | |
| 6,741,377 B2 | 5/2004 | Miles | 7,161,094 B2 | 1/2007 | Kothari et al. | |
| 6,749,312 B2 | 6/2004 | Parker et al. | 7,164,250 B2 | 1/2007 | Boscolo et al. | |
| 6,750,930 B2 | 6/2004 | Yoshii et al. | 7,184,202 B2 | 2/2007 | Miles et al. | |
| 6,752,505 B2 | 6/2004 | Parker et al. | 7,198,982 B2 | 4/2007 | Patel et al. | |
| 6,755,547 B2 | 6/2004 | Parker | 7,227,677 B2 | 6/2007 | Ravnkilde et al. | |
| 6,762,743 B2 | 7/2004 | Yoshihara et al. | 7,271,945 B2 * | 9/2007 | Hagood et al. | 359/292 |
| 6,762,868 B2 | 7/2004 | Liu et al. | 7,304,785 B2 | 12/2007 | Hagood et al. | |
| 6,764,796 B2 | 7/2004 | Fries | 7,304,786 B2 | 12/2007 | Hagood et al. | |
| 6,774,964 B2 | 8/2004 | Funamoto et al. | 7,619,806 B2 * | 11/2009 | Hagood et al. | 359/290 |
| 6,775,048 B1 | 8/2004 | Starkweather et al. | 2001/0001260 A1 | 5/2001 | Parker et al. | |
| 6,785,454 B2 | 8/2004 | Abe | 2001/0028993 A1 | 10/2001 | Sanford | |
| 6,787,969 B2 | 9/2004 | Grade et al. | 2001/0040538 A1 | 11/2001 | Quanrud | |
| 6,788,371 B2 | 9/2004 | Tanada et al. | 2001/0043208 A1 | 11/2001 | Furness, III et al. | |
| 6,794,119 B2 | 9/2004 | Miles | 2001/0053075 A1 | 12/2001 | Parker et al. | |
| 6,795,064 B2 | 9/2004 | Walker et al. | 2002/0001051 A1 | 1/2002 | Krusius et al. | |
| 6,796,668 B2 | 9/2004 | Parker et al. | 2002/0009275 A1 | 1/2002 | Williams et al. | |
| 6,798,935 B2 | 9/2004 | Bourgeois et al. | 2002/0015215 A1 | 2/2002 | Miles | |
| 6,809,851 B1 | 10/2004 | Gurcan | 2002/0024641 A1 | 2/2002 | Ilkov et al. | |
| 6,819,465 B2 | 11/2004 | Clikeman et al. | 2002/0024711 A1 | 2/2002 | Miles | |
| 6,825,470 B1 | 11/2004 | Bawolek et al. | 2002/0047172 A1 | 4/2002 | Reid | |
| 6,827,456 B2 | 12/2004 | Parker et al. | 2002/0054424 A1 | 5/2002 | Miles | |
| 6,831,678 B1 | 12/2004 | Travis | 2002/0054487 A1 | 5/2002 | Parker et al. | |
| 6,835,111 B2 | 12/2004 | Ahn et al. | 2002/0054488 A1 | 5/2002 | Ohkawa | |
| 6,846,082 B2 | 1/2005 | Glent-Madsen et al. | 2002/0056900 A1 | 5/2002 | Liu et al. | |
| 6,847,425 B2 | 1/2005 | Tanada et al. | 2002/0063661 A1 | 5/2002 | Comiskey et al. | |
| 6,857,751 B2 | 2/2005 | Penn et al. | 2002/0070931 A1 | 6/2002 | Ishikawa | |
| 6,863,219 B1 | 3/2005 | Jacobsen et al. | 2002/0075555 A1 | 6/2002 | Miles | |
| 6,864,618 B2 | 3/2005 | Miller et al. | 2002/0080598 A1 | 6/2002 | Parker et al. | |
| 6,873,311 B2 | 3/2005 | Yoshihara et al. | 2002/0126364 A1 | 9/2002 | Miles | |
| 6,879,307 B1 | 4/2005 | Stern | 2002/0126387 A1 | 9/2002 | Ishikawa et al. | |
| 6,886,956 B2 | 5/2005 | Parker et al. | 2002/0132389 A1 | 9/2002 | Patel et al. | |
| 6,887,202 B2 | 5/2005 | Currie et al. | 2002/0141174 A1 | 10/2002 | Parker et al. | |
| 6,888,678 B2 | 5/2005 | Nishiyama et al. | 2002/0149828 A1 | 10/2002 | Miles et al. | |
| 6,889,565 B2 | 5/2005 | DeConde et al. | 2002/0163482 A1 | 11/2002 | Sullivan | |
| 6,897,164 B2 | 5/2005 | Baude et al. | 2002/0163484 A1 | 11/2002 | Furness, III et al. | |
| 6,900,072 B2 | 5/2005 | Patel et al. | 2002/0171327 A1 | 11/2002 | Miller et al. | |
| 6,906,847 B2 | 6/2005 | Huibers et al. | 2002/0185699 A1 | 12/2002 | Reid | |
| 6,908,204 B2 * | 6/2005 | Kraft ... 362/628 | 2002/0196522 A1 | 12/2002 | Little et al. | |
| 6,911,891 B2 | 6/2005 | Qiu et al. | 2003/0007344 A1 | 1/2003 | Parker | |
| 6,911,964 B2 | 6/2005 | Lee et al. | 2003/0009898 A1 | 1/2003 | Slocum et al. | |
| 6,919,981 B2 | 7/2005 | Clikeman et al. | 2003/0029705 A1 | 2/2003 | Qiu et al. | |
| 6,934,080 B2 | 8/2005 | Saccomanno et al. | 2003/0036215 A1 | 2/2003 | Reid | |
| 6,936,968 B2 | 8/2005 | Cross et al. | 2003/0043157 A1 | 3/2003 | Miles | |
| 6,939,013 B2 | 9/2005 | Asao | 2003/0048036 A1 | 3/2003 | Lemkin | |
| 6,940,631 B2 | 9/2005 | Ishikawa | 2003/0058543 A1 | 3/2003 | Sheedy et al. | |
| 6,947,107 B2 | 9/2005 | Yoshii et al. | 2003/0063233 A1 | 4/2003 | Takagi | |
| 6,953,375 B2 | 10/2005 | Ahn et al. | 2003/0063234 A1 | 4/2003 | Oda et al. | |
| 6,961,167 B2 | 11/2005 | Prins et al. | 2003/0076649 A1 | 4/2003 | Speakman | |
| 6,962,419 B2 | 11/2005 | Huibers | 2003/0081402 A1 | 5/2003 | Jeon et al. | |
| 6,965,375 B1 | 11/2005 | Gettemy et al. | 2003/0085650 A1 | 5/2003 | Cathey et al. | |
| 6,967,698 B2 | 11/2005 | Tanoue et al. | 2003/0085867 A1 | 5/2003 | Grabert | |
| 6,969,635 B2 | 11/2005 | Patel et al. | 2003/0095081 A1 | 5/2003 | Furness, III et al. | |
| 6,970,227 B2 | 11/2005 | Kida et al. | 2003/0095398 A1 | 5/2003 | Parker et al. | |
| 7,004,610 B2 | 2/2006 | Yamashita et al. | 2003/0102810 A1 | 6/2003 | Cross et al. | |
| 7,004,611 B2 | 2/2006 | Parker et al. | 2003/0123245 A1 | 7/2003 | Parker et al. | |
| 7,012,726 B1 | 3/2006 | Miles | 2003/0123246 A1 | 7/2003 | Parker | |
| 7,012,732 B2 | 3/2006 | Miles | 2003/0123247 A1 | 7/2003 | Parker et al. | |
| 7,014,349 B2 | 3/2006 | Shinohara et al. | 2003/0133284 A1 | 7/2003 | Chipchase et al. | |
| 7,042,618 B2 | 5/2006 | Selbrede et al. | 2003/0137499 A1 | 7/2003 | Iisaka | |
| 7,042,643 B2 | 5/2006 | Miles | 2003/0152872 A1 | 8/2003 | Miles | |
| 7,046,221 B1 | 5/2006 | Malzbender | 2003/0174422 A1 | 9/2003 | Miller et al. | |
| 7,046,905 B1 | 5/2006 | Gardiner et al. | 2003/0174931 A1 | 9/2003 | Rodgers et al. | |
| 7,050,035 B2 | 5/2006 | Iisaka et al. | 2003/0183008 A1 | 10/2003 | Bang et al. | |

| | | | | | | |
|---|---|---|---|---|---|---|
| 2003/0184189 A1 | 10/2003 | Sinclair | | 2005/0195467 A1 | 9/2005 | Kothari et al. |
| 2003/0190535 A1 | 10/2003 | Fries | | 2005/0195468 A1 | 9/2005 | Sampsell |
| 2003/0190536 A1 | 10/2003 | Fries | | 2005/0206991 A1 | 9/2005 | Chui et al. |
| 2003/0202338 A1 | 10/2003 | Parker | | 2005/0207154 A1 | 9/2005 | Parker |
| 2003/0231160 A1 | 12/2003 | Yoshihara et al. | | 2005/0207178 A1 | 9/2005 | Parker |
| 2004/0012946 A1 | 1/2004 | Parker et al. | | 2005/0212738 A1 | 9/2005 | Gally |
| 2004/0027636 A1 | 2/2004 | Miles | | 2005/0213183 A9 | 9/2005 | Miles |
| 2004/0051929 A1 | 3/2004 | Sampsell et al. | | 2005/0213322 A1 | 9/2005 | Parker |
| 2004/0058532 A1 | 3/2004 | Miles et al. | | 2005/0213323 A1 | 9/2005 | Parker |
| 2004/0080240 A1 | 4/2004 | Miller et al. | | 2005/0213349 A1 | 9/2005 | Parker |
| 2004/0080484 A1 | 4/2004 | Heines et al. | | 2005/0219679 A1 | 10/2005 | Ishikawa |
| 2004/0080927 A1 | 4/2004 | Parker et al. | | 2005/0219680 A1 | 10/2005 | Ishikawa |
| 2004/0085749 A1 | 5/2004 | Parker et al. | | 2005/0225501 A1 | 10/2005 | Srinivasan et al. |
| 2004/0090144 A1 | 5/2004 | Miller et al. | | 2005/0225519 A1 | 10/2005 | Naugler, Jr. |
| 2004/0095739 A1 | 5/2004 | Parker et al. | | 2005/0225732 A1 | 10/2005 | Conner et al. |
| 2004/0100677 A1 | 5/2004 | Huibers et al. | | 2005/0225827 A1 | 10/2005 | Kastalsky |
| 2004/0114346 A1 | 6/2004 | Parker et al. | | 2005/0237596 A1 | 10/2005 | Selbrede |
| 2004/0122328 A1 | 6/2004 | Wang et al. | | 2005/0242710 A1 | 11/2005 | Yamazaki et al. |
| 2004/0125346 A1 | 7/2004 | Huibers | | 2005/0243023 A1 | 11/2005 | Reddy et al. |
| 2004/0135273 A1 | 7/2004 | Parker et al. | | 2005/0244099 A1 | 11/2005 | Pasch et al. |
| 2004/0135951 A1 | 7/2004 | Stumbo et al. | | 2005/0244949 A1 | 11/2005 | Miles |
| 2004/0136204 A1 | 7/2004 | Asao | | 2005/0245313 A1 | 11/2005 | Yoshino et al. |
| 2004/0145580 A1 | 7/2004 | Perlman | | 2005/0247477 A1 | 11/2005 | Kothari et al. |
| 2004/0157664 A1 | 8/2004 | Link | | 2005/0249966 A1 | 11/2005 | Tung et al. |
| 2004/0165372 A1 | 8/2004 | Parker | | 2005/0253779 A1 | 11/2005 | Feenstra et al. |
| 2004/0171206 A1 | 9/2004 | Rodgers | | 2005/0254115 A1 | 11/2005 | Palmateer et al. |
| 2004/0179146 A1 | 9/2004 | Nilsson | | 2005/0258571 A1 | 11/2005 | Dumond et al. |
| 2004/0196215 A1 | 10/2004 | Duthaler et al. | | 2005/0259198 A1 | 11/2005 | Lubart et al. |
| 2004/0196646 A1 | 10/2004 | Machi et al. | | 2005/0265029 A1 | 12/2005 | Epstein et al. |
| 2004/0207768 A1 | 10/2004 | Liu | | 2005/0281052 A1 | 12/2005 | Teng et al. |
| 2004/0218149 A1 | 11/2004 | Huibers | | 2005/0285816 A1 | 12/2005 | Glass |
| 2004/0218154 A1 | 11/2004 | Huibers | | 2005/0286113 A1 | 12/2005 | Miles |
| 2004/0218292 A1 | 11/2004 | Huibers | | 2005/0286114 A1 | 12/2005 | Miles |
| 2004/0218293 A1 | 11/2004 | Huibers | | 2006/0001942 A1 | 1/2006 | Chui et al. |
| 2004/0223088 A1 | 11/2004 | Huibers | | 2006/0028708 A1 | 2/2006 | Miles |
| 2004/0223240 A1 | 11/2004 | Huibers | | 2006/0028817 A1 | 2/2006 | Parker |
| 2004/0227428 A1 | 11/2004 | Sinclair | | 2006/0028840 A1 | 2/2006 | Parker |
| 2004/0233392 A1 | 11/2004 | Huibers | | 2006/0028841 A1 | 2/2006 | Parker |
| 2004/0240032 A1 | 12/2004 | Miles | | 2006/0028843 A1 | 2/2006 | Parker |
| 2004/0246275 A1 | 12/2004 | Yoshihara et al. | | 2006/0028844 A1 | 2/2006 | Parker |
| 2004/0263502 A1 | 12/2004 | Dallas et al. | | 2006/0033975 A1 | 2/2006 | Miles |
| 2004/0263944 A1 | 12/2004 | Miles et al. | | 2006/0044246 A1 | 3/2006 | Mignard |
| 2005/0002082 A1 | 1/2005 | Miles | | 2006/0044298 A1 | 3/2006 | Mignard et al. |
| 2005/0002086 A1 | 1/2005 | Starkweather et al. | | 2006/0044928 A1 | 3/2006 | Chui et al. |
| 2005/0007759 A1 | 1/2005 | Parker | | 2006/0061559 A1 | 3/2006 | King |
| 2005/0024849 A1 | 2/2005 | Parker et al. | | 2006/0066934 A1 | 3/2006 | Selbrede |
| 2005/0031412 A1 | 2/2005 | Loader | | 2006/0066937 A1 | 3/2006 | Chui |
| 2005/0059184 A1 | 3/2005 | Sniegowski et al. | | 2006/0077125 A1 | 4/2006 | Floyd |
| 2005/0062708 A1 | 3/2005 | Yoshihara et al. | | 2006/0077153 A1 | 4/2006 | Cummings et al. |
| 2005/0063037 A1 | 3/2005 | Selebrede et al. | | 2006/0077533 A1 | 4/2006 | Miles et al. |
| 2005/0072032 A1 | 4/2005 | McCollum et al. | | 2006/0092490 A1 | 5/2006 | McCollum et al. |
| 2005/0073471 A1 | 4/2005 | Selbrede | | 2006/0132383 A1 | 6/2006 | Gally et al. |
| 2005/0088404 A1 | 4/2005 | Heines et al. | | 2006/0132404 A1 | 6/2006 | Hayes et al. |
| 2005/0093465 A1 | 5/2005 | Yonekubo et al. | | 2006/0139734 A1 | 6/2006 | Selebrede et al. |
| 2005/0094240 A1 | 5/2005 | Huibers et al. | | 2006/0146389 A1 | 7/2006 | Selbrede |
| 2005/0094418 A1 | 5/2005 | Parker | | 2006/0172745 A1 | 8/2006 | Knowles |
| 2005/0104804 A1 | 5/2005 | Feenstra et al. | | 2006/0187190 A1 | 8/2006 | Hagood et al. |
| 2005/0111238 A1 | 5/2005 | Parker | | 2006/0187191 A1 | 8/2006 | Hagood et al. |
| 2005/0111241 A1 | 5/2005 | Parker | | 2006/0187528 A1 | 8/2006 | Hagood et al. |
| 2005/0116798 A1 | 6/2005 | Bintoro et al. | | 2006/0238443 A1 | 10/2006 | Derichs |
| 2005/0122560 A1 | 6/2005 | Sampsell et al. | | 2006/0250325 A1 | 11/2006 | Hagood et al. |
| 2005/0122591 A1 | 6/2005 | Parker et al. | | 2006/0250676 A1 | 11/2006 | Hagood |
| 2005/0123243 A1 | 6/2005 | Steckl et al. | | 2006/0256039 A1 | 11/2006 | Hagood et al. |
| 2005/0128370 A1 | 6/2005 | Moon | | 2006/0262060 A1 | 11/2006 | Amundson |
| 2005/0134805 A1 | 6/2005 | Conner et al. | | 2006/0262380 A1 | 11/2006 | Miles |
| 2005/0141076 A1 | 6/2005 | Bausenwein et al. | | 2006/0268386 A1 | 11/2006 | Selebrede et al. |
| 2005/0151940 A1 | 7/2005 | Asao | | 2006/0270179 A1 | 11/2006 | Yang |
| 2005/0157365 A1 | 7/2005 | Ravnkilde et al. | | 2006/0291034 A1 | 12/2006 | Patry et al. |
| 2005/0157376 A1 | 7/2005 | Huibers et al. | | 2007/0002156 A1 | 1/2007 | Hagood et al. |
| 2005/0168431 A1 | 8/2005 | Chui | | 2007/0002413 A1 | 1/2007 | Psaltis et al. |
| 2005/0168789 A1 | 8/2005 | Glent-Madsen | | 2007/0030555 A1 | 2/2007 | Barton |
| 2005/0171408 A1 | 8/2005 | Parker | | 2007/0031097 A1 | 2/2007 | Heikenfeld et al. |
| 2005/0179977 A1 | 8/2005 | Chui et al. | | 2007/0035808 A1 | 2/2007 | Amundson et al. |

| | | | |
|---|---|---|---|
| 2007/0040982 | A1 | 2/2007 | Nakano et al. |
| 2007/0047051 | A1 | 3/2007 | Selbrede et al. |
| 2007/0047887 | A1 | 3/2007 | Selbrede |
| 2007/0052660 | A1 | 3/2007 | Montbach et al. |
| 2007/0053652 | A1 | 3/2007 | Mignard et al. |
| 2007/0086078 | A1 | 4/2007 | Hagood |
| 2007/0091011 | A1 | 4/2007 | Selbrede |
| 2007/0091038 | A1 | 4/2007 | Hagood et al. |
| 2007/0150813 | A1 | 6/2007 | Selebrede et al. |
| 2007/0159679 | A1 | 7/2007 | Hagood et al. |
| 2007/0172171 | A1 | 7/2007 | Van Ostrand et al. |
| 2007/0195026 | A1 | 8/2007 | Hagood et al. |
| 2007/0205969 | A1 | 9/2007 | Hagood et al. |
| 2007/0216987 | A1 | 9/2007 | Hagood et al. |
| 2007/0223080 | A1 | 9/2007 | Hagood |

FOREIGN PATENT DOCUMENTS

| | | |
|---|---|---|
| EP | 1 091 342 | 4/2001 |
| EP | 1 202 096 A2 | 5/2002 |
| EP | 1329664 | 7/2003 |
| EP | 1 426 190 A1 | 6/2004 |
| EP | 1 533 853 A2 | 5/2005 |
| EP | 1674893 A1 | 6/2006 |
| EP | 1757958 A1 | 2/2007 |
| FR | 2 726 135 | 10/1994 |
| JP | 03-142409 | 6/1991 |
| JP | 04-249203 | 9/1992 |
| JP | 09-198906 | 7/1997 |
| JP | 11-015393 | 1/1999 |
| JP | 2002-318564 A | 10/2002 |
| JP | 2003-162904 | 6/2003 |
| JP | 2003-208810 * | 7/2003 |
| WO | WO 94/01716 | 1/1994 |
| WO | WO 98/04950 | 2/1998 |
| WO | WO-98/55798 | 12/1998 |
| WO | WO 99/01696 | 1/1999 |
| WO | WO 00/50807 | 8/2000 |
| WO | WO 03/008860 A1 | 1/2003 |
| WO | WO 03/050448 A1 | 7/2003 |
| WO | WO 03/061329 A2 | 7/2003 |
| WO | WO 2004/019120 A1 | 3/2004 |
| WO | WO-2004034136 | 4/2004 |
| WO | WO 2004/086098 A2 | 10/2004 |
| WO | WO 2005/001892 A2 | 1/2005 |
| WO | WO 2005/062908 A2 | 7/2005 |
| WO | WO-2006017129 | 2/2006 |
| WO | WO 2006/023077 A2 | 3/2006 |
| WO | WO 2006/039315 A2 | 4/2006 |
| WO | WO 2006/052755 A2 | 5/2006 |
| WO | WO-2007123173 A1 | 11/2007 |
| WO | WO-2007145973 A2 | 12/2007 |

OTHER PUBLICATIONS

U.S. Appl. No. 11/528,191, Unpublished, Gandhi et al.
U.S. Appl. No. 11/906,542, Unpublished, Hagood et al.
U.S. Appl. No. 11/906,383, Unpublished, Hagood et al.
U.S. Appl. No. 11/978,829, Unpublished, Hagood et al.
U.S. Appl. No. 11/811,842, Unpublished, Lewis.
U.S. Appl. No. 11/973,002, Unpublished, Hagood et al.
"BLU," Heesung Precision Ltd., http://www.hspr.co.kr/eng/product/blu.asp Retrieved on Aug. 3, 2006.
"Electronic Display Lighting Tutorials," 3M Corporation, file?//D:/Optical\Vikuiti Tutorial.htm. retrieved on Aug. 10, 2006.
"MicroLens™-Re-Inventing LCD Backlighting," Global Lighting Technologies Inc., http://www.glthome.com/tech.htm, 1-2.
"Microprism Technology for Luminaires," Reflexite Display Optics.
"Nano™Su-8 2000 Negative Tone Photoresist Formulations 2002-2025," Micro Chem.
"Optical Design Tools for Backlight Displays," Optical Research Associates, 1-8.
"Prism Brightness Enhancement Films," 3M Corporation, http://products3.3m.com/catalog/us/en001/electronics_mfg/vikuiti/node_V6G78RBQ5Tbe/root_GST1T4S9TCgv/vroot_S6Q2FD9X0Jge/gvel_GD378D0HGJgl/theme_us_vikuiti_3_0/command_AbcPageHandler/output_html Retrieved on Aug. 3, 2006.
"Prism Sheet," Mitsubishi Rayon America Inc., http://www.mrany.com/data/HTML/29.htm Retrieved on Aug. 4, 2006.
"Two Proprietary Technologies Supporting OMRON Backlight," OMRON Electronics Corporation, OMRON Electronics Components Web, www.omron.co.jp/ecb/products/bklight/english/genri/index.html.
A. Funamoto et. al. "LED Backlight System with Double-Prism Pattern", Journal of the Society for Information Display v. 14, p. 1045 (2006).
A. Kunzman and G. Pettitt, "White Enhancement for Color Sequential DLP" Society for Information Display, Digest of Technical Papers 1998.
Akimoto et al, "15.1: A 0.9-in UXGA/HDTV FLC Microdisplay," SID 00 Digest, 194-197(2000).
Alt et al, "A Gray-Scale Addressing Technique for Thin-Film-Transistor/Liquid Crystal Displays," IBM J. Res. Develop., 36(1):11-22(Jan. 1992).
AZ Displays, Inc. Complete LCD Solutions, ATM3224C-NC-FTH.
B. J. Feenstra et. al. "A Reflective Display Based on Electrowetting: Principle and Properties", International Display Research Conference Proceedings 2003, p. 322.
Birch et al, "31.1: SXGA Resolution FLC Microdisplays," SID 02 Digest, 954-957(2002).
Blackstone, "Making MEMS Reliable," SPIE's OEMagazine, 32-34(Sep. 2002).
Boeuf, "Plasma display panels: physics, recent developments and key issues," J. Phys. D: Appl, Phys., 36:R53-R79(2003).
Bozler et al, "Arrays of gated field-emitter cones having 0.32 □m tip-to-tip spacing," J. Vec. Sci. Technol. B, 12(2):629-632(Mar./Apr. 1994).
Bryan-Brown, "Ultra Low Poer Bistable LCDs," SID 00, 76-79(2000).
Chino et. al. "Development of Wide-Color-Gamut Mobile Displays with Four-Primary-Color LCDs", Society of Information Display, Digest of Technical Papers 2006, p. 1221.
Clark et al, "FLC Microdisplays," Ferroelectrics, 246:97-110(2000).
D. Doherty et. al. "Pulse Width Modulation Control of DLP Projectors", TI Technical Journal 1998, No. 3, p. 115.
Davis, "Light Emitting Diode Source Modeling for Optical Design," Reflexite Display Optics(Oct. 2004).
Davis, "Microstructured Optics for LED Applications," Reflexite Display Optics.
den Boer, "Active Matrix Liquid Crystal Displays," Elsevier Science & Technology Books, ISBN #0750678135, Aug. 2005.
Doane, et al, "Display Technologies in Russia, Ukraine, and Belarus," World Technology Evaluation Center Panel Report (Dec. 1994).
E. Saeedi, et. al. "Molten-Alloy Driven Self-Assembly for Nano and Micro Scale System Integration" Fluid Dynamics and Materials Processing v. 2, p. 221 (2006).
Feenstra et al, "Electrowetting Displays," Liquavista BV, http://www.liquavista.com/documents/electrowetting_displays_whitepaper.pdf, Retrieved on Aug. 17, 2006.
Feng et al, "Novel integrated light-guide plates for liquid crystal display backlight," J. Opt. A: Pure Appl. Opt., 7:111-117(2005).
Feng, "High Quality Light Guide Plates that Can Control the Illumination Angle Based on Microprism Structures," Applied Physics Letters, 85(24):6016-6018(Dec. 2004).
Foley, "NE04-21: Microstructured Plastic Optics for Display, Lighting, and Telecommunications Applications," Fresnel Optics(2001).
Funamoto et al, "Diffusive-sheetless Backlight System for Mobile Phone," IDW/AD, 1277-1280(2005).
Goddhue et al, "Bright-field analysis of field-emission cones using high-resolution tranmission electron microscopy and the effect of structural properties on current stability," J. Vac. Sci. Technol. B, 12(2):693-696(Mar.Apr. 1994).
Hartman, "4.1: Invited paper: Two-Terminal Devices Technologies for AMLCDs," SID 95 Digest, 7-10(1995).

Hewlett et al, "DLP Cinema™ projection: A hybrid frame-rate technique for flicker-free performance," Journ of the SID 9/3, 221-226(2001).

Hornbeck, "Digital Light Processing™: A New MEMS-Based Display Technology," Texas Instruments.

J. Bergquist et. al. "Field Sequential Colour Display with Adaptive Gamut", Society for Information Display, Digest of Technical Papers 2006, p. 1594.

J. Heikenfeld et. al., "Contrast Enhancement in Black Dielectric Electroluminescent Devices", IEEE Transactions on Electron Devices, v. 49, p. 1348 (2002).

Jepsen et al, "4.11: 0.9" SSGA Liquid Crystal on Silicon Panel with 450 Hz. Field Rate, MicroDisplay Cororpation, 106-109.

Johnstone et al, "Theoretical limits on the freestanding length of cantilevers produced by surface micromachining technology," J. Micromech. Microeng. 12:855-861(2002).

Jones et al, "29-1: Addressing □Vmin Ferroelectric Liquid Crystal Displays," (1998).

Judy, M. W. "Micromechanisms Using Sidewall Beams" (1994).

Kalantar et al, "Optical Micro Deflector Based Functional Light-Guide Plate for Backlight Unit," SID 00 Digest, 1029-1031(2000).

Kalantar, "Modulation of viewing angle on an LCD surface through backlight optics," Journal of the SID, 11(4):647-652(2003).

K-C Lee et. al. "Integrated Amorphous Silicon Color Sensor on LCD Panel for LED Backlight Feedback Control System", Society for Information Display, Digest of Technical Papers 2005, p. 1376.

Koden et al, "Ferroelectric Liquid Crystal Display," (Sep. 17, 1997).

Kuang et al, "Dynamic Characteristics of shaped micro-actuators solved using the differential quadrature method," J. Micromech. Microeng. 14:647-655(2004).

Lee et al, "P-25: A LCOS Microdisplay Driver with Frame Buffering Pixels," SID 02 Digest, 292-295(2002).

Legtenberg et al, "Electrostatic Curved Electrode Actuators," Journal of Microelectromechanical Systems, 6:3(257-265)(Sep. 1997).

Li et al, "Drie-Fabricated Curved-Electrode Zipping Actuators with Low Pull-In Voltage," IEE, 480-483 (2003).

Liang et al, "Observation of electric field gradients near field-emission cathode arrays," Appl Phys. Lett., 66(9):1147-1149(Feb. 1995).

Liu et al, "Scaling Laws of Microactuators and Potential Applications of Electroactive Polymers in MEMS," SPIE, 3669:345-354(Mar. 1999).

Low-Temperature Polysilicon TFT Reflective Color LCD by Techno World.

Maboudian et al, "Stiction reduction processes for surface micromachines," Tribology Letters, 3:215-221(1997).

Mastrangelo et al, "Mechanical Stability and Adhesion of Microstructures Under Capillary Forces—Part I: Basic Theory," Journal of Microelectromechanical Systems, 2(1):33-43(Mar. 1993).

Mastrangelo et al, "Mechanical Stability and Adhesion of Microstructures Under Capillary Forces—Part II: Experiments," Journal of Microelectromechanical Systems, 2(1):44-55(Mar. 1993).

McLaughlin, "Progress in Projection and Large-Area Displays," Proceedings of the IEEE, 90(4):521-532(Apr. 1, 2002).

Okumura et al, "Highly-efficient backlight for liquid crystal display having no optical films," Applied Physics Letters, 83(13):2515-2517(Sep. 2003).

Perregaux et al, "Arrays of Addressable High-Speed Optical Microshutters," IEEE, 232-235, (2001).

Q. Tan and Y.C. Lee, "Soldering Technology for Optoelectronics Packaging", 1996 Electronic Components and Technology Conference, p. 26.

Qiu et al, "A Curved-Beam Bistable Mechanism," Journal of Microelectromechanical Systems, 13(2):137-145(Apr. 2004).

Qui et al, "A High-Current Electrothermal Bistable MEMS Relay,".

Ravnkilde et al, "Fabrication of Nickel Microshutter Arrays for Spatial Light Modulation".

Roosendaal et al, "25.2: A Wide Gamut, High Aperture Mobile Spectrum Sequential Liquid Crystal Display," SID 05 Digest, 1116-1119(2005).

S. Pasricha et. al. "Dynamic Backlight Adaptation for Low Power Handheld Devices" IEEE Design and Test v. 21, p. 398 (2004).

Sato, "Research on Flexible Display Systems," Broadcast Technology, 21:10-15(2005).

Sharp Specification No. LCP-03015 for Mobile Liquid Crystal Display Group, Sharp Corporation, Jun. 13, 2003.

Shibaura Mechatronics Corporation, Product Brochure for Panel Processing.

Shikida et al, "Fabrication fo an S-shaped Microactuator," Journal of Microelectromechanical Systems, 6(1):18-24(Mar. 1997).

Sony ACX705AKM, 6.92cm Diagonal Reflective Color LCD Module.

Steyn, Lodewyck, "Electroquasistatic Zipper Actuators: A Technology Review", Dec. 2004.

T. van de Biggelaar, et. al. "Passive and Active Matrix Addressed Polymer Light-emitting Diode Displays", Proc. SPIE vol. 4295, p. 134 (2001).

Tagaya et al, "Thin Liquid-Crystal Display Backlight System with Highly Scattering Optical Transmission Polymers," Applied Optics, 40(34):6274-6280(Dec. 2001).

Takatori et al, "6.3: Field-Sequential Smectic LCD with TFT Pixel Amplifier," SID 01 Digest, 48-51(2001).

Teijido, J.M., "Conception and Design of Illumination Light Pipes," Thesis No. 1498 for University of Neuchatel, http://www.unige.ch/cyberdocuments/unine/theses2000/TeijidoJM/these_front.htm 1:1-99 Retrieved on Aug. 3, 2006.

Tien et al, "MEMS Actuators for Silicon Micro-Optical Elements," Proc. Of SPIE, 4178:256-269, (2000).

Underwood, "A review of microdisplay technologies," SID@EID, (Nov. 21 to 23, 2000).

Underwood, "LCoS through the looking glass," SID(2001).

Vangbo et al, "A lateral symmetrically bistable buckled beam," J. Micromech. Microeng., 8:29-32(1998).

Wang et al, "Highly Space-Efficient Electrostatic Zigzag Transmissive Micro-Optic Switches for an Integrated MEMS Optical Display System".

Yamada et al, "52.2: Invited Paper:Color Sequential LCD Based on OCB with an LED Backlight," SID 00 Digest, 1180-1183(2000).

Yasumura et al, "Fluid Damping of an Electrostatic Actuator for Optical Switching Applications," Transducers Research Foundation (2002).

Non Final Office Action dated Nov. 1, 2006, U.S. Appl. No. 11/218,690.

Final Office Action dated May 18, 2007, U.S. Appl. No. 11/218,690.

Final Office ActionDated Oct. 3, 2007, U.S. Appl. No. 11/218,690.

Non Final Office Action Dated Mar. 22, 2007, U.S. Appl. No. 11/546,937.

Final Office Action dated Sep. 21, 2007, U.S. Appl. No. 11/546,937.

International Search Report, Application No. PCT/US2007/021434, mailed Feb. 28, 2008.

International Search Report and Written Opinion dated Jul. 14, 2009 in International Application No. PCT/US2009/002288.

* cited by examiner

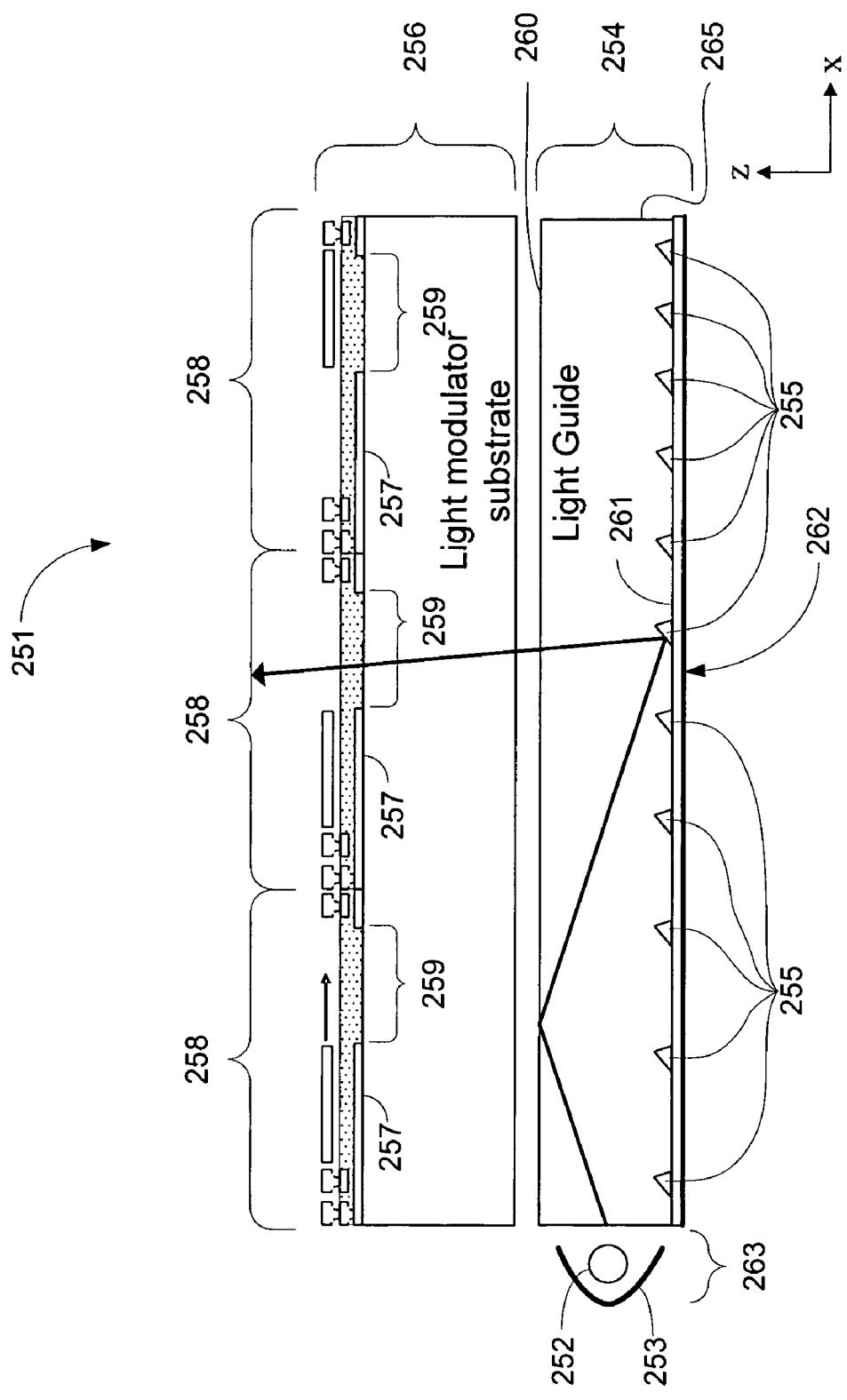

Measurement Setup for Conical Reflection

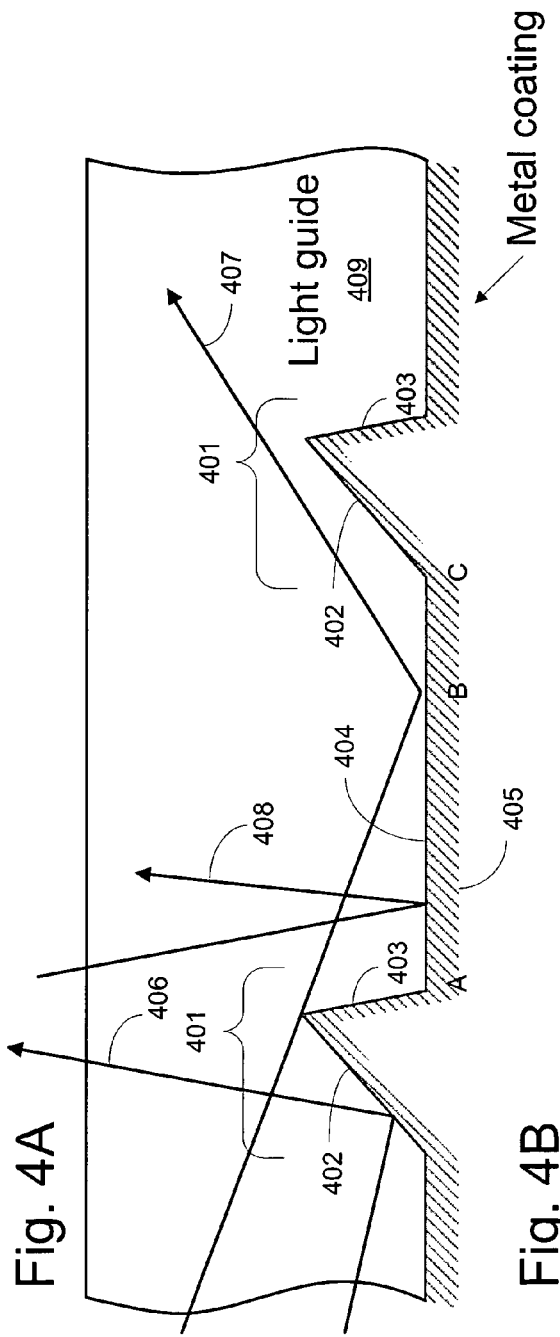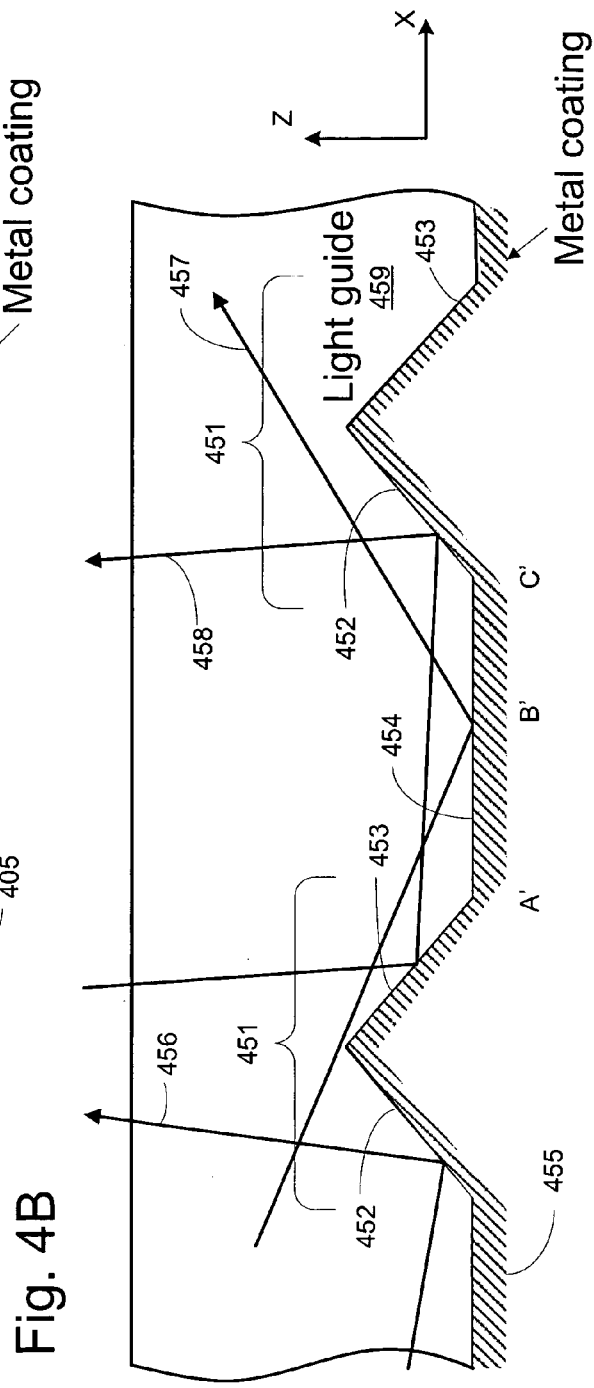

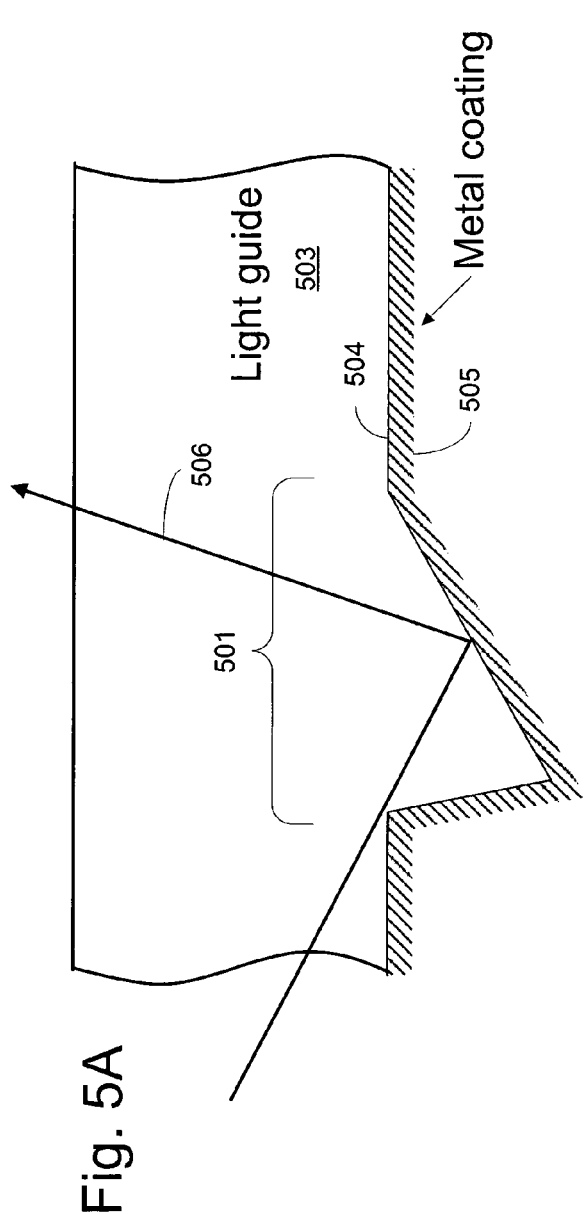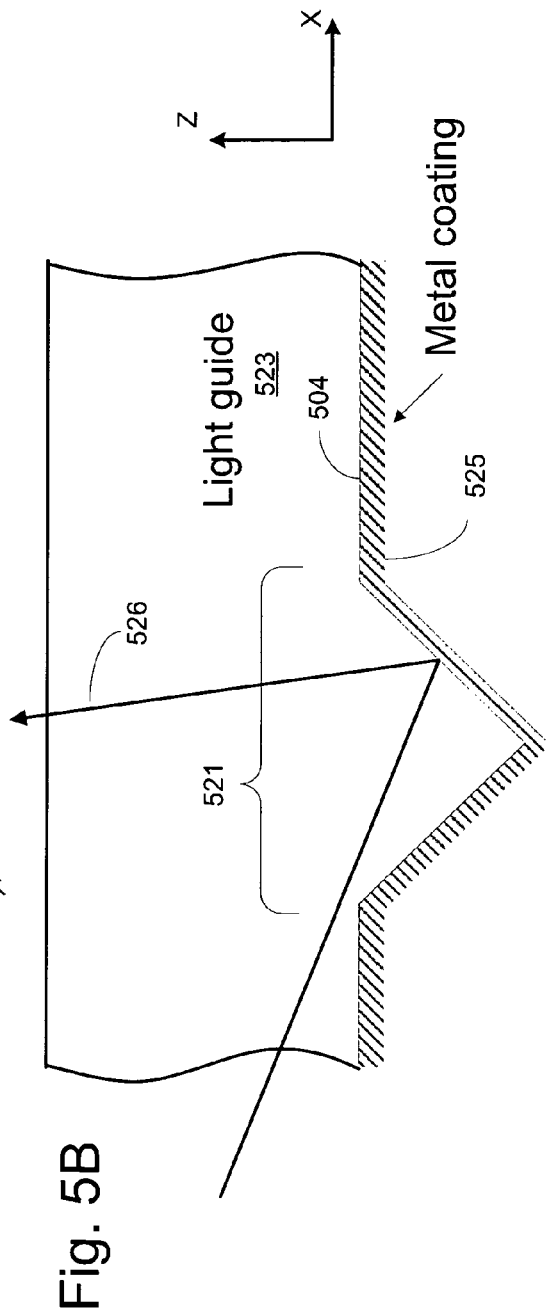

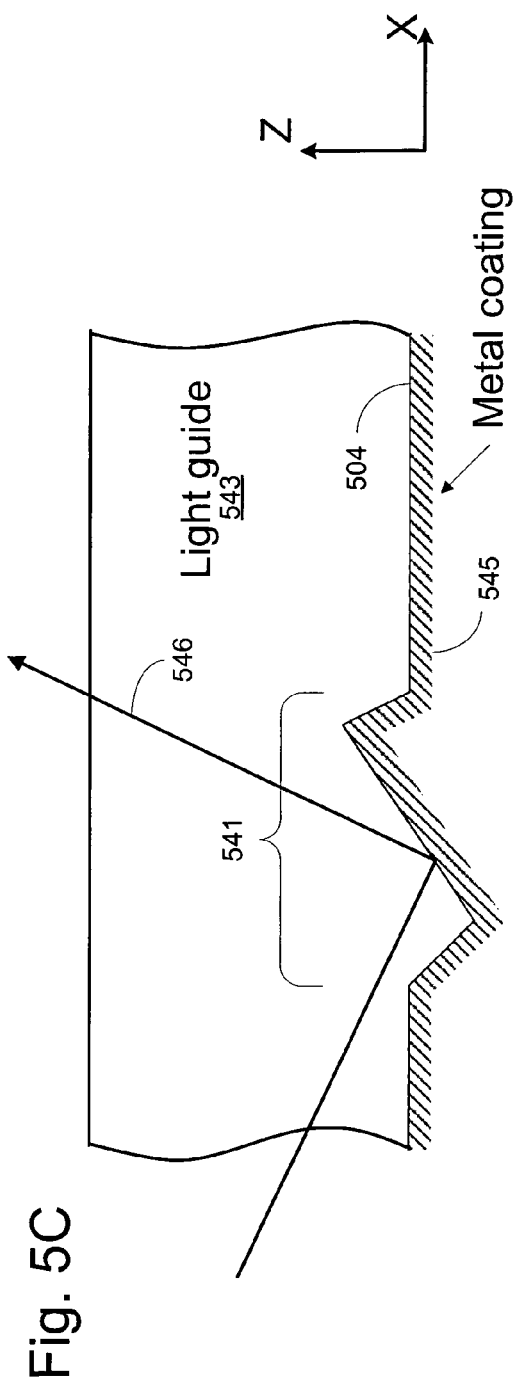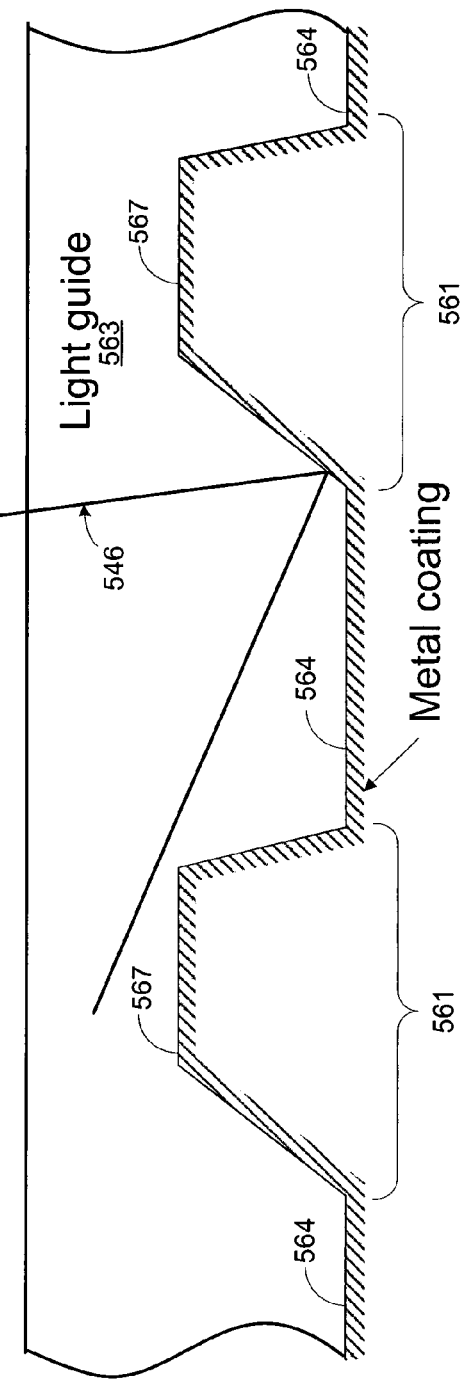

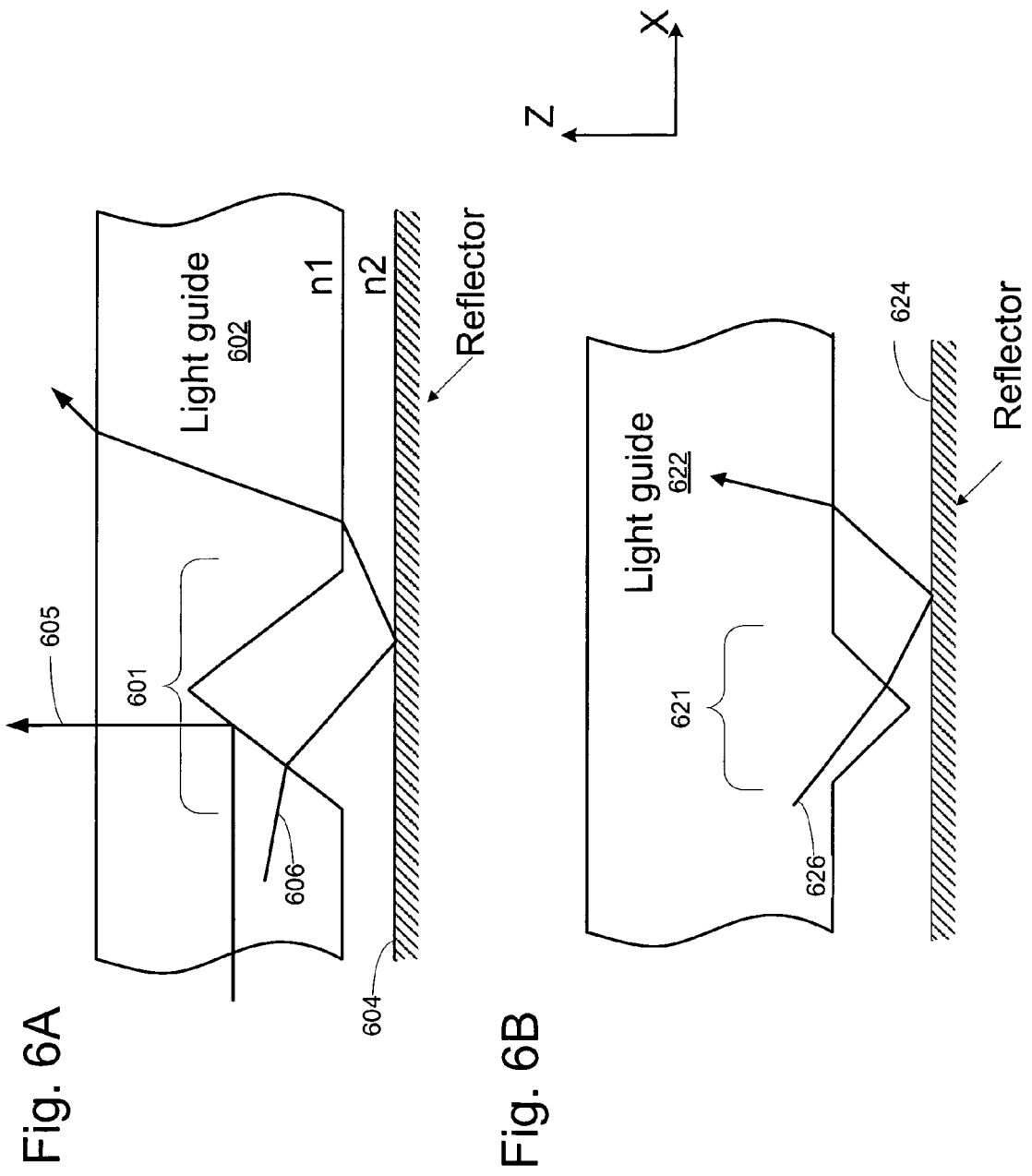

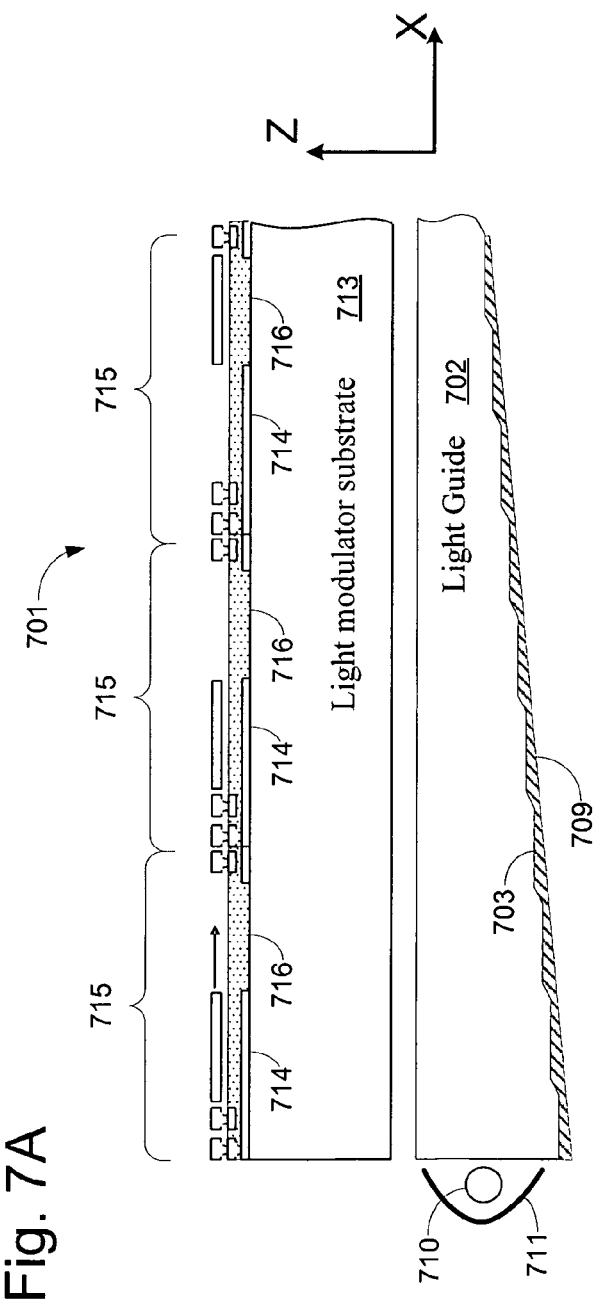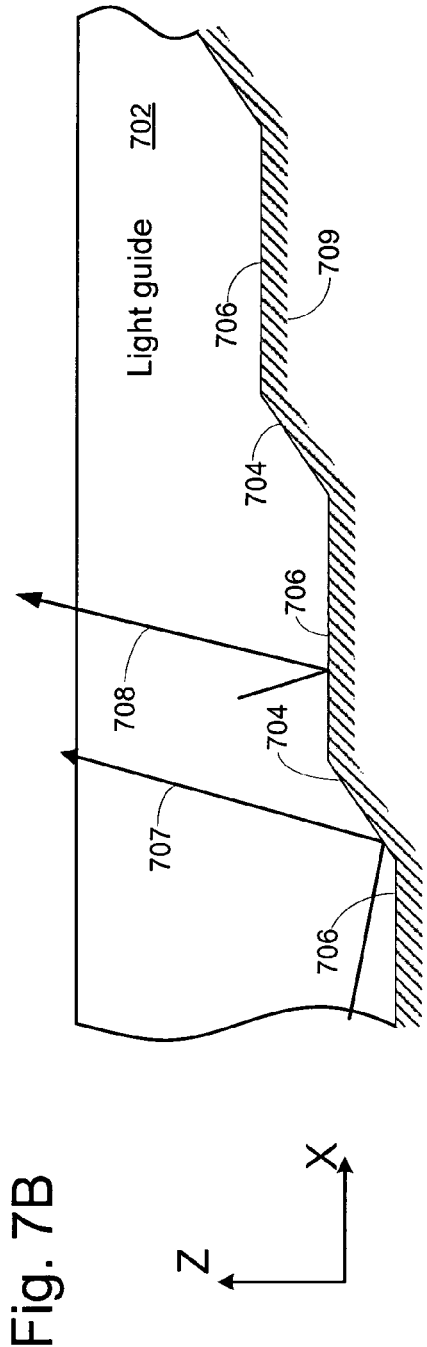

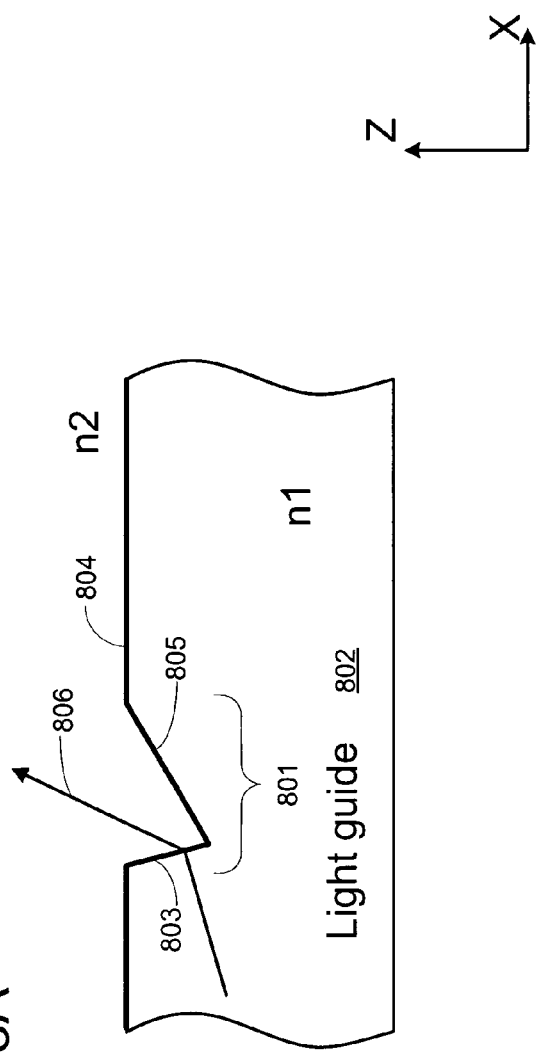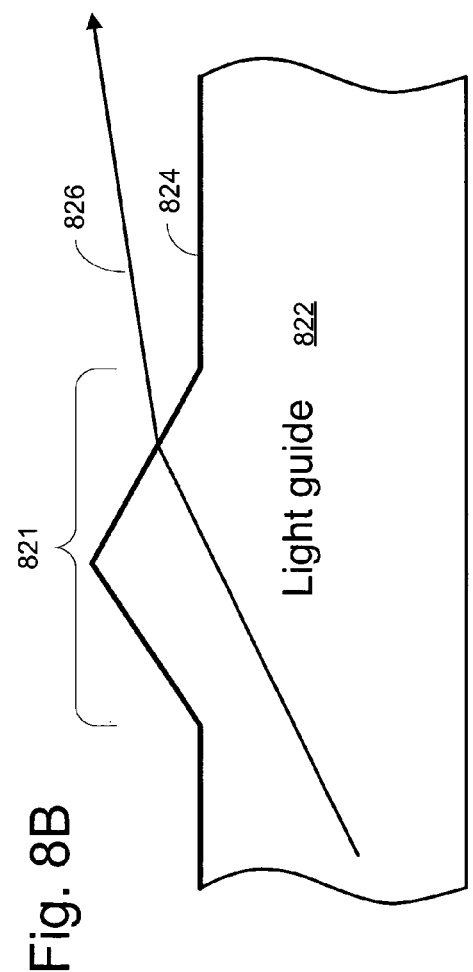

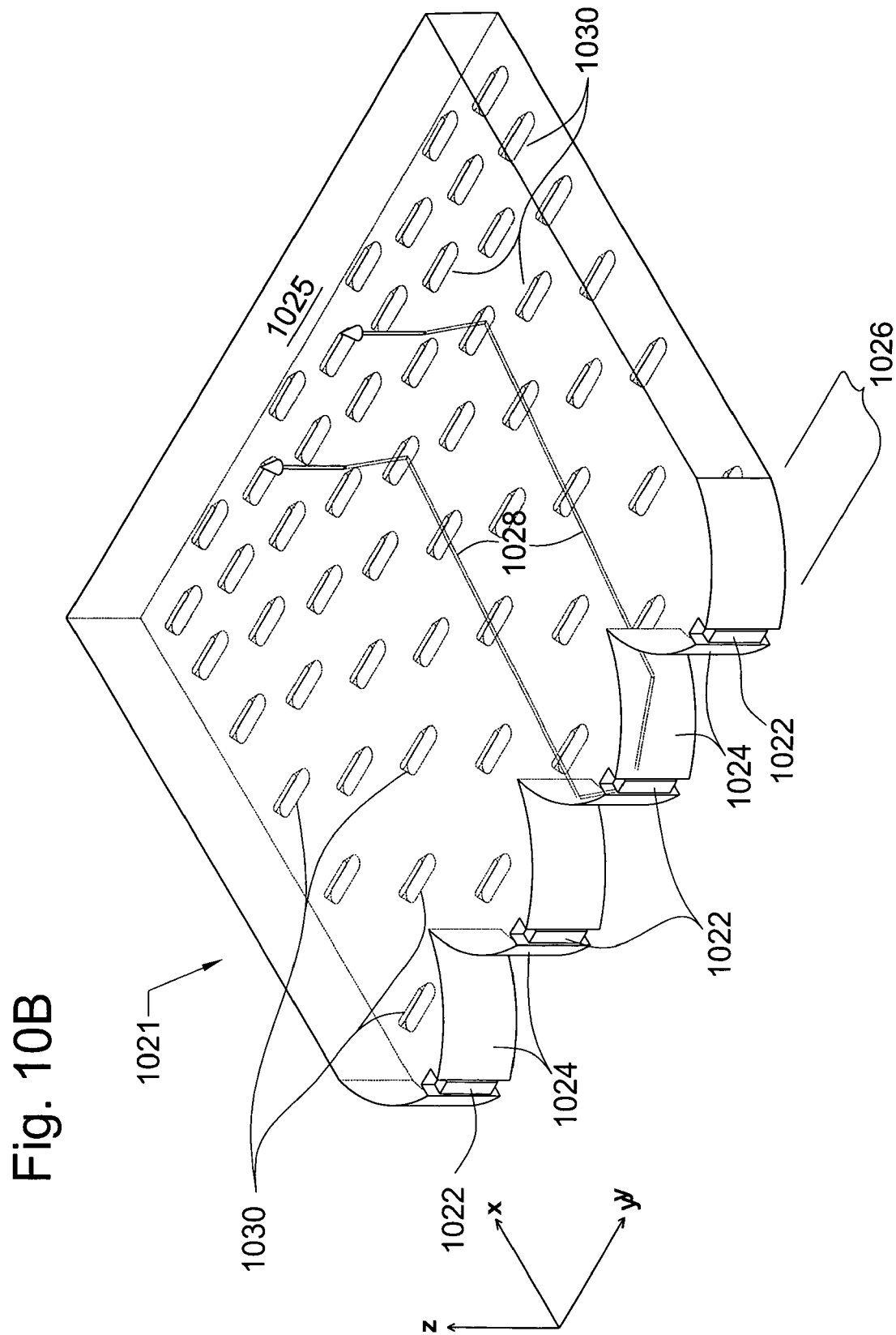

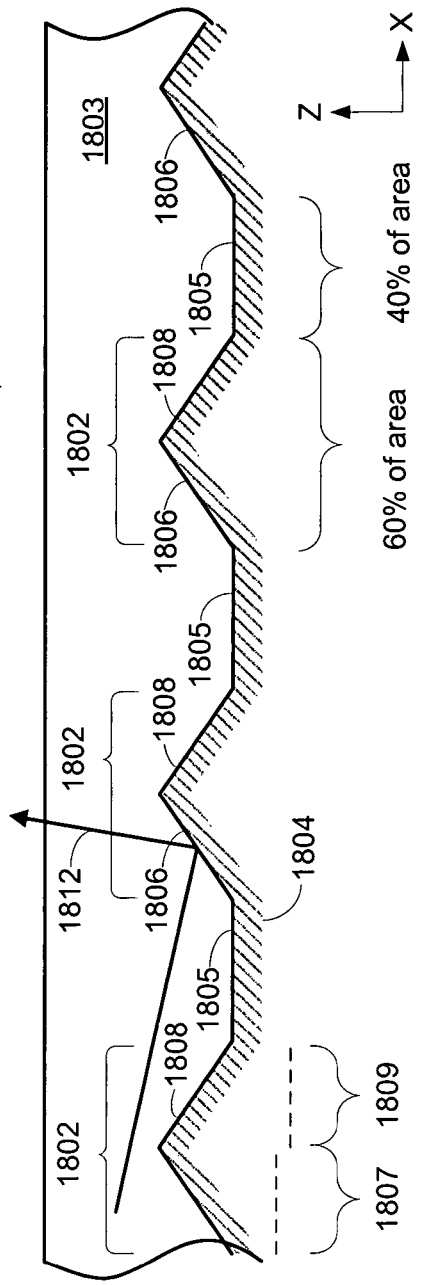
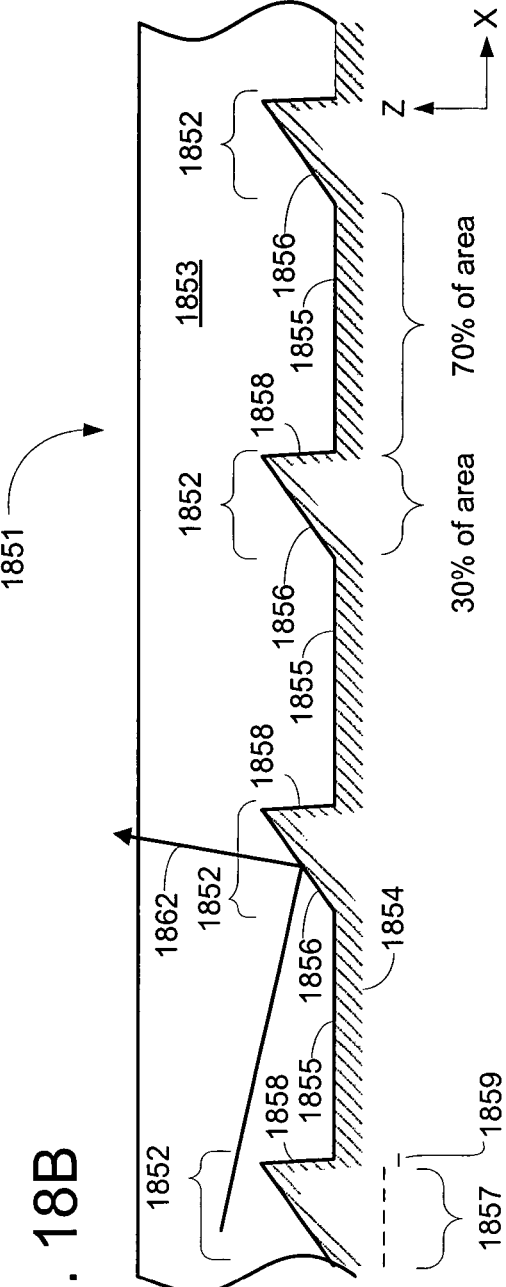
Fig. 18A
Fig. 18B

DISPLAY APPARATUS WITH OPTICAL CAVITIES

REFERENCE TO RELATED APPLICATIONS

This application claims the benefit of U.S. Provisional Patent Application Ser. No. 60/811,054, filed on Jun. 5, 2006; and U.S. Provisional Patent Application Ser. No. 60/840,249, filed on Aug. 25, 2006. The specifications of each of the foregoing are incorporated by reference herein in their entirety.

BACKGROUND OF THE INVENTION

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications. Backlit displays using mechanical light modulators have not yet demonstrated sufficiently attractive combinations of brightness and low power. There is a need in the art for displays that combine the attributes of speed, brightness, and low power.

In co-owned U.S. patent application Ser. No. 11/218,690, filed Sep. 2, 2005, the entirety of which is incorporated herein by reference, a structure was disclosed for improving the optical efficiency of a display including an array of apertures—by forming such apertures or light transmissive regions as part of an otherwise reflective surface (referred to as a "reflective aperture layer"). This reflective aperture layer, when coupled with a backlight that includes a second reflective surface, forms an optical cavity that allows for the recycling of light rays that do not immediately pass through the apertures. Displays with optical throughput of efficiencies in the range of 40% to 60% were described even though apertures formed in the reflective layer had area ratios as low as 8% to 20%.

SUMMARY OF THE INVENTION

In general, the invention relates to a display having an improved optical cavity to provide enhanced light directivity and efficiency. In one aspect, the invention relates to a display including an array of light modulators, a light guide, and front-facing and rear-facing reflective surfaces. The light guide includes a plurality of geometric light redirection centers to extract light from the backlight. Various embodiments of such redirection centers are described in U.S. Pat. Nos. 5,005,108; 5,202,950; 5,884,872; 6,079,838; 6,174,064; 6,731,355; 6,827,456; 7,014,349; and 7,046,905, the entireties of which are herein incorporated by reference.

In various embodiments, the display also includes either a turning film and or a brightness enhancing film positioned behind of the rear-facing reflective surface. In addition, in one embodiment, the display includes a light injection system including a lamp and a light collimator for introducing a non-random fraction of light output by the lamp into the light guide to produce collimated light within a predetermined range of angles. Collimated light includes any distribution of input light where a higher-than-random percentage of light is directed towards the reflective aperture layer within a pre-determined range of angles. Various light collimation and injection techniques suitable for use in the display are described in U.S. Pat. Nos. 5,005,108; 5,884,872; 6,079,838; and 7,014,349, the entireties of which are herein incorporated by reference.

In one embodiment, the light modulators are MEMS-based light modulators, for example, shutters, which selectively interfere with light that passes through corresponding apertures in the rear-facing reflective layer. In another embodiment the shutters are liquid-based shutters, which can selectively interfere with light using a mechanism referred to as electro-wetting. In another embodiment, the light modulators are liquid crystal cells. The array of light modulators defines a display surface. The display plane is preferably substantially planar.

The light guide includes a front surface and a rear surface. In one embodiment, between about 50% to about 95% of the area of the rear surface of the light guide is substantially parallel to the display surface. In one particular embodiment, at least 50% of the area of the rear surface of the light guide is substantially parallel to the display surface. In another embodiment, at least 60% of the area of the rear surface of the light guide is substantially parallel to the display surface. In still another embodiment at least 70% of the area of the rear surface of the light guide is substantially parallel to the display surface. In a further embodiment at least 80% of the area of the rear surface of the light guide is substantially parallel to the display surface. In yet another embodiment, at least 80% of the area of the rear surface of the light guide is substantially parallel to the display surface.

The geometric light redirectors are also referred to herein as extraction centers, extraction structures, and deflectors. The light redirectors' function is to extract light out of the light guide and toward the viewer. In one embodiment, the light redirectors are prismatic in shape. Alternatively, the light redirectors are round, curved, trapezoidal, elliptical. The surfaces of the light redirectors are preferably smooth. The light redirectors are capable of extracting light wherein a higher-than-random percentage of light is directed towards the reflective aperture layer within a pre-determined range of angles.

In some embodiments, the light directors have a front surface facing a lamp and a rear surface facing away from the lamp. The area of the footprint of the front face of a redirector onto the front-facing reflective surface may be greater than the area of a similar footprint of the rear face of the redirector. Alternatively, the areas of the footprints of the front and rear surfaces of the light redirectors are equal. In addition, the packing density of the light redirectors in the light guide may vary as a function of the light redirectors' distance from the lamp.

The rear-facing reflective layer (also referred to herein as the reflective aperture layer) includes a plurality of apertures and is positioned in front of the light guide, i.e., between the light guide and an intended viewer. The rear-facing reflective layer is preferably positioned behind the light modulators. In one embodiment, the rear-facing reflective layer is formed from the deposition of a metal on the front surface of the light guide. The rear-facing reflective layer may also be formed from a dielectric mirror or from a thin film stack the includes both dielectric and metal layers. The rear-facing reflective layer preferably reflects light specularly with a reflectivity in the range of 90 to 98%.

According to one feature, the rear-facing reflective layer is preferably positioned proximate to the array of light modulators. In one embodiment the rear-facing reflective layer positioned within 0.5 mm of the array of light modulators. In another embodiment, an array of light modulators is formed on a substrate, and the distance between the rear-facing reflective layer and the array of light modulators is less than the thickness of the substrate. In another embodiment, the rear-facing reflective layer has a pitch defining the distance between apertures, and the distance between the rear-facing reflective layer and the array of light modulators is less than the pitch.

According to another feature, the apertures are associated with specific light modulators in the array of light modulators. The association can be one to one, one to many, or many to one. Each aperture allows a flux of light to pass through. For any set of apertures and associated light modulators, the light modulators modulate substantially the entire flux of light passing through the aperture. More particularly, a single light modulator, in one embodiment, modulates substantially the entire flux of light passing through a single associated aperture. In another embodiment, a single light modulator modulates substantially the entire flux of light passing through multiple associated apertures. In still another embodiment, multiple light modulators, together, modulate substantially all of the flux of light passing through a single aperture.

The front-facing reflective layer, in one embodiment (also referred to herein as a back-reflector or back-reflective surface) is substantially parallel to the display surface. That is, it is preferably at an angle of less than about 10 degrees to the display surface. In one embodiment, the front-facing reflective layer is parallel to the display surface. In one implementation, the front-facing reflective layer is a metal deposited on the rear surface of the light guide. The front-facing reflective layer may also be formed from a dielectric mirror or from a thin film stack the includes both dielectric and metal layers. Alternatively, the front-facing reflective layer is separated from the light guide by an air gap. The front-facing reflective layer, in one embodiment reflects light specularly. It preferably has a reflectivity in the range of 90 to 98%.

Such displays concentrate emitted light within a range of angles about an axis normal to the display plane (referred to as the "display normal"). For example, light can be concentrated such that a higher-than-random percentage of light reflected off of the rear-facing reflective surface towards the front-facing reflective layer at angles within a useful range of angles about the display normal is redirected towards the reflective aperture layer at angles also within the range of useful angles about the display normal. The range of useful angles, in various embodiments ranges from about 20 degrees to about 40 degrees from the display normal. For example, in one embodiment, the useful range of angles includes angles within 20 degrees of the display normal. In another embodiment, the useful range of angles includes angles within 30 degrees of the display normal. In still a further embodiment, the useful range of angles includes angles within 40 degrees of the display normal.

In one embodiment, at least 50% of the light reflected off the rear-facing reflective layer at an angle within the useful range of angles exits the light guide at an angle also within the useful range of angles. In another embodiment at least 70% of the light reflected off the rear-facing reflective layer at an angle within the useful range of angles exits the light guide at an angle also within the useful range of angles. In a further embodiment, at least 90% of the light reflected off the rear-facing reflective layer at an angle within the useful range of angles exits the light guide at an angle also within the useful range of angles.

In another aspect, the invention relates to a method of forming an image using an improved optical cavity. The method includes providing a array of light modulators, which defines a display surface, in proximity to an optical cavity. The optical cavity includes a rear-facing reflective aperture layer as a front surface, a rear surface, and a light guide positioned between the front surface and the rear surface. Light is reflected off the rear-facing reflective aperture layer. A portion of the light is reflected to within a useful range of angles about a display axis perpendicular to the display surface. This portion of light has an initial total light intensity. The reflected light is then redirected by the rear surface of the optical cavity. The light redirected towards the reflective aperture layer within the useful range of angles about the display normal has an intensity of at least 50% of the initial intensity. In one embodiment, the intensity of the redirected light within the useful range of angles about the display axis is at least 70% of the initial total light intensity. In another embodiment, the intensity of the redirected light within the useful range of angles about the display axis is at least 90% of the initial total light intensity. In one embodiment, the useful range of angles about the normal is about 40 degrees about the normal. In another embodiment, the useful range of angles about the normal is about 30 degrees about the normal. In still another embodiment, the useful range of angles is about 20 degrees about the normal.

This ability to redirect light received at a useful angle back at a useful angle is referred to herein as conical reflectance. More particularly, conical reflectance is defined as the ability of a backlight or illumination system to receive an incoming cone of light within a pre-determined range of angles (measured with respect to an incident axis) and then re-emit or reflect that light along an equivalent exit axis where the integrated intensity (or radiant power) of the exit light, measured about the exit axis over the same pre-determined range of angles, is greater than a specified fraction of the integrated incident light. The incoming cone of light preferably illuminates an area of the backlight at least 2 mm in diameter and the radiant power is preferably determined by integrating reflected light over a similar or larger area.

BRIEF DESCRIPTION OF THE DRAWINGS

The foregoing discussion will be understood more readily from the detailed description of the invention with reference to the following drawings:

FIG. 2B is a cross sectional view of a display apparatus according to an illustrative embodiment of the invention.

FIGS. 4A and 4B are cross sectional views of portions of a light guide along with their associated front-facing reflective layers for use in a display apparatus according to an illustrative embodiment of the invention.

FIGS. 5A-5D are cross sectional views of portions of a light guide along with their associated front-facing reflective layers for use in a display apparatus according to an illustrative embodiment of the invention.

FIGS. 6A-6D are cross sectional views of portions of a light guide along with their associated front-facing reflective layers for use in a display apparatus according to an illustrative embodiment of the invention.

FIG. 7A is a cross sectional view of a display apparatus according to an illustrative embodiment of the invention.

FIGS. 7B-7D are cross sectional views of portions of a light guide along with their associated front-facing reflective layers for use in a display apparatus according to an illustrative embodiment of the invention.

FIGS. 8A and 8B are cross sectional views of portions of a light guide for use in a display apparatus according to an illustrative embodiment of the invention.

FIGS. 10A, 10B, 10C, and 10D are isometric views of a light guide along with associated light injection systems for use in a display according to an illustrative embodiment of the invention.

FIGS. 18A and 18B are cross sectional views of portions of a light guide along with their associated front-facing reflective layers for use in a display apparatus according to an illustrative embodiment of the invention.

DETAILED DESCRIPTION OF CERTAIN ILLUSTRATIVE EMBODIMENTS

Figure 1A:
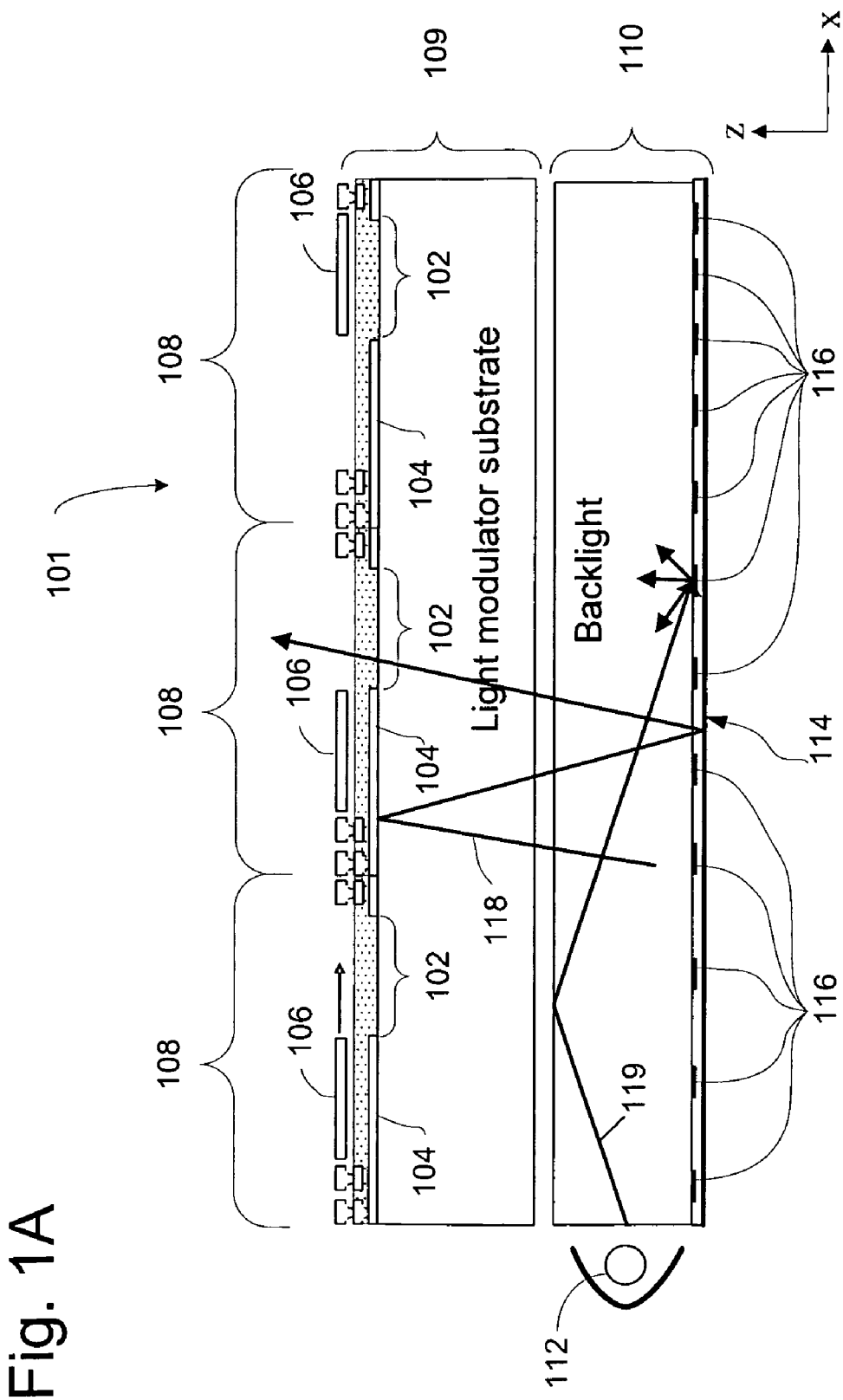
FIG. 1A is a cross sectional view of a display apparatus.

To provide an overall understanding of the invention, certain illustrative embodiments will now be described, including display apparatus and constituent components thereof. However, it will be understood by one of ordinary skill in the art that the apparatus described herein may be adapted and modified as is appropriate for the application being addressed and that the systems and methods described herein may be employed in other suitable applications, and that such other additions and modifications will not depart from the scope hereof.

U.S. patent application Ser. No. 11/218,690, entitled Methods and Apparatus for Spatial Light Modulation, describes a backlit display with increased optical efficiency which relies on an array of shutter assemblies and apertures. The shutter assembly in a given pixel acts to alternately either open or close the optical pathway through a corresponding aperture. The apertures are formed as light transmissive regions in an otherwise reflective surface, which we refer to as the reflective aperture layer. The display includes a second reflective surface, which can be formed as part of a backlight.

An illustration of a display apparatus as described in U.S. patent Ser. No. 11/218,690 is given in FIG. 1A. In this display apparatus 101 the apertures 102 are defined in an aperture layer 104 which can be fabricated from a reflective material. The apertures can be alternately opened and closed by means of shutters 106 which are formed along with electro-mechanical actuators in a shutter assembly 108. The shutters are built upon a light modulation substrate 109. The modulation substrate 109 is situated on top of a backlight 110 which is in turn illuminated by a lamp 112. Further descriptions of mechanical actuators for opening and closing of the shutters can be found in co-owned U.S. patent Ser. No. 11/251,035, filed Oct. 14, 2005 and incorporated herein by reference.

A display such as in FIG. 1A may have aperture openings that comprise a small fraction (5 to 25%) of the available pixel. In many cases the throughput efficiency of the light would then be limited in similar fashion, i.e. only 5 to 25% of the available illumination power in the backlight becomes available to the viewer. However, in those cases where the aperture layer 104 is formed from a reflective material, and where the backlight also possesses a back-reflective surface 114, the backlight becomes capable of recycling rays that do not initially pass through an aperture to the viewer. An exemplary ray of such recycled light is shown as 118 in the figure. Because of these recycled light rays, a much greater fraction of the available backlight power can eventually makes its way to the viewer. Table 1 shows the calculated efficiency results from a series of backlights with differing fractions of aperture openings and reflective efficiencies from its metal surfaces. Throughput efficiencies as high as 75% can be achieved. Displays with such improved throughput can deliver more brightness to the viewer at equivalent lamp powers, or conversely can deliver the same brightness by means of reduced power in the backlight compared to the prior art. Displays which make use of aperture layers that have reflective or recycling properties will hereafter be referred to as reflective aperture displays.

TABLE 1

| Area Ratio of Apertures | Reflectivity of mirror surfaces | Optical Efficiency (Throughput) |
| --- | --- | --- |
| 8% | 0.97 | 59% |
| | 0.93 | 40% |
| | 0.88 | 30% |
| 14% | 0.97 | 71% |
| | 0.93 | 55% |
| | 0.88 | 43% |
| 20% | 0.97 | 79% |
| | 0.93 | 65% |
| | 0.88 | 53% |

The display apparatus 101 includes a lamp 112. A number of different types of lamps can be employed in these displays, including without limitation: incandescent lamps, fluorescent lamps, lasers, or light emitting diodes (LEDs). Further, lamp 112 of display apparatus 101 can actually represent an assembly of multiple lamps. For instance a combination of red, green, and blue LEDs can be combined with or substituted for a white LED in a small semiconductor chip, or assembled into a small multi-lamp package. Similarly a lamp can represent an assembly of 4-color LEDs, for instance a combination of red, yellow, green, and blue LEDs.

In FIG. 1A the light from lamp 112 is distributed throughout the light guide 110 by means of total internal reflection. The light guide includes an array of scattering centers 116 whose function is to extract light from the light guide, i.e. to deflect rays into directions that no longer satisfy the condition for total internal reflection. In typical light guides such scattering centers are formed as an array of white dots. The scattering dots are painted with a silk screen into a random pattern to avoid artifacts to the final image. Dots formed from white paint act as diffuse reflectors which scatter reflected light into random directions, (see the result of ray 119), ideally with no correlation between the angle of the incoming rays and the angle of the outgoing rays. In FIG. 1, light that is deflected down and out of the light guide will be returned to the light guide by reflection from the reflector 114. Light that is deflected up and toward the apertures, but that does not escape through an open aperture, can be returned to the light guide by reflection from the reflective surface 104. After reflection from surface 104 the light will either reflect again from surface 114 or impinge on a dot of white paint where its direction will be randomized again.

The density of the scattering centers 116 is adjusted to ensure the uniformity of light which is emitted from the light guide, with typically a lower density of extraction centers placed near to the lamp and a higher density placed at the furthest distances from the lamp.

Light that does escape from the light guide in FIG. 1A, having been scattered in random fashion from the array of paint dots 116, will exit the aperture with a random distribution of angles. As a result, the brightness (in candelas/cm^2) as perceived by a viewer will be independent of view angle with respect to the aperture plane. The luminous intensity (in.candelas, or # of photons emitted per second per unit solid angle) will follow Lambert's law, and fall off with the cosine of the angle from the normal to the aperture plane.

For portable devices, it is often or commonly the case that the device is designed for a single user, and the most common view angle will be on or about the normal to the aperture plane. For such an application, the random or Lambertian distribution of light exiting from the apertures will be suboptimal. Light that is emitted into the off-angles, not directly toward the viewer, can be considered as wasted light. In fact, for a Lambertian distribution only 12% of the emitted radiant power will be directed into the most forward-looking 20 degrees of solid angle. Any design which can direct a greater fraction (for instance 30% or more) of the total radiated power into a direction favorable for the user makes possible a considerable improvement in power efficiency—an important feature for portable electronics.

Thus a display including a reflective aperture layer can be improved, particularly for mobile use, by providing a means for concentrating light into angles closer to the display normal.

Figure 1B:
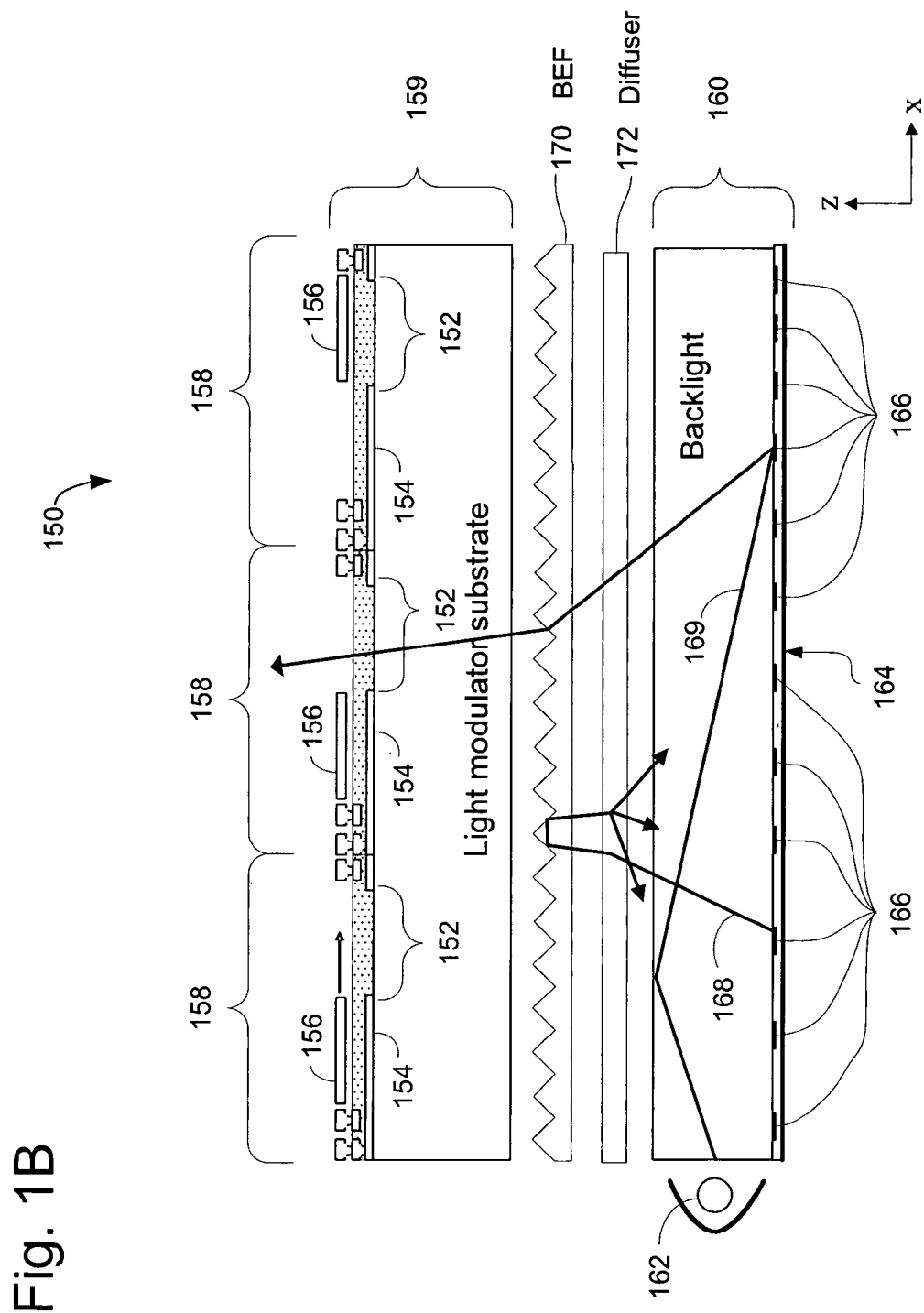
FIG. 1B is a cross sectional view of another display apparatus.

A common method, as used in liquid crystal display devices, to provide such light concentration is to deploy a prismatic brightness enhancing film (and optionally a diffuser film) between the backlight and the light modulator. Such methods, however are unexpectedly unsuitable for use in displays having reflective aperture layers. FIG. 1B shows a display structure including a brightness enhancing film. The display apparatus 150 of FIG. 1B includes a light modulation substrate 159, which in turns includes a reflective aperture layer 154, an array of apertures 152, shutters 156, and shutter assemblies 158. The Display apparatus 150 also includes a backlight 160 which includes a lamp 162, scattering centers 166, and a back-reflecting film 164 Placed between the substrates 159 and 160 are a prismatic brightness enhancing film (or BEF film) 170 and a diffusing film 172.

Prismatic brightness enhancing films (or BEF films) are known to increase the luminance in the forward direction (along the display normal) in liquid crystal displays by amounts of 50% to 100%. The BEF films work to re-distribute the light, with relatively more light directed within +/−40 degrees of the display normal and less of it allowed to escape along angles more oblique to the normal. An example of this effect is shown as ray 169. Measurements of the display brightness, or luminance, in reflective aperture display systems such as display 150, however, do not demonstrate a similar light concentration effect. The measured light emission from display 150 is both lower in intensity than what is expected from the model in Table 1 and more randomly distributed in angles.

The failure of display system 150 may be attributed in one aspect to the presence of diffusing film 172 and in particular to its combination with the reflective aperture layer 154. A BEF film 170 is designed to recycle only a portion of the light that is strikes it at unfavorable angles, and the diffusing film 172 is provided to re-direct or randomize these unfavorable light rays. But when placed in a display with the reflective aperture 154, the diffusing film also acts to re-direct or randomize the rays of light with favorable angles that happen to have been returned to the backlight after reflection from layer 154 (see ray 168). Worse, as the light rays can be recycled as many as 8 or 12 times in a display such as system 150, any favorable concentration that is created by the BEF film can be completely degraded or counteracted by repeated passes through the diffusive film 172.

The use of white paint dots 166 as an extraction elements in display 150 also contributes to the degradation of directional efficiency in display apparatus 150, since the paint is designed to reflect light in a random or diffuse fashion.

Figure 2A:
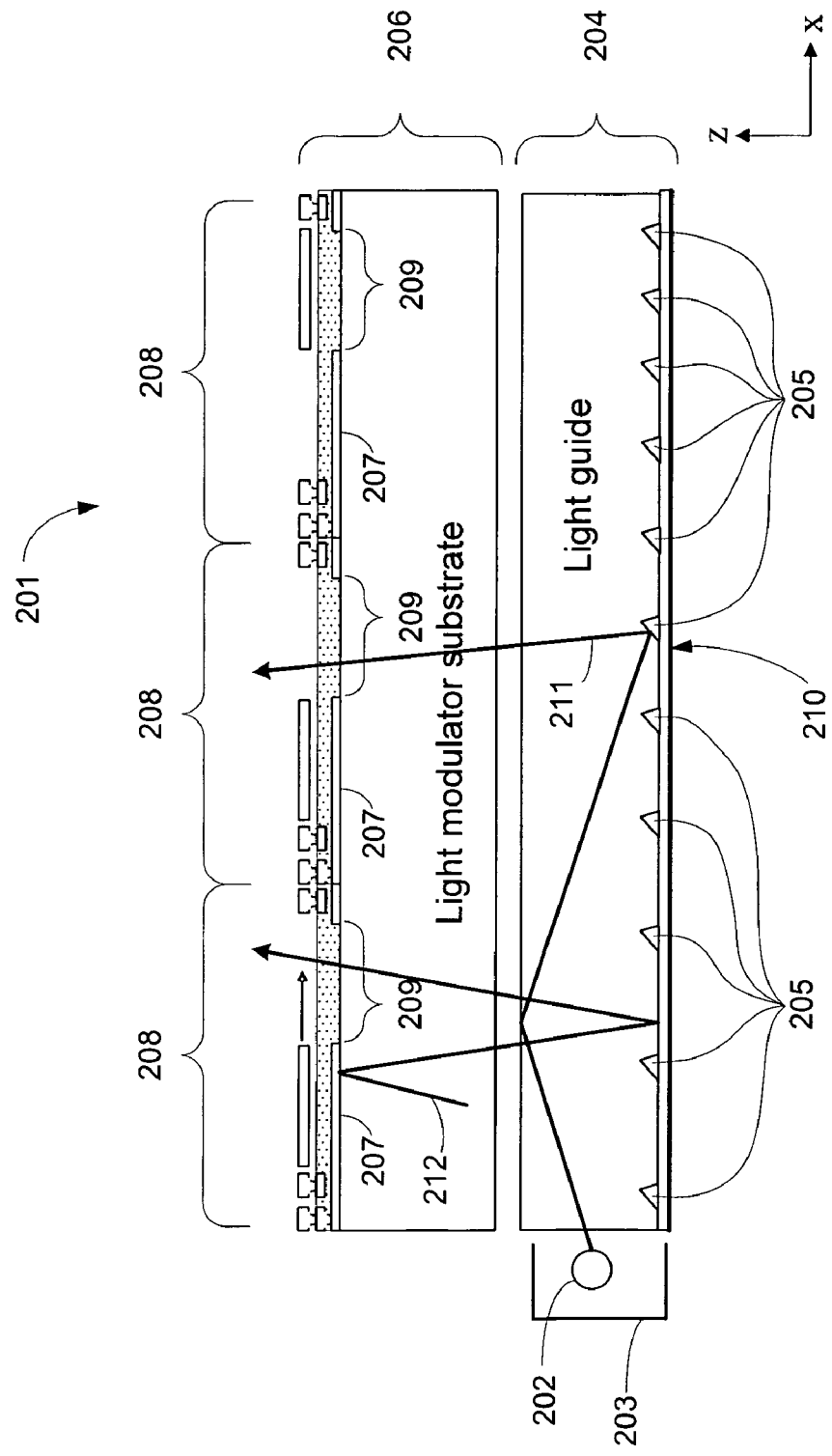
FIG. 2A is a cross sectional view of a display apparatus according to an illustrative embodiment of the invention.

A more efficient method for delivering light to the viewer, that does not depend on the use of diffusive scattering is represented by the display apparatus 201 in FIG. 2A, an illustrative embodiment of this invention. Display apparatus 201 includes a lamp 202, a lamp reflector 203, a light guide 204, a series of extraction elements 205, a light modulator substrate 206, an reflective aperture layer 207, a series of shutter assemblies 208 and a series of apertures 209. The display apparatus also includes a back-reflector 210, which is located in a plane that is substantially parallel to that of the aperture layer 207. Display apparatus 201 does not include a BEF film and it does not include a diffuser layer.

In contrast to display apparatus 101, the extraction elements 205 in FIG. 2 are composed of wedge or prism like deflectors instead of dots made from white paint. The deflectors of FIG. 2 are designed to reflect in specular fashion and are capable of re-directing the light from the lamp 202 more directly to the viewer (see ray 211)—in many cases without the need for any intermediate modulator film such as the BEF film. As with the distribution of paint dots, each deflector 205 is designed to intercept only a small portion of the total light flux that travels through the light guide. In order to ensure uniformity of the output, the deflectors are placed or distributed in a controlled fashion along the light guide, in some cases with a lower density of deflectors 205 near to the lamp source and a higher density of deflectors further from the lamp.

The deflectors 205 of display apparatus 201 are designed to reflect light in predominantly specular fashion, as shown by the deflection of light ray 211. Instead of scattering the light into random directions as is the case with paint dots, the specular deflectors can be designed and oriented to maintain control of the angular divergence of the light as it approaches the apertures, typically with divergences that are narrower than the random or Lambertian distribution of light. Control of angular distributions in a direction favorable to the user is a route to conserving power in the backlight.

When used with a reflective aperture the method of providing directivity illustrated by display apparatus 201 has strong advantages over the display apparatus 150, because it does not include a diffuser. Light, such as light ray 212, which returns to the backlight from the reflective aperture layer, can be reflected in predominantly specular fashion at the back surface of the display and returned for a second pass at apertures 209 without any substantial change in its angle with respect to the normal.

The ability to return, reflect, or recycle light without substantial change to the angle or directivity of the light is a preferred feature for backlights for use with the displays of this invention. In particular, it is advantageous to include a optical cavity that take advantage of particular structural backlight features to preserve the initial angular distribution of light while such light undergoes multiple recycling bounces against a reflective aperture layer. The ability to preserve a particular angular distribution upon reflection is referred to herein as conical reflectance.

Figure 3A:
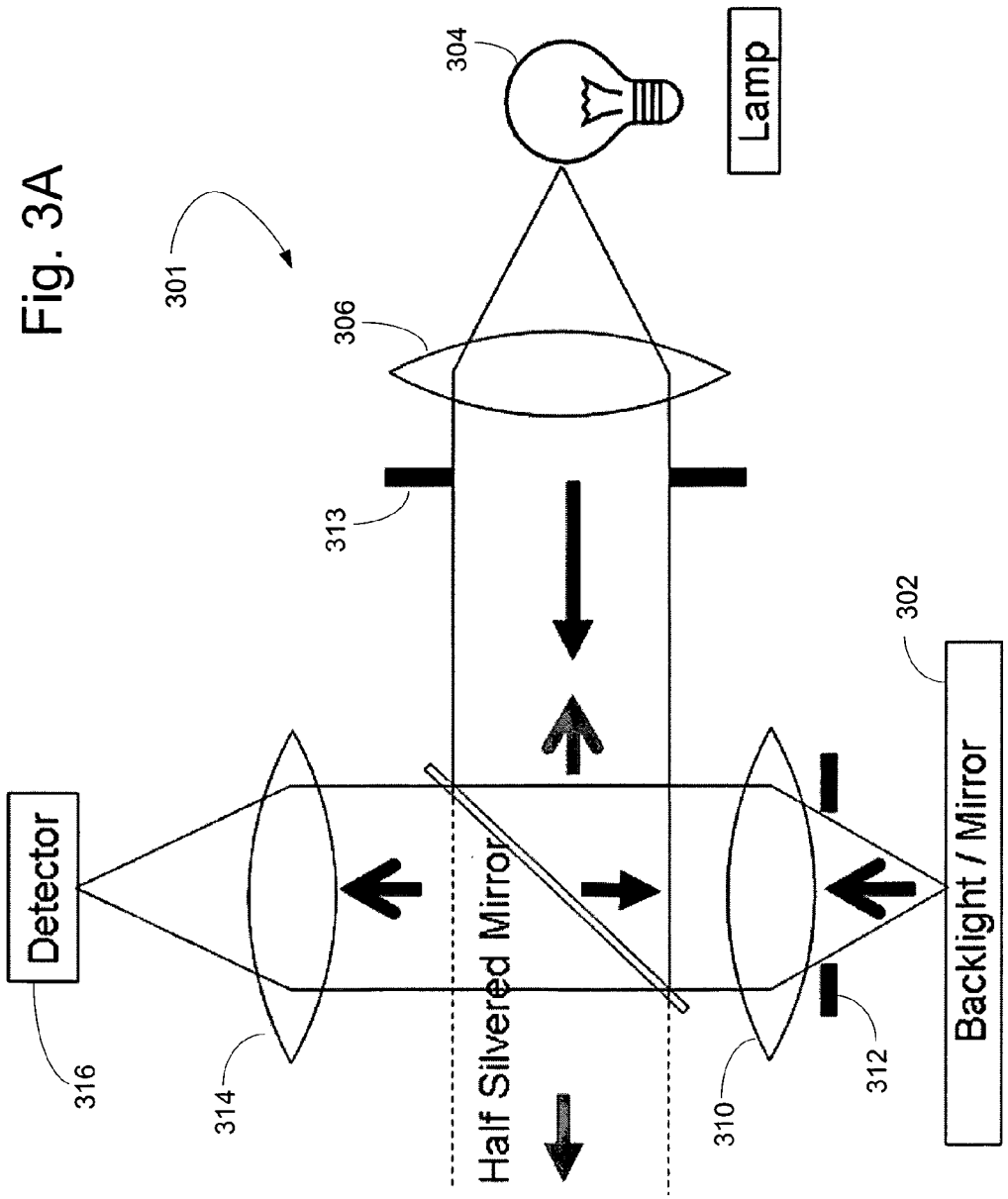
FIG. 3A is a schematic optical layout for the measurement of the property of conical reflectance
Figure 3B:
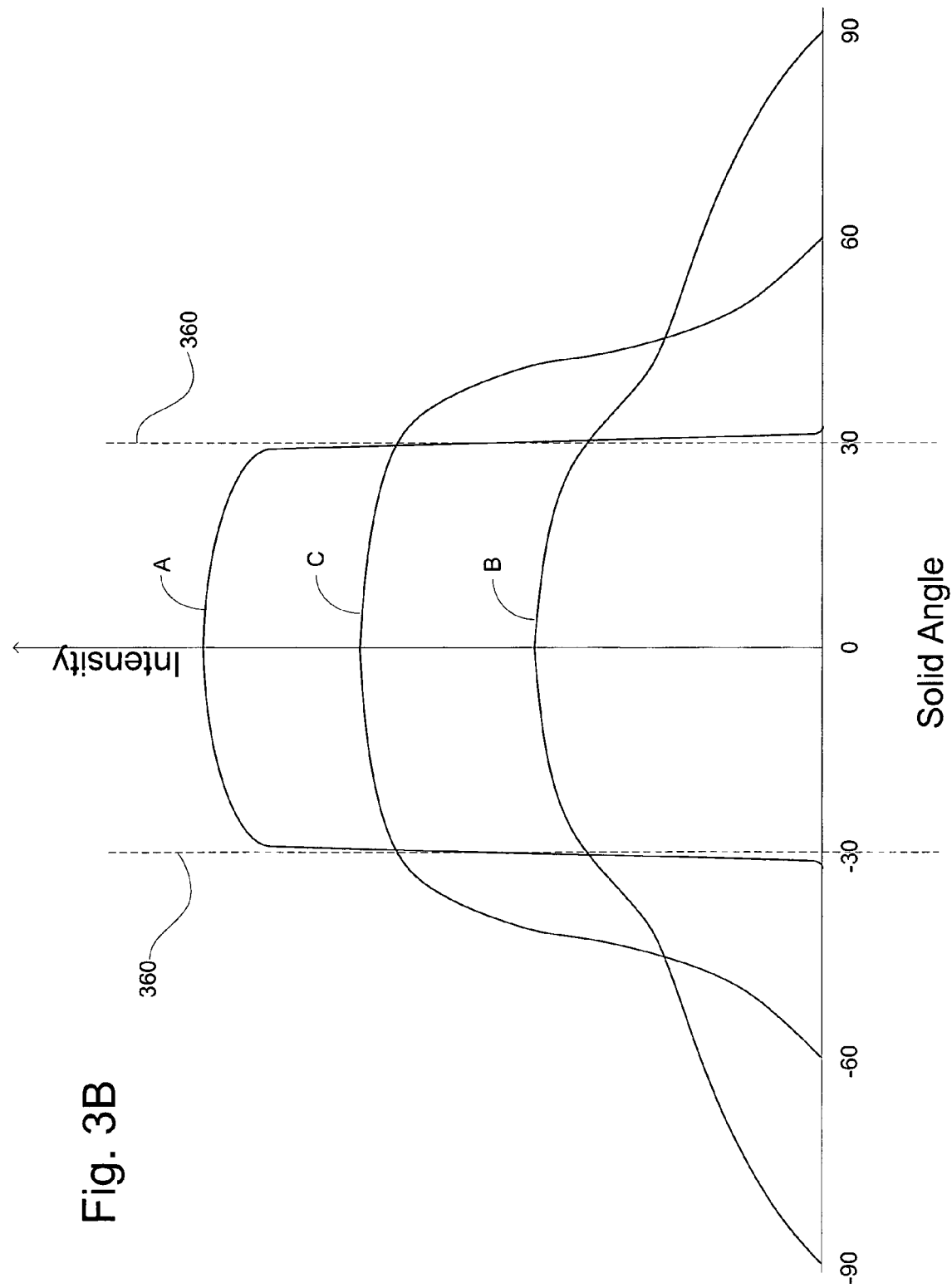
FIG. 3B illustrates the variation in light output intensity from backlights employed in various embodiments of the invention as a function of solid angle.

Conical reflectance is a measurable property of a backlight, as is described with respect to FIGS. 3A and 3B. FIG. 3A shows one possible measurement system 301 that includes a backlight 302 (also known as the device under test), a lamp 304, a collimating lens 306, a half-silvered mirror 308, a concentrating lens 310, an objective aperture stop 312, an illumination aperture 313, a focusing lens 314, and a detector 316. In operation the lamp focuses light onto the backlight through the lens system that includes lenses 306 and 310. The combination of lens 310 and the aperture stop 312 guarantees that only light within a specific angular divergence is allowed to be incident on the backlight. Light will be reflected from the backlight into a variety of angles, but only light with an angular divergence that is less than or equal to that of the incident cone is allowed to pass back through the lens 310 and aperture stop 312. Light that makes its way back through the aperture 312 can then proceed through the half-silvered mirror 308 and be measured at detector 316. The aperture 312 is an adjustable aperture, so that the reflective efficiency of the backlight 302 can be determined in response to a variety of more relaxed or more restrictive cone angles.

More generally, conical reflectance is defined as the ability of the backlight or illumination system to receive an incoming cone of light within a pre-determined range of angles (measured with respect to an incident axis) and then re-emit or reflect that light along an equivalent exit axis where the integrated intensity (or radiant power) of the exit light, measured about the exit axis, is greater than a specified fraction of the integrated incident power. The radiant powers are determined by the integral of the luminous intensity (either incident or exit intensity) over the same pre-determined range of solid angles. The incoming cone of light preferably illuminates an area of the backlight at least 2 mm in diameter and the radiant power is preferably determined by integrating reflected light over a similar or larger area. The pre-determined range of angles will be in some cases 40 degrees about the reference axis, in some cases within 30 degrees, and in still other cases within 20 degrees. The specified fraction (integrated over the pre-determined angles), which is suitable for use in a reflective aperture display will be in some cases greater than 50%, in other cases greater than 70%, in other cases greater than 90%, and in other cases greater than 95% of the integrated incident light. In some embodiments, both the incident axis and the exit axis for the measurement of the conical reflectance will be directed along the normal to the horizontal surface of the backlight.

FIG. 3B is a comparison plot that illustrates the relevance of the conical reflectance test. Curve A in FIG. 3B represents the angular distribution of light from lamp 304 as it is incident upon the backlight 302. In the example, Curve A is similar in shape to that of a truncated Gaussian. Curve B shows the reflective angular distribution as would be measured from an illumination system such as was included in display 150, an illumination system that includes a BEF film in conjunction with a diffuser film. Curve C shows the reflective angular distribution as would be measured from a backlight such as display system 201. For each of curves B and C it is evident that some scattering or broadening of the light distribution has occurred and some loss of integrated intensity has also occurred due to absorption in the backlight. As shown in curve B, however, the display apparatus 150 returns the light with a distinctly broader or more random distribution that that measured in Curve C. When one considers that a typical light ray is reflected multiple times (4 times or more) in a recycling display, one can see how the broadening or degradation of the light distribution shown in Curve B can lead to markedly less brightness when viewed along the display normal as compared to Curve C. The conical reflectances of the backlights of displays 150 and 201 are defined as the integral of curves B and C, respectively, between the angular range indicated by the markers 360. The conical reflectance, when expressed as a fraction of the integrated intensity from the incident light, Curve A, is a direct expression of the useful recycling efficiency from a backlight, or a recycling efficiency that is restrictively defined as the ability to project and maintain a useful cone of light even after multiple recycling events.

The conical reflectance behavior illustrated in FIG. 3B is a backlight property independent of its ability to re-direct light from illumination lamps such as lamp 162 and 202. Both display apparatus 150 from FIG. 1B and display apparatus 201 from FIG. 2A might provide similar angular distributions of light when measured free of any reflective aperture. But the display apparatus 201 from FIG. 2A demonstrates a particular and additional ability to maintain that angular distribution after multiple recycling events, as evidenced by its property of improved conical reflectance.

Light Extraction

FIG. 2B through FIG. 16 describe a number of methods for providing directivity in a backlight without recourse to diffuse scattering, such as would be provided by paint dots 116 or by diffusive films 172. A common element of these alternative implementations is the incorporation of geometrical extraction structures, such as deflectors 205 or the other deflector structures described in FIGS. 2B through 16. Several optical configurations are possible for controlling angular distributions of light in a display apparatus between the lamp and the reflective aperture using such geometrical extraction structures. In one method, illustrated by display apparatus 251 of FIG. 2B, a lamp and lensing system is provided that injects light into the light guide with a particular angular divergence—which is then preserved by predominantly specular reflection and passed through to the apertures. Display apparatus 251 includes a lamp 252, a lamp reflector 253, a light guide 254, a series of specular deflectors 255, a light modulator substrate 256, an aperture layer 257, a series of shutter assemblies 258 and a series of apertures 259. The light guide 254 includes an upper light guide surface 260 and a lower light guide surface 261. The display apparatus also includes back-reflector 262, which is located in a plane substantially parallel to that of the aperture layer 257. The display apparatus 251 includes an injector system 263, which consists of lamp 252 and reflector 253. The injector system 263 is designed to control the angular divergence of the light that enters the light guide 254. This can be accomplished by providing a curved shape to the reflector 253 and by placing the lamp 252 near to the focal point or in the caustic region of the curved reflector 253. The shape of the reflector 253 can be cylindrical, spherical, parabolic, elliptical, hyperbolic, oblate, or any combination of the above shapes. With an appropriate shape to the reflector and focal-placement of the lamp, the injector can emit light with a fixed angular distribution that is more narrow than the Lambertian, for example into an angle that is +/−25 degrees from the x-axis.

For some special geometrical designs, or for certain subsets of the rays produced by the injector 263, the same angular divergence produced by the injector can be preserved through the display apparatus and delivered to the viewer through apertures 259 without alteration. Display apparatus 251 illustrates such a particular set of design guidelines in which:

a) the upper light guide surface 260 and the lower light guide surface 261 are parallel
 b) the back reflector surface 262 and the aperture layer 257 are parallel
 c) all deflectors 255 share the same angle with the horizontal or x-axis of the waveguide The injected light will be contained by total internal reflection inside of the light guide 254 and can only be ejected through an aperture 259 after scattering by one of the deflectors 255, which all present flat deflection surfaces with the same angle of inclination. If we further restrict our consideration to the set of rays that travel within the x-z plane, then the divergence of the rays exiting the apertures 259 will be the same as those leaving the injector 263.

Around the perimeter of the display apparatus 251 are a set of sides or edges 265. Especially in the design of a recycling display it is preferable that these edges be either surrounded by or coated by a reflective metal, so that light that travels the full width of the light guide can be returned by reflection into the light guide.

In practice it is unnecessary and in some cases non-optimum to rigidly adhere to the rules a), b), or c) in the design of a backlight system. For instance a wedge shaped light guide is sometimes preferable to a parallel plate or slab light guide for improving the uniformity of light emitted from apertures 259. Similarly a variety or distribution of deflector (255) angles with respect to the x-axis can be employed to expand and tailor the angular distribution of the emitted light rays to meet user needs. Generally speaking, however, the presence of specular deflectors makes it possible to preserve some aspect or maintain some degree of the collimation provided by the light injector as light rays pass through the display apparatus. Techniques and designs for three dimensional collimation are described further below in relation to FIGS. 10 and 11.

The deflectors 255 are one example of prism-like elements that reflect light in specular fashion. In some embodiments such prisms can be provided with smooth metallic coatings to ensure specular reflection while minimizing absorptive losses. However, a variety of alternate geometrical extraction structures are possible, some of which depend on refraction instead of the reflection to controllably change the propagation direction of the light. Some of these structures include at least one flat and/or facetted surface, others are rounded or curved. All of these structures include surfaces that are smooth and not rough, so as to avoid the random or uncontrolled re-direction of incoming light. Alternate designs for the extraction elements are described below with respect to FIGS. 4-9.

FIGS. 4A and 4B illustrate two reflective prism structures 401 and 451 which are suitable for inclusion in a backlight used to form an improved optical cavity, according to an illustrative embodiment of the invention. Each of these prism structures is molded into the bottom surface of light guides 409 and 459, as were deflectors 255 in display apparatus 251. FIGS. 4A and 4B represent cross sectional views of structures 401 and 451 formed into the light guide. Structures 401 and 451 are in fact are elongated structures that extend both into and out of the field of view of FIGS. 4A and 4B.

Each of the prisms 401 and 451 include a front prism surface, 402 and 452, and a back prism surface 403 and 453. The front prism surface faces the lamp. (The lamp is not shown in FIGS. 4A and 4B, but is situated to the left of the light guide in these figures.) The back prism surfaces 403 and 483 face away from the lamp. Each of the prisms 401 and 451 are connected on both the left and the right to horizontal back-reflective surfaces 404 and 454. A smooth metallic reflective coating 405 and 455 is positioned in direct contact with the backside of each light guide 409 and 459.

Specific points along the back-reflective surface are labeled A, B, and C or A', B', or C' respectively. The arrows 406 and 456 represent light rays that are reflected out of a trajectory internal to the light guide and into a more vertical direction—i.e. out of the light guide, towards the apertures and towards the viewer of the display. The arrows 407 and 457 represent light rays, also following trajectories internal to the light guide, that possess high incident angles with respect to the horizontal and just miss striking the prisms 401 and 451. A shadow zone exists between the points A and B or A' and B' respectively, in which very few light rays traveling away from the lamp will strike the back reflective surface.

The prisms 401 and 451 can be produced as an integral part of plastic light guides by means of injection molding or stamping. The prisms can also be diamond turned or laser machined into glass or plastic. The reflective layers can be added after forming by physical or chemical vapor deposition (including the thin film techniques of evaporation or sputtering). The height and the width of the prisms can range between 5 microns and 300 microns. The front prism surfaces 402 and 452 and the back prism surfaces 403 and 453 are preferably smooth, with roughness limited to a physical dimension that is less than 2 microns, preferably less than 0.5 microns, more preferably less than 0.1 microns.

The back-reflective surfaces 404 and 454 are oriented in a plane that is substantially parallel to the reflective aperture layer (not shown) in the display apparatus. By providing two reflective layers which face each other, light rays such as rays 406 and 456, which are directed out of the light guide and which do not exit an aperture, can get second and third chances for emission out of an aperture after recycling between the reflective layers. By further providing that the back reflective surfaces 404 and 454 are oriented in a plane that is substantially parallel to the reflective aperture layer, the recycled light rays, such as ray 408, can be recycled substantially without any change to their exit angle with respect to the normal to the aperture layer (such normal indicated by the z-axis in FIG. 4A).

To provide for uniform extraction flux out of the light guide it is useful to vary the distance between prisms, i.e. the distance between points A and C or between A' and C', preferably as a function of distance from the lamp. Closer spacing between prisms allows for a higher density of prisms and therefore a higher ratio of extracted light to incident light.

Such variations in prism density can compensate for the variations in incident flux which naturally occurs as a function of distance from the lamp. In terms of extraction efficiency, the area between points A and B, or between A' and B' are often considered dead space. Thus, the preferred minimal practical spacing between prisms is determined by the distance between A and B.

In terms of recycling efficiency, the shape of the reflective surfaces points A and B, or between A' and B' remains an important design consideration. The overall efficiency of the backlight system can be increased with either of the designs shown for prisms 401 or 451. In prism 401 the angle between the reflective surface 405 and the back prism surface 403 is less than the angle formed between the reflected surface 405 and the front prism surface 402. As a result, the area of the horizontal back reflective surface 404 that remains between points A and B is increased. This, in turn, improves the ability of the backlight system to recycle rays, such as light ray 408, without substantial change to the angle of that light ray with respect to the z-axis.

By contrast, prism structure 451 shows an alternative design for increasing the recycling efficiency. Prism 451 is designed to be similar to an isosceles triangle in cross section, where both front prism surface 452 and back prism surface 453 form similar angles to the horizontal back reflective surface 454. The prism 451 is equally efficient at extracting light rays from the light guide regardless of whether the motion of the light ray is from left to right (i.e. away from the lamp) or from right to left (towards the lamp). Furthermore, the prisms 451 are designed to effectively interact with each other so as to increase recycling efficiency. Light ray 458, for instance, is shown striking the left hand prism 451 along a trajectory somewhat parallel to the z-axis after having been recycled from the aperture layer (not shown). This ray is directed by the left hand prism 451 towards the right hand prism 451, where it is re-directed back towards the apertures along a path that is still substantially parallel to the z-axis. Near to prism 451 there still exists a dead area between points A' and B' with respect to illumination from the lamp, and, compared to prism 401, a much smaller percentage of this dead area is now dedicated to the horizontal back-reflective surface 454. However, prisms like prism 451, with shapes near to that of an isosceles triangle, can maintain an ability to efficiently recycle light even if produced at very high densities (for instance even at densities where the distance between A' and C' is less than the distance between A' and B').

FIGS. 5A through 5D illustrate several alternate prism structures 501, 521, 541, and 561 for incorporation into a backlight used to form an improved optical cavity according to an illustrative embodiment of the invention. These can also be produced by plastic injection molding or stamping into light guides 503, 523, 543, and 563. Prism 501 is an inverse shape to that of prism 401, formed generally as a protrusion out of the light guide, and which extends below the horizontal back reflective surface 504. The light guide surfaces associated with each of the prisms 501, 521, 541, and 561 are in direct contact with smooth metallic film coatings 505, 525, 545, and 565 respectively. Light rays 506, 526, 546, and 566 demonstrate how light that traverses within a wave guide can be extracted by reflective prisms 501, 521, 541, and 561 and directed along the normal or z-axis and towards the aperture layer (not shown). In contrast to the structure surrounding prism 401 with its back-reflective surface 404, the prism 501 does not create a shadow zone, and all points along the back-reflective surface 504 are equally likely to intercept and reflect light traversing within the light guide. As a result the prisms 501 can generally be packed to higher densities than prisms 401.

In contrast to prism 501, the prism 521 in FIG. 5B has a cross-sectional shape more similar to an isosceles triangle, with two faces that present similar angles to the horizontal back-reflective surface 524. The prism 521 is equally efficient at extracting light rays from the light guide regardless of whether the motion of the light ray is from left to right (i.e. away from the lamp) or from right to left (towards the lamp).

In contrast to previously discussed prisms, the prism 541 in FIG. 5C has some features that extend both above and below the horizontal back-reflection surface 544, and therefore carries some of the advantages in efficiency and shadowing from each of prisms 401 and 501.

The prism 561 of FIG. 5D has a trapezoidal cross section. The top surface 567 is substantially parallel to the back-reflective surface 564. Both top surface 567 and back surface 564 are capable of reflecting light without substantial change to the angle of the rays with respect to the normal or z-axis in the backlight system. As with the prisms 501, the prisms 561 can be packed very close to each other without efficiency penalties from shadowing effects.

FIGS. 6A through 6D represent another set of geometrical extraction structures 601, 621, 641, and 661 suitable for inclusion in backlights used to form an improved optical cavities, according to an illustrative embodiment of the invention. None of the extraction structures 601, 621, 641, and 661 include any direct contact to metallic coatings such as coatings 405 or 455. The extraction structures 601, 621, 641, and 661 are referred to as refractive prism structures. The prism structures 601, 621, 641, and 661 can formed as integral parts of the light guide by plastic injection molding or stamping. The prisms 601, 621, 641, and 661 deflect light by means of either refraction or total internal reflection. Total internal reflection occurs with 100% reflective efficiency when light is incident on a dielectric interface with angles above a critical angle. The conditions for total internal reflection are easily satisfied for light rays striking the prisms 601, 621, 641, and 661 from within the light guide as long as the index of refraction in 1.3 to 1.7 while the index of refraction in air will be in the range of 1.0 to 1.1.

Each of the prism structures 601, 621, 641, and 661 has associated with it a back-reflective surface 604, 624, 644, and 664 respectively. The back reflective surface can be formed from either a metallic surface or from a dielectric mirror. (A dielectric mirror is comprised of multiple thin film dielectric layers whose thickness and refractive indices have been tuned so as to maximize the reflection of light from the surface.) Hybrid reflectors can also be employed, which include one or more dielectric layers in combination a metal reflective layer. The back reflective surfaces 604, 624, 644, and 664 can be separated from the light guides by an air gap. The back reflective surfaces 604, 624, 644, and 664 are oriented in a plane that is substantially parallel to the reflective aperture layer (not shown) in the display apparatus.

FIG. 6A illustrates the effect of prism 601 on two different light rays that intersect the prism 601 after traversing within the light guide 602. Light ray 605 illustrates a ray that is totally internal reflected by prism 601 and is thereby re-directed into an angle closer to the normal or z-axis, i.e. out of the light guide, towards the apertures and towards the viewer of the display. Light ray 606 illustrates a ray that is refracted at the interface between the light guide 602 and the outside medium. Light ray 606 is subsequently reflected from back reflective surface 604 and re-inserted into the light guide. After re-insertion, the light ray 606 will no longer meet the condition for total internal reflection at the upper surface of the light guide 602 and will be extracted for travel toward the aperture layer.

The shape of refractive prism structures 601 and 621 are the inverse of each other. Prism 621 is formed generally as a protrusion out of the light guide 622, and which extends below the horizontal plane of the light guide 622. Light ray 626 is refracted by prism 621 and after reflection from the back reflective surface 624 it becomes available for extraction out of the top surface of the light guide. Both prisms 601 and 621 have cross-sectional shapes that are similar to isosceles triangles, with two faces that present similar angles to the horizontal surface of the light guide. The prisms 601 and 621 are equally efficient at extracting light rays from the light guide regardless of whether the motion of the light ray is from left to right (i.e. away from the lamp) or from right to left (towards the lamp). The refraction from prisms 621 will not suffer from shadowing effects and can therefore be produced at higher densities than the prisms 601.

The prism 641 is produced with a front prism face 643 and a back prism face 645. The front prism face 643 generally faces in the direction of the lamp (not shown). The front prism face 643 generally forms a lower angle (65 degrees or less) with respect to the horizontal surface of light guide 642 while the back prism face 645 generally forms an angle greater than 65 degrees with respect to the horizontal surface. The shape of prism 641 helps to control the direction of the refracted light rays. Light ray 648 will be totally internal reflected, while light ray 649 will be refracted by the prism 641. Light ray 649, however is returned to the light guide without ever intersecting the back reflective surface 644. Light ray 649, therefore, can be returned to the light guide without any absorptive loss of intensity.

Figure 6C:
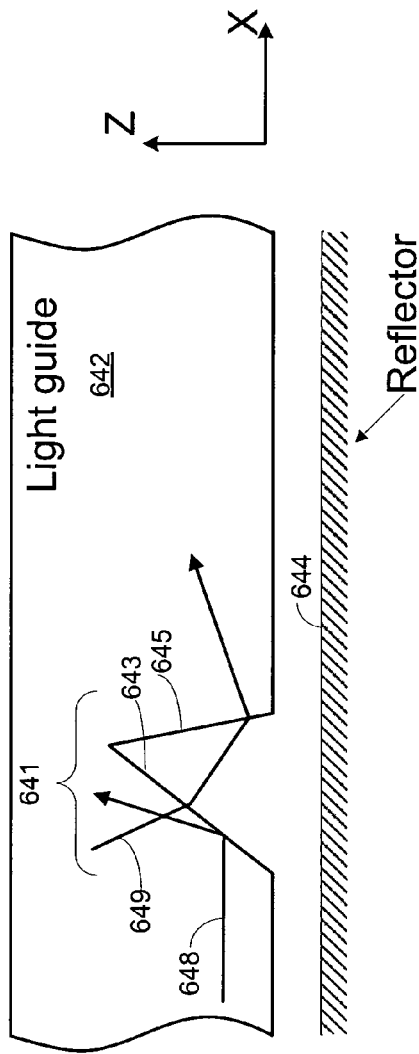
Figure 6D:
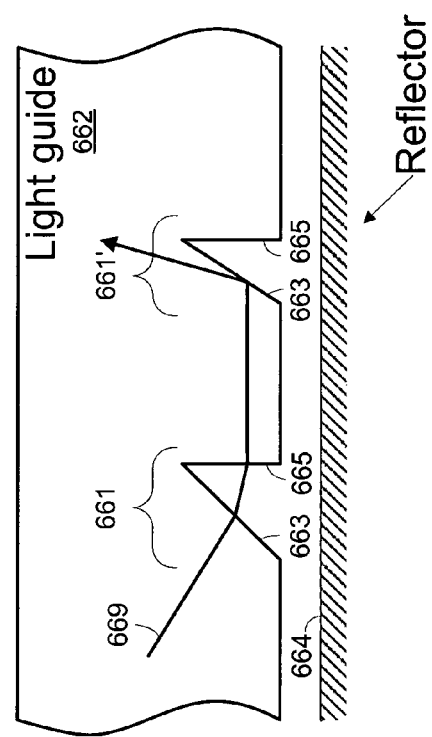

FIG. 6D illustrates the effect of two refractive prism structures 661 and 661' that are placed in close proximity to each other. Both of these prism structures are formed with front prism faces 663 and back prism faces 665, which form different angles with respect to the horizontal surface of the light guide 662. Light ray 669 is refracted by prism 661 and then returned to the light guide at an angle much more parallel to the horizontal surface. Light ray 669 is subsequently total internal reflected from prism 661' and thereby directed into an angle closer to the normal or z-axis, i.e. out of the light guide, towards the apertures and towards the viewer of the display.

FIG. 7A illustrates a display apparatus 701, according to an illustrative embodiment of this invention. Display apparatus 701 features a wedge-shaped light guide 702 that includes a terraced rear surface 703. Display apparatus 701 also includes a lamp 710, a lamp reflector 711, a light modulator substrate 713, an aperture layer 714, a series of shutter assemblies 715 and a series of apertures 716. The distance between the shutter assemblies 715 and the aperture layer 714 is less than the thickness of the light modulator substrate 713. The display apparatus also includes back-reflector 709, which is located in a plane substantially parallel to that of the aperture layer 714.

Figure 7C:
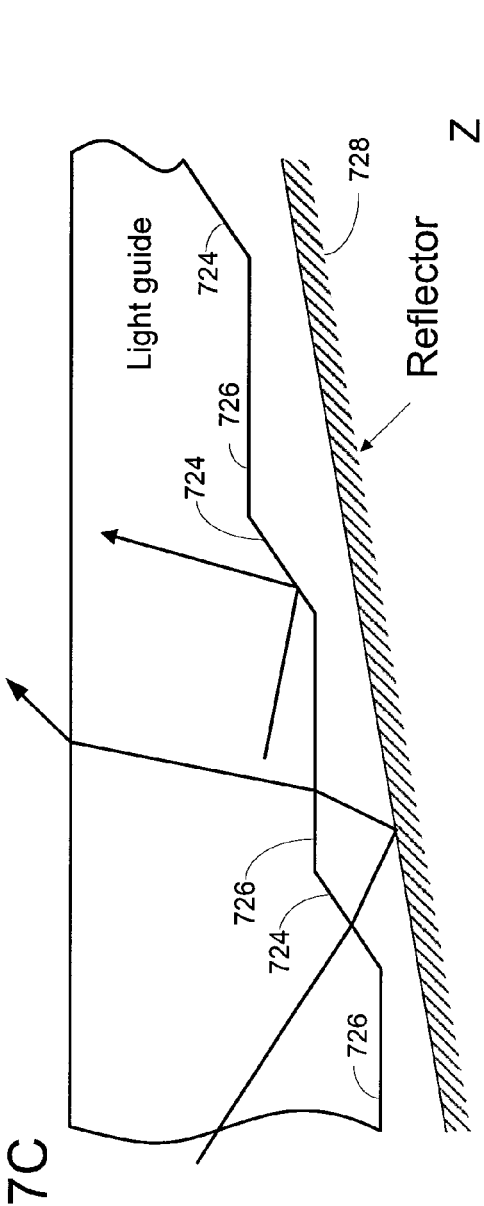
Figure 7D:
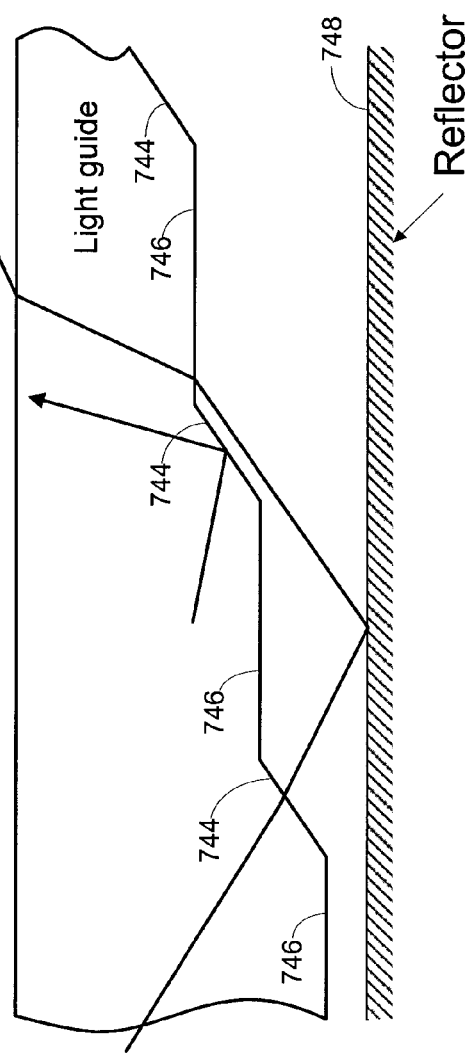

FIGS. 7B through 7D represent alternate geometrical extraction structures that can be employed with the terraced rear surface of light guide 702. As shown in FIG. 7B the bottom portion of the wedge light guide 702 includes a parallel set of angled or faceted surfaces 704 that separate terraces 706 in the light guide 702. The angled surfaces 704 are oriented to deflect or extract light from the light guide 702. The terraces 706 are oriented substantially parallel to the aperture layer (not shown) while the angled surfaces 704 are oriented at an angle to the aperture layer. The light ray 707 that traverses within the light guide 702 is reflected by the angled surfaces 704 and thereby directed into an angle closer to the normal or z-axis, i.e. out of the light guide, towards the apertures and towards the viewer of the display. The recycled light rays, such as ray 708, if impacting a terrace 706, are recycled substantially without any change to their exit angle with respect to the normal to the aperture layer (such normal indicated by the z-axis in FIG. 7B).

As compared to prism structures 401 or 451, the terraced structure shown for light guide 702 does not suffer from any shadowing between faceted surfaces 704 which might otherwise limit the extraction efficiency in the structure or limit the spacing possible between the facets 704.

The angled surfaces 704 and terraces 706 are in intimate contact with a smooth metal layer 709, which acts as a reflection surface for light rays 707 and 708.

FIG. 7C shows an alternate embodiment to the bottom portion of a wedge light guide. FIG. 7C includes angled surfaces 724 and terraces 726 oriented similarly with respect to the aperture layer as angled surfaces 704 and terraces 706. Angled surfaces 724 and terraces 726, however, are not in intimate contact with a smooth metal later. Instead angled surfaces 724 and terraces 726 are separated by a gap that includes a dielectric constant less than that of the wedge light guide such that the reflections from angled surfaces 724 and terraces 726 might occur by total internal reflection. Associated with angled surfaces 724 and terraces 726 is a back reflective surface 728. The back reflective surface 728 can be formed from either a metallic surface or from a dielectric mirror. (A dielectric mirror is comprised of multiple thin film dielectric layers whose thickness and refractive indices have been tuned so as to maximize the reflection of light from the surface.) Hybrid reflectors can also be employed, which include one or more dielectric layers in combination a metal reflective layer. The back reflective surfaces 728 can be separated from the light guides by an air gap. The back reflective surfaces 728 is oriented in a plane that is parallel to the average orientation of the angled surfaces 724 and terraces 726.

FIG. 7D shows an alternate embodiment to the bottom portion of a wedge light guide. FIG. 7D includes angled or faceted surfaces 744 and terraces 746 oriented similarly with respect to the aperture layer as surfaces 704 and 706. Angled surfaces 744 and terraces 746, however, are not in intimate contact with a smooth metal later. Instead angled surfaces 744 and terraces 746 are separated by a gap that includes a dielectric constant less than that of the wedge light guide such that the reflections from surface 744 and 746 might occur by total internal reflection. Associated with angled surfaces 744 and terraces 746 is a back reflective surface 748. The back reflective surface 748 can be formed from either a metallic surface or from a dielectric mirror. Hybrid reflectors can also be employed, which include one or more dielectric layers in combination a metal reflective layer. The back reflective surfaces 748 can be separated from the light guides by an air gap. The back reflective surfaces 748 is oriented in a plane that is substantially parallel to the reflective aperture layer 709 in the respective backlight systems.

Refractive structures such as prism structures 601, 621, 641, and 661 can also be effective if located on the top surface of the light guide, i.e. the surface directly opposed to the aperture layer. FIGS. 8A and 8B illustrate top surface prism structures 801 and 821 which can be incorporated into light guides 802 and 822 used to form part of an improved optical cavity, according to an illustrative embodiment of the invention. These prism structures operate exclusively by refraction, with reflections avoided at all prism faces. The prism 801 in FIG. 8A includes a front prism surface 803, which faces the lamp and a back prism face 805. The horizontal top surface of the light guide is indicated in each figure by 804 and 824 respectively. The same geometrical variations illustrated with respect to prism structures 401, 451, 501, 521, 541, 561, 601, 621, 641, and 661, without limitation, are also useful when located along the top surface. For instance the prism can extend above the top horizontal surface of the light guide (as with prism 821 and surface 824) or it can extend below the top horizontal surface (as with prism 801 and surface 804). The prism can have a shape similar to an isosceles triangle, with similar angles between the faces and the horizontal surface (as with prism 821) or it can have faces that form very different angles with the top horizontal surface (as with prism 801). The front prism surface 803 of prism 801 forms an angle that is greater than 65 degrees to the horizontal surface 804.

Light rays 806 and 826 show illustrative paths for light rays that intersect the top surface prism structures 801 and 821 after traversing within the light guides 802 and 822 respectively. For both prism structures 801 and 821 the light guide has a refractive index of n1 while the surrounding medium has an index of n2. The index n1 is larger than n2. In contrast to reflective prism structures 401, 451, 501, or 521, the refractive prism structures 801 and 821 do not have a mechanism to re-direct light out of the light guide and into an angle closely parallel to the z-axis or directly toward the viewer. The range of angles of light extracted from the light guide is still narrow but generally directed toward angles that are more than 20 degrees from the normal to the horizontal plane 804 or 824. As will be described with respect to FIGS. 13-15 these off-axis rays can be re-directed along the normal by means of prism sheets, sometimes referred to as turning films.

Figure 8C:
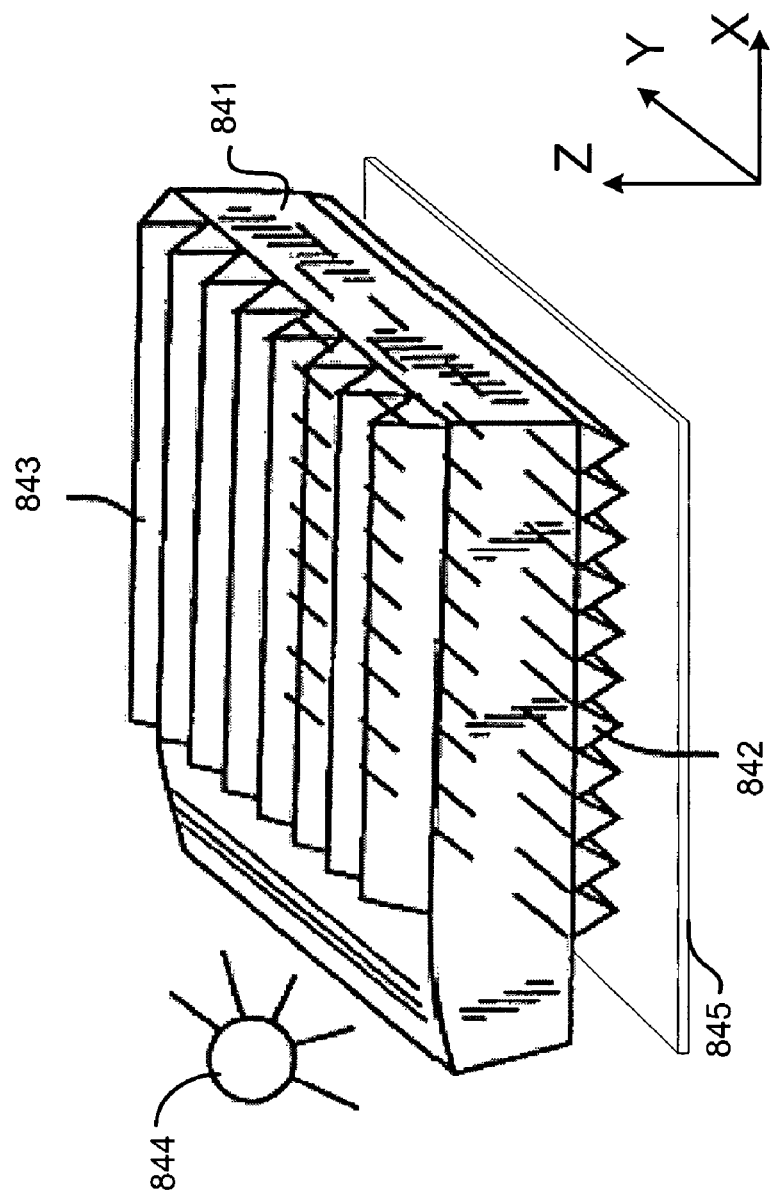
FIG. 8C is an isometric view of a light guide for use in a display apparatus according to an illustrative embodiment of the invention.

FIG. 8C illustrates a light guide 841 that includes both a set of bottom prism structures 842 as well as a set of top prism structures 843, both of which contribute to an improved optical cavity according to an illustrative embodiment of the invention. The optical cavity also includes a lamp 844, shown immediately to the left of light guide 841, and a back reflective surface 845 which is substantially parallel to the reflective aperture layer (not shown). The series of bottom prism structures 842 have shapes that are similar to the refractive prism structure 621. The top prism structures 843 have shapes similar to prism 821. The prisms in structures 842 and 843 are oriented along perpendicular axes, which helps to re-direct any light extracted out of the light guide toward the vertical or z axis regardless whether the original directions were oriented along either the x or y axes.

Figure 9A:
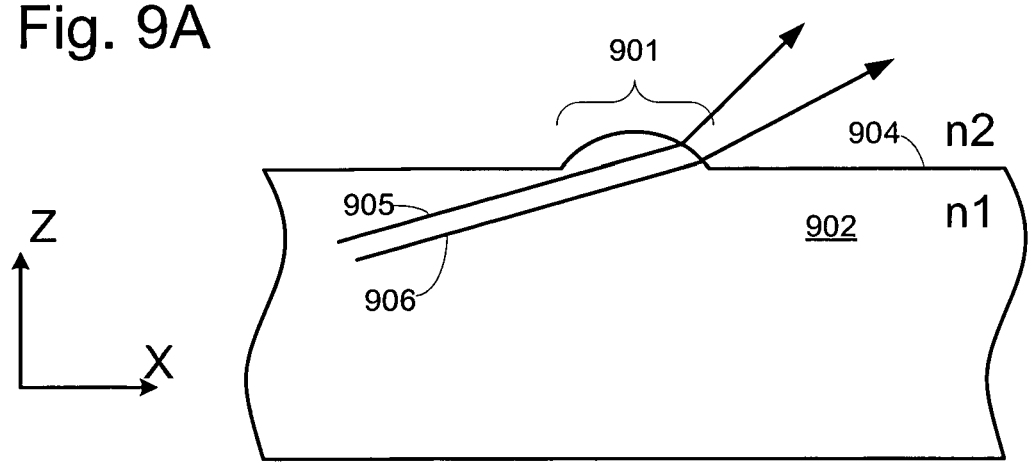
FIGS. 9A-9C are cross sectional views of portions of a light guide along with their associated front-facing reflective layers for use in a display apparatus according to an illustrative embodiment of the invention.

The geometrical extraction structures described to this point have included flat surfaces and faceted faces. Extraction structures 901, 921, and 941 shown in FIGS. 9A through 9C, however, are characterized by rounded or curved surfaces. Such structures are also suitable for inclusion in backlights used to form part of an improved optical cavity according to illustrative embodiment of the invention. Extraction structure 901 of FIG. 9A is provided as a refractive structure in the top surface of light guide 902. The light guide has a refractive index n1 that is greater than that of the outside medium n2. The rounded extraction structure 901 extends above the horizontal surface 904. FIG. 9A shows two light rays 905 and 906 that enter the extraction structure on parallel paths but then leave the light guide on divergent paths. In performing the function of extracting light from a light guide, therefore, rounded structures may increase the angular distribution of extracted light rays as compared to the angular distribution provided by the lamp and injector. In an alternative to extraction structure 901, rounded extractors are also possible which do not protrude above the horizontal surface 904 but are indented instead below the top horizontal surface of the light guide.

Figure 9B:
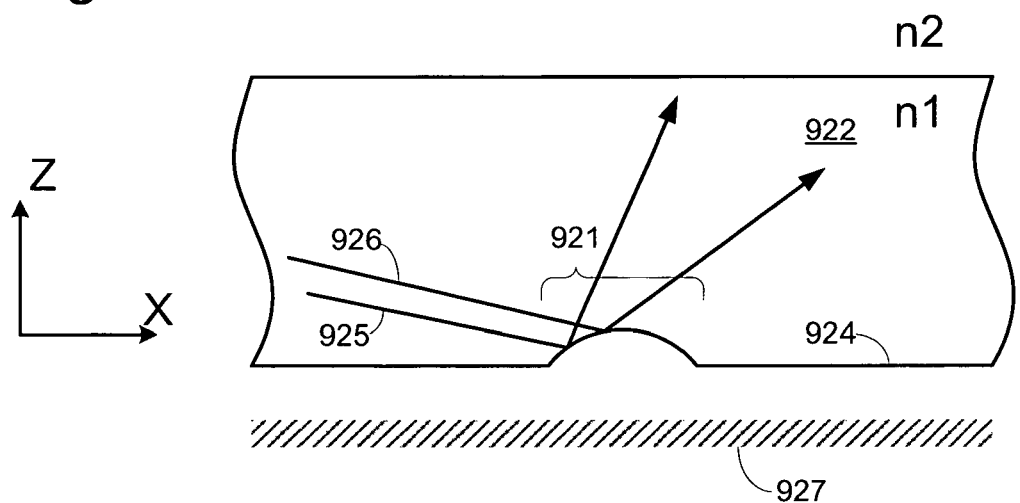

Rounded extraction structure 921 in FIG. 9B is another example of a non-flat geometrical extraction structure. The rounded structure 921 is molded or stamped into the bottom surface of the light guide 922, extending above the horizontal surface 924. The rounded structure 921 is illustrated as a refractive structure, with no metallic coating in intimate contact with the light guide surface. The light guide has a refractive index n1 that is greater than that of the outside medium n2.

FIG. 9B shows two light rays 925 and 926 which are total internally reflected by the rounded extraction structure 921. These two rays encounter the rounded structure on parallel paths but exit after reflection on divergent paths. Both of these paths have now acquired an angle sufficient for extraction from the top surface of the light guide (not shown). As with extraction structure 901, the rounded extraction structure 921 may increase the distribution of angles in extracted light as compared to the injected light.

Associated with rounded extraction structure 921 is a back reflection surface 927. The back reflective surface 927 can be formed from either a metallic surface or from a dielectric mirror. Hybrid reflectors can also be employed, which include one or more dielectric layers in combination a metal reflective layer. The back reflective surfaces 927 is separated from the light guides by an air gap. The back reflective surfaces 927 is oriented in a plane that is substantially parallel to the reflective aperture layer (not shown) in the display apparatus. An alternative structure, in which light guide is conformally coated with a metal may also be employed. For those embodiments in which the horizontal light guide surface 924 is conformally coated with a metal, then the horizontal surface 924 acts as the back reflecting surface.

Figure 9C:
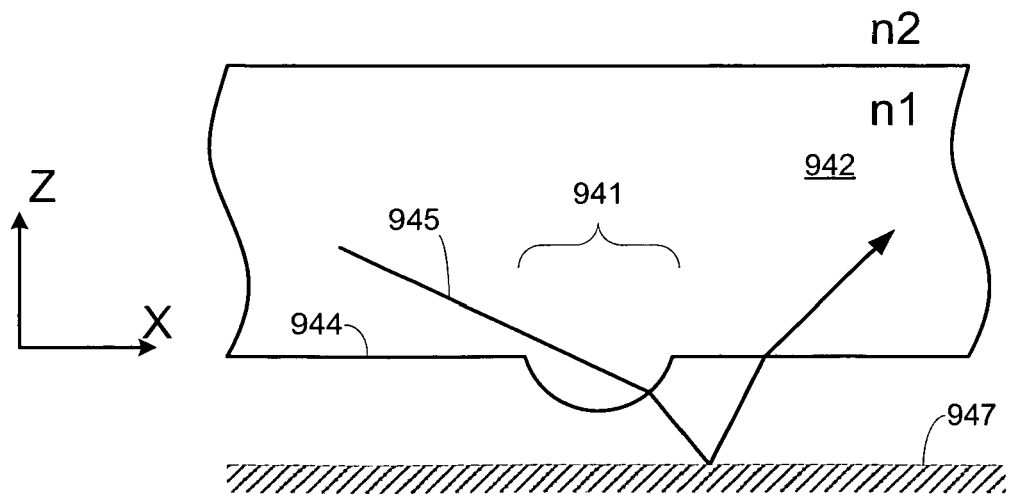

Rounded extraction structure 941 in FIG. 9C is another example of a non-flat geometrical extraction structure. The rounded structure 941 is molded or stamped into the bottom surface of light guide 942, extending below the horizontal surface 944. The rounded structure 941 is illustrated as a refractive structure, without any metallic coating in intimate contact with the light guide surface. The light guide has a refractive index n1 that is greater than that of the outside medium n2.

FIG. 9C shows a light ray 945 which is refracted by the rounded structure 941 out of the light guide, whereupon it is reflected off of a back reflective surface 947, which is similar in construction and orientation to back reflective surface 927. The light ray 945 is then returned to the light guide where it is now on a trajectory to be extracted out of the top surface of the light guide.

The geometrical extraction structures described with reference to FIG. 5 through 9 above can be flat and faceted or round in shape. In all cases, however, it is preferable that at least a portion of the geometrical extraction surface be an optically smooth surface to avoid the onset of random or diffuse optical scattering from the surface. Perfect smoothness or flatness is not required; but residual surface roughness is preferably limited to a physical dimension that is less than 2 microns, preferably less than 0.5 microns, and more preferably less than 0.1 microns.

3 Dimensional Collimation—Using Lamps and Injectors

Analysis of light rays to this point has taken into consideration only light rays that traverse within a single plane, for instance the x-z plane shown in FIG. 2B. In three dimensions, however, the analysis of light ray trajectories is considerably more complicated. Rays from the lamp 252 traveling in the x-y plane which are not parallel to the x-axis (i.e. having angular components that move into or out of the page in FIG. 2B), will reflect off of deflectors 255 and exit the light guide at considerably more oblique angles to the normal or z-axis. If all deflectors 255 are restricted to tilt angles contained within the x-z plane, the distribution of exit angles from the apertures can be highly asymmetric, with a tight control of the angular distributions being established in the x-z plane, but with little or no (even Lambertian) distributions remaining along the y-z plane.

In order to provide a narrow distribution of intensity, for tilts into any azimuth angle from the normal or pole to the exit apertures, it is advantageous to consider additional means for collimating the light within the backlight system. Such collimation can be achieved by adding further collimation capability to the design of the lamp or injector assembly, by providing a shape or arrangements of deflectors which match the radiation pattern from the lamp, or by inserting a collimation means between the light guide and the array of apertures. Each of these options will now be considered in sequence.

FIGS. 10A through 10D show four arrangements for collimating the light injected into a backlight used to form part of an improved optical cavity according to an illustrative embodiment of the invention. The backlight system 1001 in FIG. 10A includes a plurality of lamps 1002, each associated with an optional back reflector 1003 and a curved reflector 1004, and a light guide plate 1005. The lamps 1002 plus reflectors 1003 and 1004 together constitute a light injector 1006. Light rays such as rays 1008, exiting the lamps 1002, after reflecting from the back-reflector 1003 and from the curved reflectors 1004 enter the light guide 1005 substantially collimated with respect to the x-axis. The divergence of the rays exiting the curved reflectors can be controlled within +/−50 degrees and in some cases into a divergence as narrow as +/−20 degrees.

The curves used in the curved reflector 1004 can include arcs that approximate a circle, a parabola, an ellipse, a hyperbola, or any combination of the above. The curvature of reflector 1004 is manifest in cross sections taken along the x-y plane as well as in cross sections taken along the x-z plane. Taken in 3 dimensions, the curvature of the curved reflectors 1004 can be considered as a surface section of a parabolic or elliptical cylinder, a section of a sphere, or a section of a torus. The lamps 1002 are placed near to the focal point or within the caustic region of the curved reflector 1004.

The curved reflectors 1004 can be formed from sheets of smooth metal that are placed in front of the lamps 1002, or the curved reflectors 1004 may be formed by thin metal films that are added as coatings on the outside edge of a molded light guide 1005.

The light guide 1005 includes an array of deflectors 1010. The deflectors 1010 are arranged with their ridges parallel to the y-axis, that is: the normal to their flat surfaces are contained within the x-z plane. The deflectors 1010 are formed on the bottom surface of light guide 1005 and are similar in shape to prism 451. Any of the prisms 401, 501, 521, 541, 561, 601, 621, 641, 661, 801, 821, 841, 901, 921, 941, without limitation, or terraced facets such as 704 can be substituted for prism 451 for use in light guide 1005. The deflectors 1010 are arranged with unequal spacing in the light guide 1005. The closer spacing at distances further from the injector 1006 helps to provide uniformity of emitted light.

The deflectors 1010 are generally oriented parallel to each other along the y-axis. In alternative embodiments the deflectors could have a curved or wavy aspect, where the general or average orientation is along the y-axis.

The backlight system 1001 is an example of a backlight in which 3-dimensional control of angular divergence is established primarily by means of collimation from the light injector 1006. The angular divergence provided by the injector can be considered along two perpendicular planes, the x-z plane and the y-z plane, with divergence angles α1 and α2 respectively. Assuming perfect specular reflection from deflectors 1010, and the other parallelism conditions a), b), and c) listed under FIG. 3, then the maximum divergence out of an aperture will be given by $$\sin^2(\alpha) = \sin^2(\alpha 1) \text{ and } \sin^2(\alpha 2) \qquad \text{Eqn. 1:}$$

In practice, however, the divergence alpha measured from the normal to an aperture can be either more or less than that of Eqn. 1 for the some of the following reasons.

1. Shadowing between deflectors 1010 will typically reduce the range of emitted angle along the x-z plane.
2. Light that is extracted by refraction (see for example FIG. 6A) will typically emit a subset of rays into a range of angles very different from what is achieved by pure reflection and closer to the plane of the light guide.
3. Light that is extracted by rounded surfaces tends to appear in a greater range of angles, but which nevertheless remain concentrated near to the plane of the light guide.

The backlight system 1021 of FIG. 10B is another example of a backlight in which 3-dimensional control of angular divergence is established primarily by collimation out of a light injector 1026. The backlight system 1021 in FIG. 10B includes a plurality of lamps 1022, each associated with a collimator 1024 and a light guide plate 1025. The lamps 1022 plus collimators 1024 together constitute the light injector 1026. Light rays, such as light rays 1028, exiting the lamps 1022, are reflected from the sides of the collimators 1024 and then enter the light guide 1025 substantially collimated with respect to the x-axis. The divergence of the ray's exiting the curved reflectors can be controlled within +/−50 degrees and in some cases into a divergence as narrow as +/−20 degrees.

The collimators 1024 are in the shape of a curved funnel or cone, with a narrow opening nearest to the lamp 1022 and the wider opening facing the light guide 1025. While the funnel shape shown for collimators 1024 is evident only in the x-y cross-sections, in other embodiments the funnel shape can exist in 3-dimensions, where the funnel shapes are also evident in cross sections in the x-z plane. Alternatively, the injector can include both a curved reflector in the x-z plane, such as reflector 253 in FIG. 2B and a funnel shape as shown in collimators 1024. Certain curved shapes for the walls in collimators 1024 are known to increase the throughput efficiencies of the collimators. Such shapes are known in the art as compound parabolic collimators, CPCs (or sometimes known as compound parabolic concentrators). Many CPCs known in the art are formed as paraboloids of revolution, but collimators appropriate for application in backlight system 1021 may have a more elliptical cross section in the y-z plane, with a wider axis parallel to the y axis.

The collimators 1024 can be formed from bent or stamped metal, or they can be formed by coating of thin metal films on the surfaces of a molded light guide. Alternatively, the surfaces of the collimators 1024 need not be metallized at all as many CPC designs work efficiently by employing total internal reflection from the interface of a molded light guide and its surrounding medium with lower refractive index.

Both of the injectors 1026 and 1006 include multiple lamps 1022 and 1002, in the former case collimated by CPC structures, in the latter case collimated by curved mirrors. In an alternative embodiment, a series of lamps can be collimated by a series of refractive lenses, including Fresnel lenses, which also include the more efficient class of TIR Fresnel lenses.

The light guide 1025 includes an array of deflectors 1030, formed on the bottom surface of light guide 1025. The deflector 1030 is a 3-dimensional object. The cross section through the narrow dimension of the deflector 1030 is a trapezoid, and therefore similar to prism 661. The cross section of deflector 1030 along the longer axis is also a trapezoid, but with a much longer top surface. The deflector 1030 has an aspect ratio in length to width greater than 2:1, in some cases greater than 20:1. All of the deflectors 1030 are arranged with their long axes parallel to the y-axis, that is: the normal to the deflecting surfaces are contained within the x-z plane. The deflectors 1030 are arranged with unequal spacing in the light guide 1005. The closer spacing at distances further from the injector 1006 helps to ensure the uniformity of the emitted light.

While the cross section of deflector 1030 is similar to prism 661, similar 3-dimensional objects can be formed with cross sections similar to any of the prism structures 401, 451, 501, 521, 541, 561, 601, 621, 641, 801, 821, 841, 901, 921, or 941 without limitation.

The surfaces of deflectors 1030 present a truly 3-dimensional curvature to the incoming light, while the surfaces of deflectors 1010 behave as simple planar objects. Because of the 3-dimensional shape of the deflectors 1030, and given the less than perfect collimation of light as inserted by the injector 1026, some scattering of light will occur from faces of the deflector whose normal does not lie in the x-z plane. As a consequence, in comparison to backlight system 1001, the divergence angle for light exiting apertures of system 1021, as measured with respect to the z-axis, will be considerably broader. The finite dimensions of deflectors 1030, however, also allow for a much more refined placement and variation in their density along the bottom of light guide 1025. The emission of light from the light guide 1021 can therefore be engineered for a higher degree of uniformity than is possible in light guide 1001. The positions of the deflectors 1030 can also be randomized, since a regular or periodic placement of deflectors 1030 can lead to moire fringes or illumination artifacts in the display.

Figure 10A:
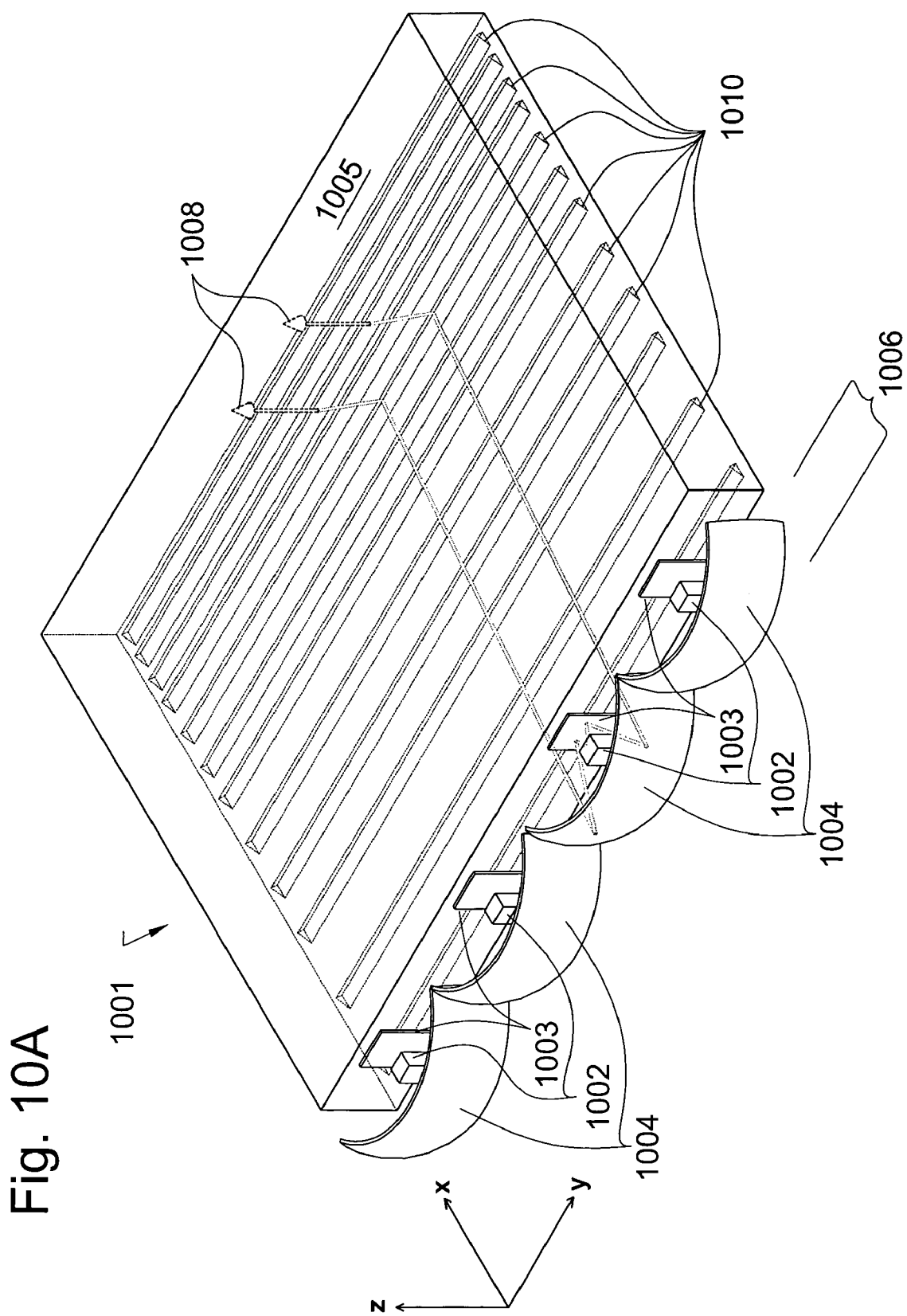
Figure 10C:
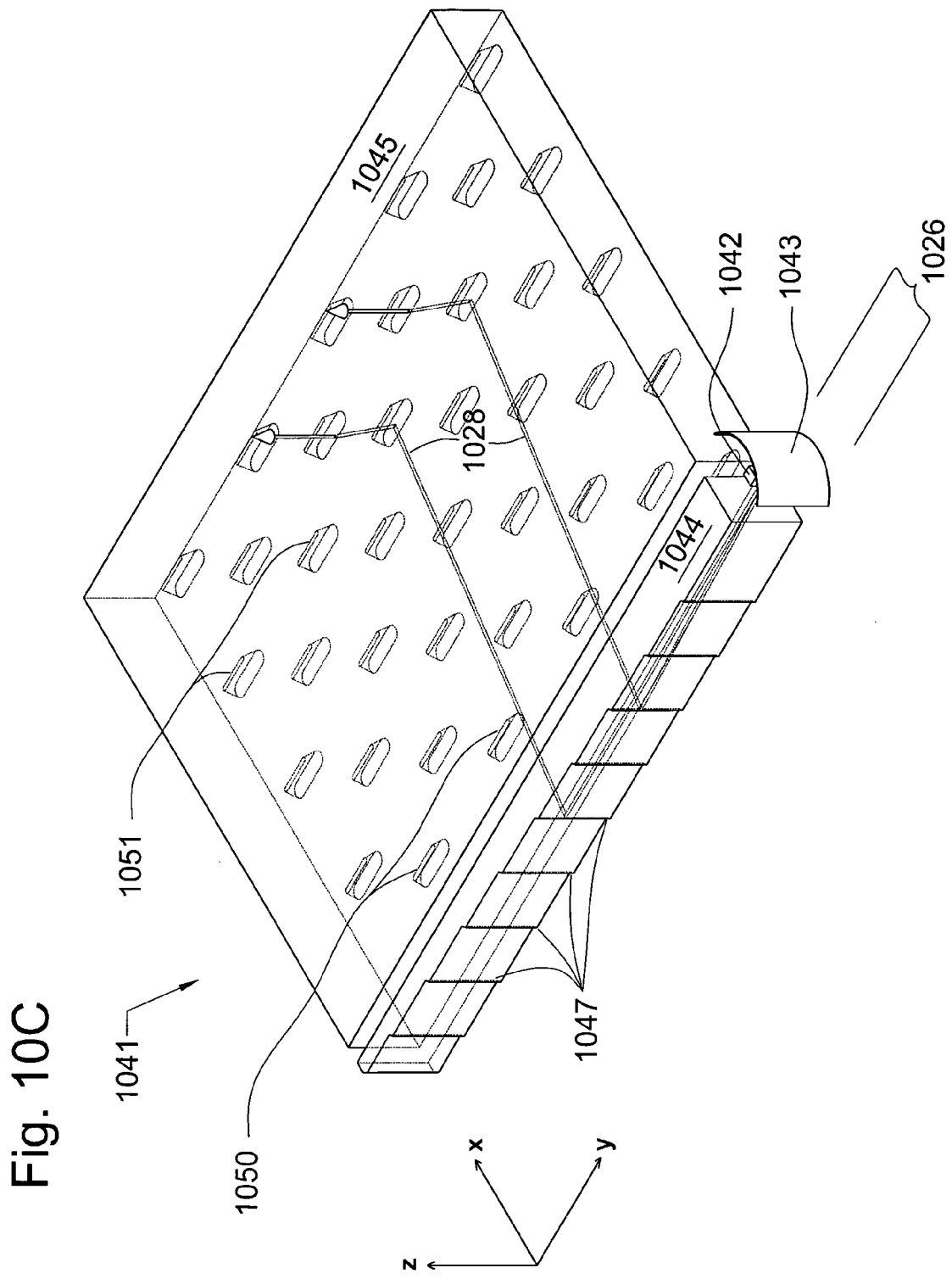

The backlight system 1041 of FIG. 10C is another example of a backlight in which 3-dimensional control of angular divergence is established primarily by collimation of light out of a light injector 1046. The backlight system 1041 in FIG. 10C includes a plurality of lamps 1042, and an optional curved reflector 1043, which are placed together at the end of a beam expander 1044. The lamps, reflector, plus beam expander together constitute the light injector 1046. The backlight system also includes light guide plate 1045. Light rays such as light rays 1048, exiting the lamps 1042, are reflected from facets in the sides of the beam expander 1044 and then enter the light guide 1045 substantially collimated with respect to the x-axis. The divergence of the rays exiting the injector 1046 can be controlled within +/−50 degrees and in some cases into a divergence as narrow as +/−20 degrees.

When viewed as a cross section in the x-y plane, as shown in FIG. 10C, the beam expander 1044 has a shape that is similar to the shape shown for wedged light guide 702 in FIGS. 7A and 7B. The beam expander 1044 includes deflectors 1047 which re-direct light which travels principally along the y-axis into light that is collimated principally along the x-axis. The optional reflector 1043 is curved in a fashion similar to reflector 253 of FIG. 2B, and the lamps 1042 are optionally placed near to the focal point or in the caustic region of the curved reflector 1043. In this fashion the lamp 1042 plus reflector 1043 can emit light with a fixed angular distribution that is more narrow than the Lambertian, for example into an angle that is +/−30 degrees from the x-axis. In alternative embodiments, the curved reflector 1043 can be replaced by a compound parabolic collimator which can be molded as part of shape of the beam expander 1044 and placed between the lamp 1042 and the beam expander. In alternative embodiments a more collimated light can be inserted into the beam expander through the use of fresnel lenses or other refractive lenses placed between the lamps 1042 and the beam expander 1044.

The light guide 1045 includes an array of deflectors, including deflectors 1050 and 1051, formed on the bottom surface of the light guide 1045. The deflector 1050 in FIG. 10C is similar to deflector 1030. The deflector 1051 is similar to, but taller than, deflector 1050. The cross section for each deflector 1050 and 1051 is a trapezoid with similar angles. The deflectors 1050 and 1051 are arranged with their long axes parallel to the y-axis, that is: the normal to the deflecting surfaces are contained within the x-z plane. The deflectors 1050 and 1051 are arranged with equal spacing on the bottom surface of light guide 1045, but the height of the deflectors 1050 or 1051 is allowed to vary as a function of distance from the injector 1046. By controlling the variations in deflector size across light guide 1045 the uniformity of emitted light can be improved. The positions or placement of the deflectors 1050 and 1051 can also be randomized, to avoid moire fringes or illumination artifacts in the display.

While the cross section of deflector 1050 is similar to prism 661, similar 3-dimensional objects, with variations in size, can be formed with cross sections similar to any of the prism structures 401, 451, 501, 521, 541, 561, 601, 621, 641, 801, 821, 841, 901, 921, or 941 without limitation.

Figure 10D:
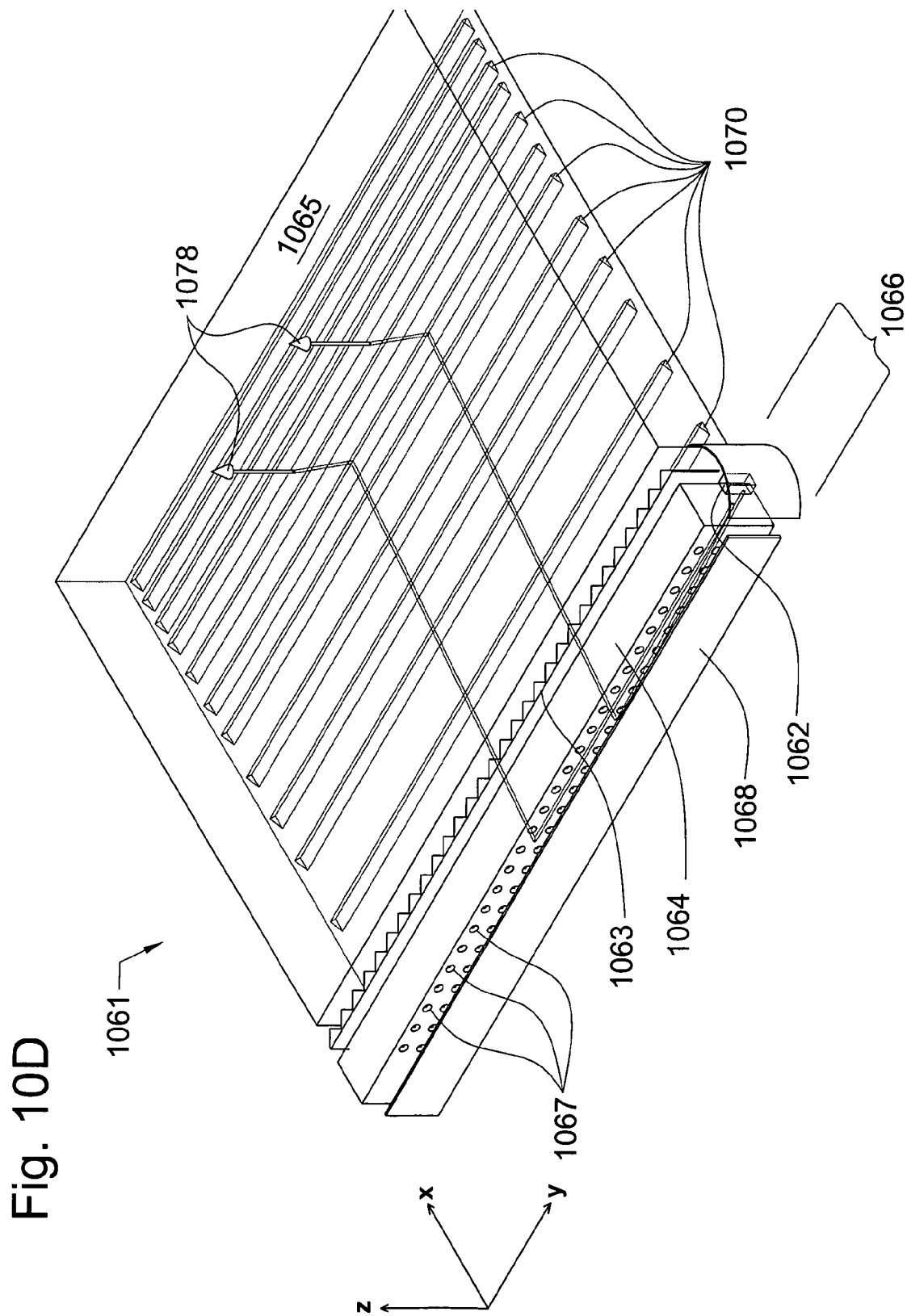

The backlight system 1061 of FIG. 10D is another example of a backlight in which 3-dimensional control of angular divergence is established primarily by collimation out of a light injector 1066. The backlight system 1061 in FIG. 10D includes lamps 1062, a reflector 1068, and an injector light guide 1064. The backlight system 1061 also includes light guide plate 1065. Placed between the injector light guide 1064 and light guide 1065 is a rear-facing prism sheet 1063. The lamps 1062, light guide 1064, reflector 1068, and prism sheet 1063 together constitute the light injector 1066. The injector light guide 1064 can include an array of paint or fluorescent dots 1067 along its back edge, the function of which is to scatter light into a range of angles for exiting the light guide 1064.

The prism sheet 1063 has two faces: a front face, which is flat and faces the injector light guide 1064, and a rear face, which includes a series of prism structures and which faces away from the light guide 1064. The ridges in prism sheet 1063 are aligned parallel to the z axis. Light rays such as light rays 1078, exiting the lamps 1062, are scattered by paint dots 1067, after which they exit the light guide 1064, and encounter the rear-facing prism sheet 1063. The rear facing prism sheet 1063 performs two functions, it takes off-angle light and re-directs it along the x-axis before insertion into light guide 1065, and it takes x-directed light from the light guide 1064 and returns it to light guide 1064 for recycling. With the use of rear-facing prism sheet 1063, the divergence of the rays exiting the injector 1066 can be controlled within +/−50 degrees and in some cases into a divergence as narrow as +/−20 degrees.

In an alternative embodiment the prism sheet 1063 is not added as a separate component, but rather the prisms shapes are molded into and form an integral part of the injector light guide 1064. In another alternative embodiment, the orientation of the prism sheet 1063 is reversed to form a front facing prism sheet, whose prism structures face the lamps 1062.

The light guide 1065 includes an array of deflectors 1070, formed on the bottom surface of light guide 1065, and similar to deflectors 1010. Any of the deflector variations described in relation to deflectors 1030, 1050, or 1051 can also be substituted in light guide 1065. The deflectors 1070 are arranged with their ridges parallel to the y-axis, that is: the normal to their flat surfaces are contained within the x-z plane. The deflectors 1010 are arranged with unequal spacing in the light guide 1005. The closer spacing at distances further from the injector 1006 helps to improve the uniformity of emitted light.

As mentioned above the backlight systems 1001, 1021, 1041, and 1061 may be utilized to form part of an improved optical cavity for use in directed, light efficient display.

3-D Collimation Using Radial Deflectors

Figure 11A:
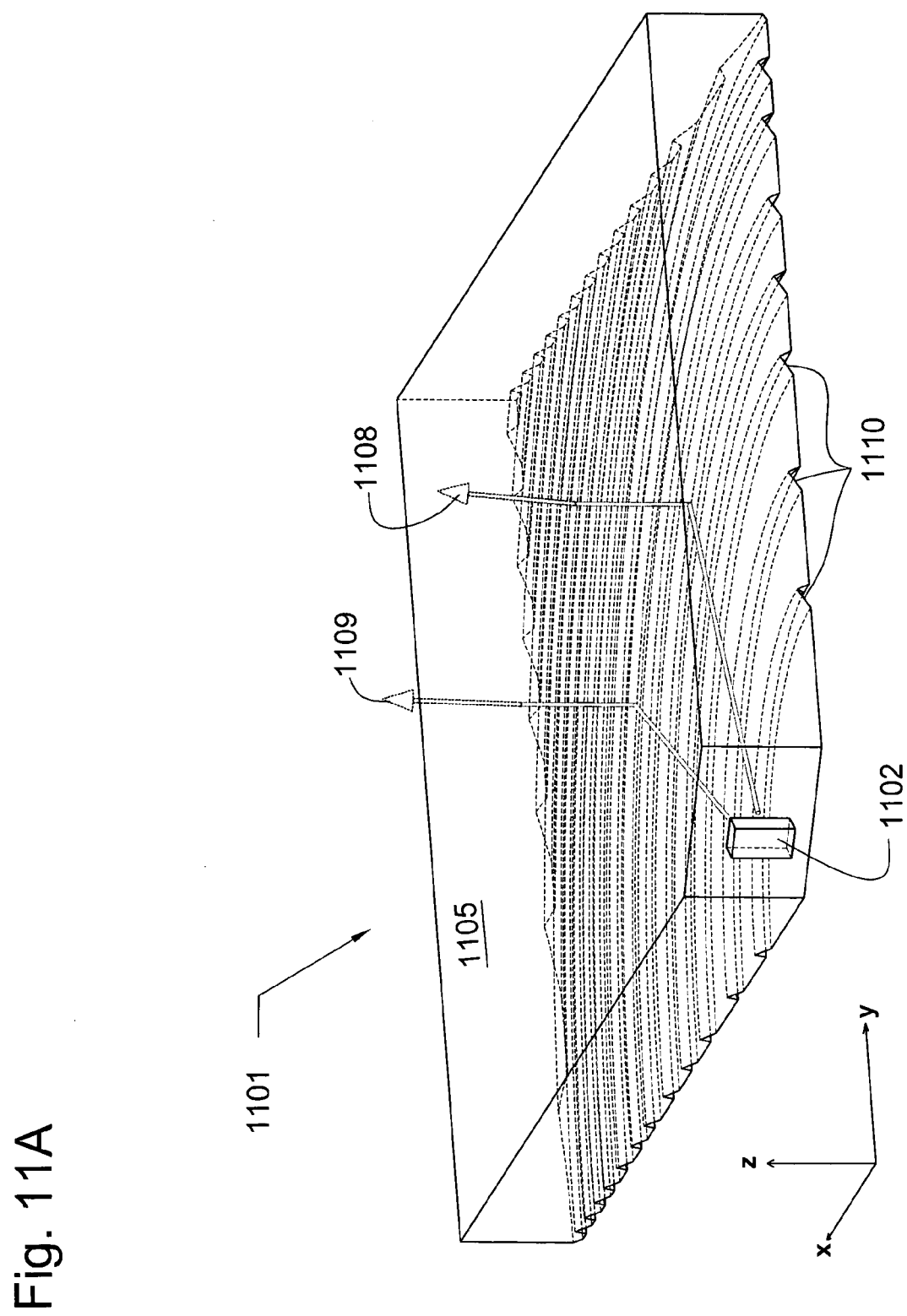
FIGS. 11A and 11B are an isometric views of a light guide along with an associated light injection system for use in a display according to an illustrative embodiment of the invention.

The backlight system 1101 of FIG. 11A is another example of a backlight in which 3-dimensional control of angular divergence is established and which is suitable for inclusion in an improved optical cavity. The backlight system 1101 includes a plurality of lamps 1102, and a light guide plate 1105. The light guide 1105 includes an array of deflectors 1110. The deflectors 1100 have shapes similar to deflectors 1010. The deflectors are arranged along the bottom of light guide 1105 in a series of concentric circles. Light rays such as light rays 1108 and 1109 exit the lamp 1102 in a radial direction within the x-y plane, generally perpendicular to the orientation of the deflectors 1110. After reflection from deflectors 1110 the light rays 1108 and 1109 are re-directed into angles that are closer to the normal or z-axis, i.e. out of the light guide 1105, towards the apertures (not shown). The density of placement of deflectors 1110, or the spacing between concentric rings, can also be beneficially adjusted throughout the light guide 1105 in order to improve the uniformity of the emitted light.

The backlight system 1101 is capable of controlling the divergence of light emitted from the apertures with a cone angle of +/−50 degrees, in some cases as narrow as +/−20 degrees. The control of angles is achieved by substantially matching the arrangement of the deflectors 1110 to the radiation pattern of the lamps 1102. The long axes of deflectors 1110 are oriented perpendicular to the rays (or radial vectors) that emanate from the lamps 1102. Expressed another way: the normals to the deflecting surfaces from deflectors 1110 are contained within a plane that includes the z axis and the radial vectors from lamps 1102.

Figure 11B:
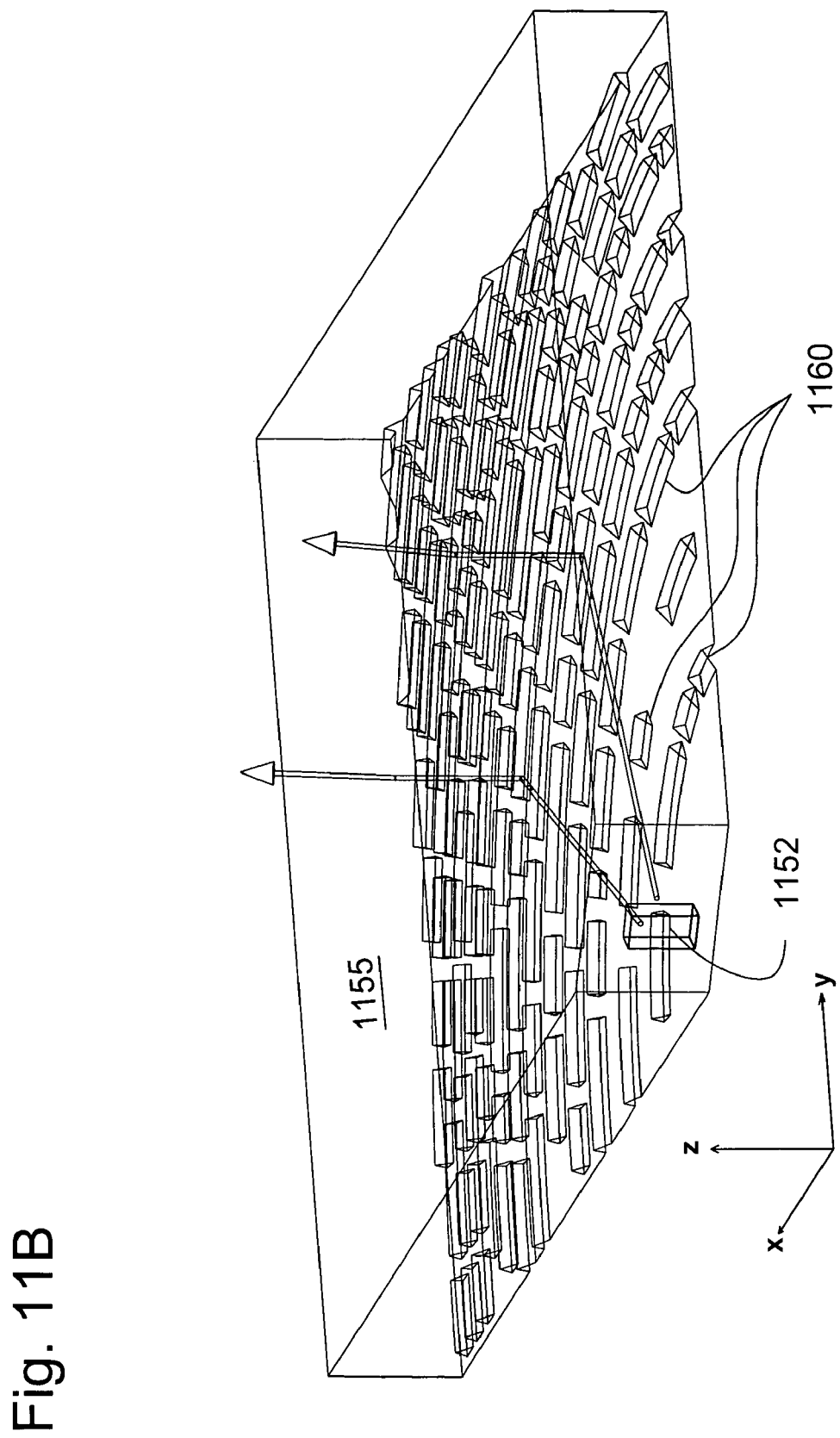

The backlight system 1151 of FIG. 11B is another example of a backlight in which 3-dimensional control is established by means of a radial deflector pattern. The backlight system 1151 includes lamps 1152, a light guide plate 1155 and an array of deflectors 1160. The deflectors 1160 have shapes similar to deflectors 1030. The segmented or 3-dimensional deflectors 1160 are placed along and oriented generally parallel to the circumference of series of circles. The segmented deflectors do not need to be perfectly parallel to the circumferential direction; instead they can have a randomized placement about an average orientation along the circumferential direction. The density of the deflectors 1160 varies as a function of distance from the lamps 1152. The closer spacing at distances further from the lamps 1152 helps to ensure the uniformity of the emitted light In another embodiment, a continuous circumferential deflector can be built using the principles of the terraced light guide 702. As in the terraced light 702, the bottom surface can include a parallel set of angled or faceted surfaces that separate flat or horizontal terraces in the light guide. Each of the angled or faceted faces would include a curved aspect, with a curvature whose radius is centered on the lamp 1102.

The cross sections of any deflectors used in light guides 1105 and 1155 could match those of any of the prisms 401, 451, 501, 521, 541, 561, 601, 621, 641, 801, 821, 841, 901, 921, or 941 without limitation.

3-D Collimation Using BEF Films

Figure 12:
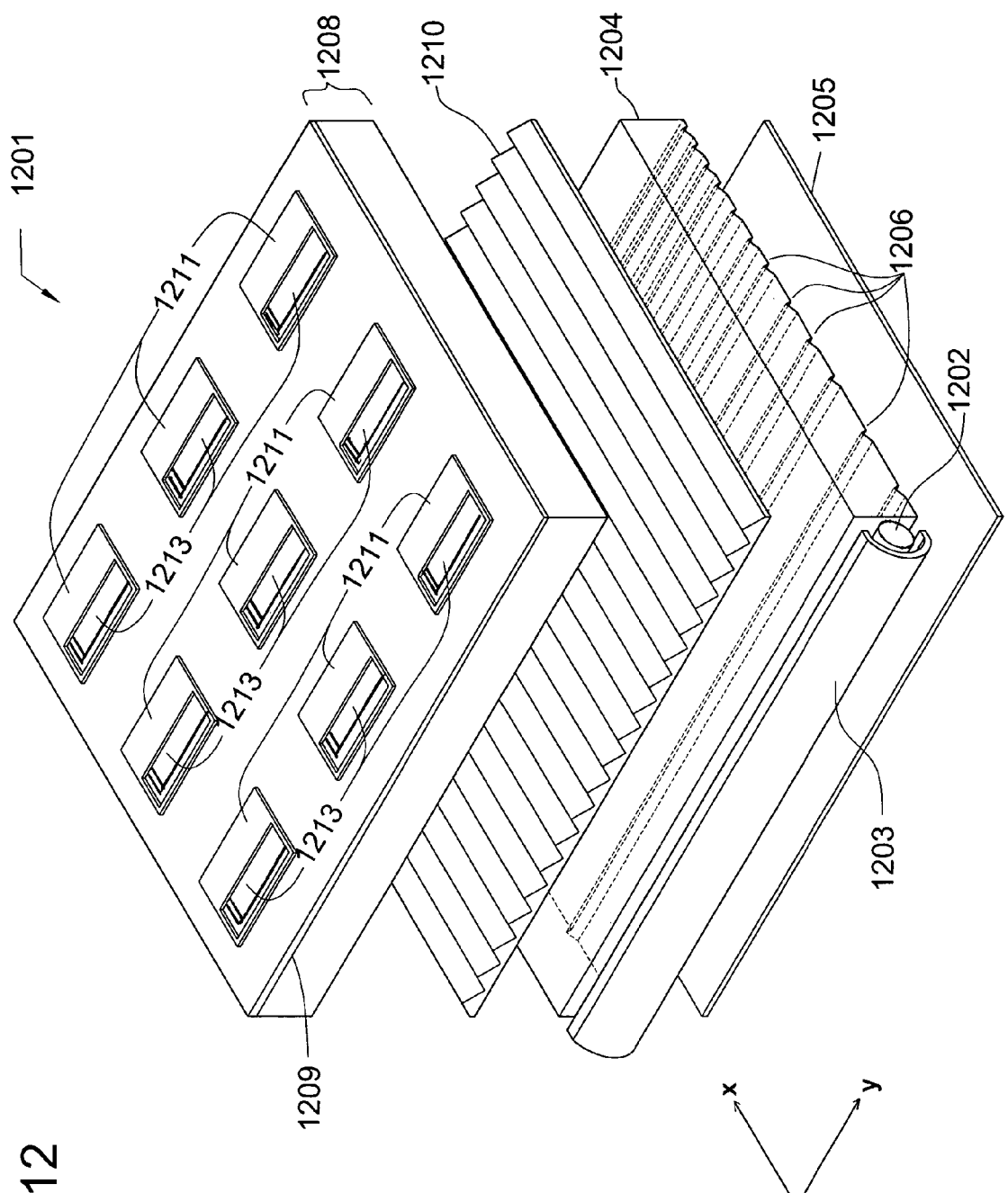
FIG. 12 is an assembly drawing of various components in a display apparatus according to an illustrative embodiment of the invention.

FIG. 12 is a perspective view of a display 1201 incorporating an improved optical cavity, according to an illustrative embodiment of the invention. The display 1201 includes another example of a backlight in which 3-dimensional control of angular divergence is established. The backlight system 1201 includes a plurality of lamps 1202, a lamp reflector 1203, a light guide 1204, a series of deflectors 1206, a back reflector 1205, a light modulator plate 1208 with shutters 1211, and a front facing prism sheet 1210, also known as a brightness enhancing film. The light modulator plate 1208 contains a reflective aperture layer 1209 that defines an array of apertures 1213. The reflective surface of the aperture layer 1209 generally faces the light guide so that light that does not escape through an aperture can be returned or recycled into the optical cavity.

The front facing prism sheet 1210 has two faces: a rear face, which is flat and faces light guide 1204, and a front face, which includes a series of prism structures and which faces away from light guide 1204. The grooves or ridges in prism sheet 1210 are aligned parallel to the x axis.

The light guide 1204 includes an array of deflectors 1206, which are similar in shape to deflectors 1010. Any of the deflector variations described in relation to deflectors 1010, 1030, 1050, or 1051 can also be substituted for deflectors 1206 in light guide 1204. The deflectors 1206 are arranged with their ridges parallel to the y-axis, that is: the normal to the flat surfaces of deflectors 1206 are contained within the x-z plane. The deflectors 1206 are arranged with unequal spacing in the light guide 1204. The closer spacing of deflectors 1206 at distances further from the lamps 1202 helps to increase the uniformity of the emitted light. The light guide includes a back reflective surface (not shown), which can be formed by a reflective metal coating on the back surface of the light guide, similar to metal coatings 405, 455, 505, or 525.

Display 1201 includes a lamp reflector 1203 which is curved (for use in collimating light) when viewed in cross section in the x-z plane, but has limited or no means for collimation of injected light in the x-y plane. Backlight system 1201 does, however, include the front-facing prism sheet 1210, also known as a prismatic brightness enhancing film, which is capable of collimating light in the y-z plane after the light leaves the light guide 1204. The collimation function of the front-facing prism sheet 1210 operates in the following fashion: light rays which leave the light guide 1204 inclined away from the z-axis in the y-z plane will be refracted by the prisms in prism sheet 1210 and directed along a path closer to the z-axis. Light rays which leave the light guide 1204 more closely aligned to the z axis will be reflected inside of the prism sheet 1210 by total internal reflection and returned to light guide 1204 for recycling. More than 30% of the total light which leaves the prism sheet 1210 and makes its way toward the apertures can be contained within an angle that is +/−30 degrees from the z-axis when measured in the y-z plane.

Display 1201 is therefore designed for collimation along one plane (the x-z plane) by means of a curved lamp reflector 1203 coupled with the specular reflections that are possible from prism-like deflectors 1206. Further collimation is achieved along the y-z plane by means of the front-facing prism sheet 1210, also known as a brightness enhancing film.

In some embodiments a diffusing film is inserted between the light guide 1204 and the prism film 1210. The diffusing film helps to remove visual artifacts produced by a regular array of deflectors 1206.

In another alternative embodiment, the orientation of the prism sheet 1210 is reversed to form a rear facing prism sheet, whose prism structures face toward the light guide 1204, but where the prism grooves remain aligned along the x-axis.

In an alternative embodiment the prism sheet 1210 is not provided as a separate component, but rather the prisms shapes are molded into and form an integral part of the top surface of the light guide 1204.

Use of Turning Films with Geometrical Extraction Structures

Backlight system design takes into consideration a number of potentially conflicting design parameters: a) control of the primary direction of emitted light, b) control of divergence angles in the emitted light, c) uniformity of intensity across the backlight, d) illumination or power efficiency, and e) manufacturing cost. The use of prism-like deflector shapes can improve a designer's control over performance parameters, but by themselves, the use of geometrical extraction structures cannot guarantee that all performance parameters are acceptable. In some cases it is beneficial to separate the function of extracting light from the light guide from the function of controlling the final direction of the extracted light. In some cases, the use of prismatic turning films in conjunction with geometrical extraction structures can lead to an improved system.

Figure 13:
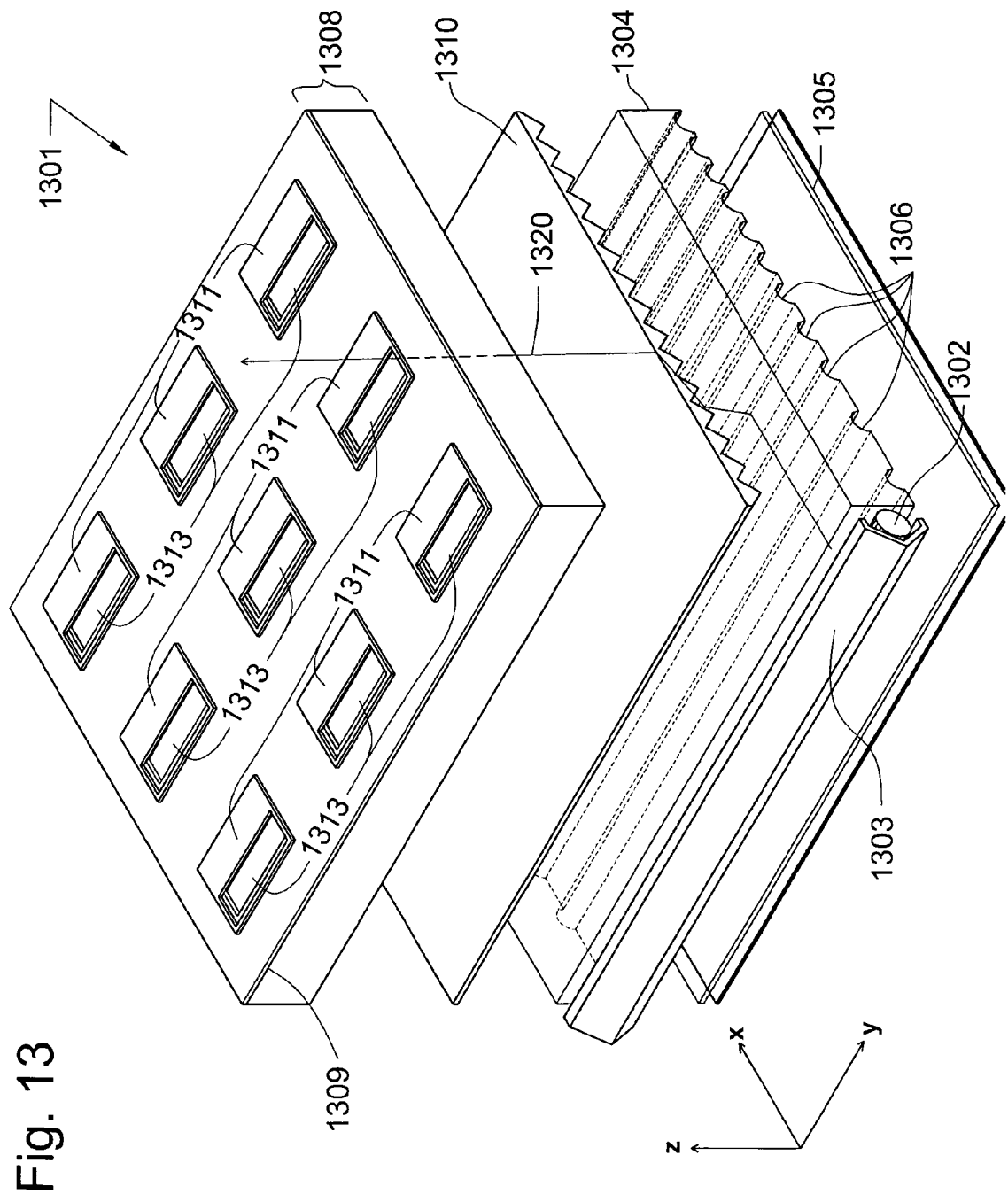
FIG. 13 is an assembly drawing of various components in a display apparatus according to an illustrative embodiment of the invention.

FIG. 13 is a perspective view of another display formed using an improved optical cavity. The display 1301 includes a turning film in conjunction with geometrical extraction structures. The display 1301 includes a plurality of lamps 1302, a lamp housing 1303, a light guide 1304, a series of deflectors 1306, a light modulator plate 1308 with shutters 1311, and a rear-facing prism sheet 1310, also known as a turning film. The light modulator plate contains a reflective aperture layer 1309 that defines an array of apertures 1313.

The rear-facing prism sheet 1310 has two faces: a rear face, which includes a series of prism structures pointing towards the light guide 1304, and a front face which is flat and faces away from light guide 1304. The grooves between prisms in prism sheet 1310 are aligned parallel to the y-axis of display 1301.

The deflectors 1306 shown in FIG. 13 are rounded deflectors, similar to deflectors 921 and 941. A light ray 1320, which is scattered by deflectors 1306, tends to exit the light guide 1304 at angles more than 20 degrees from the normal or z axis. The rear-facing prism sheet 1310 has the ability to re-direct the light from an off-axis trajectory and send it through the apertures 1313 along a path more parallel to the z-axis. The rear-facing prism sheet 1310 is therefore referred to as a turning film.

In an alternative embodiment the prism sheet 1310 is not added as a separate component, but rather the prisms shapes are molded into and form an integral part of either the light guide 1304 at its top surface or the light modulator plate 1308 at its bottom surface. In another alternative embodiment, the orientation of the prism sheet 1310 is reversed to form a front-facing prism sheet, whose prism structures face away from the light guide 1304, but where the prism grooves remain aligned along the y-axis.

The deflectors 1306 are designed with shapes that complement those in the turning film 1310. For instance deflectors shaped like deflectors 801, 821, 901, 921, and 941 tend to preferentially send their scattered light into oblique angles, i.e. directions substantially non-parallel to the z-axis, for instance at angles more that 20 degrees divergent to the z-axis. Such deflectors are better suited for combining in a display, such as display 1301, where a turning film 1310 is used to re-direct the light along the z-axis. Deflectors such as deflectors 401, 451, 501, 521, 541, 561, 601, 621, 641 can also be effective at creating a range of oblique exit angles that beneficially match with a turning film, like prism sheet 1310, as long as the angle between their respective front and rear faces is held substantially below 45 degrees with respect to the horizontal plane of the light guide 1304.

In alternate embodiments the prism angle formed by prisms in the turning film 1310 can also be adjusted to match the range of exit angle from the light guide 1304. The angle formed at the peak of the prisms in sheet 1310 can range anywhere from 60 to 120 degrees.

Figure 14:
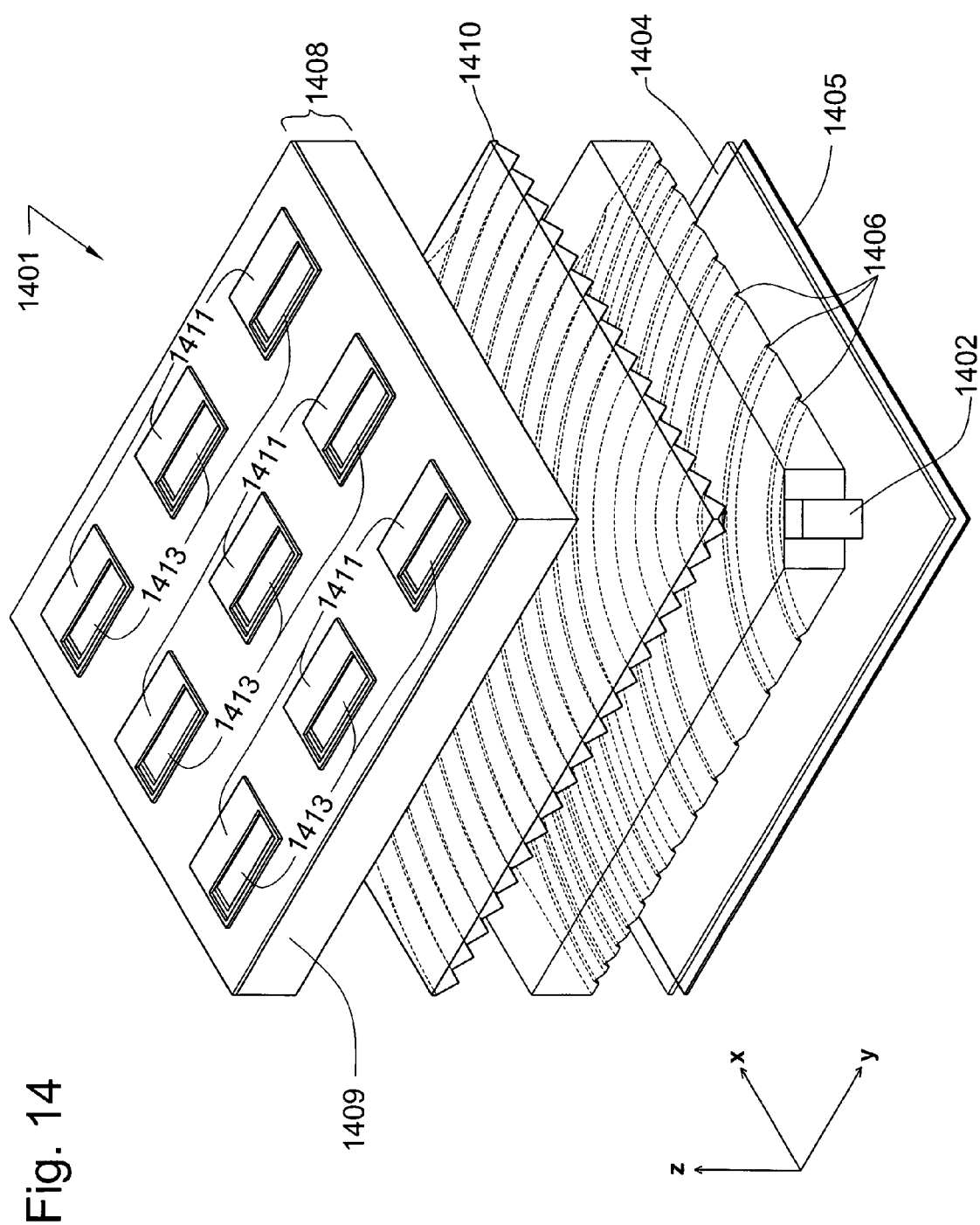
FIG. 14 is an assembly drawing of various components in a display apparatus according to an illustrative embodiment of the invention.

The display 1401 of FIG. 14 is another example of the use of a turning film in conjunction with geometrical extraction structures in an optical cavity. The display 1401 includes a plurality of lamps 1402, a lamp housing 1403, a light guide 1404, a series of deflectors 1406, a light modulator 1408 plate with shutters 1411, and a rear-facing prism sheet 1410, also known as a turning film. The light modulator plate 1408 contains a reflective aperture layer 1409 that defines an array of apertures 1413.

The rear-facing prism sheet 1410 has two faces: a rear face, which includes a series of prism structures pointing towards the light guide 1404, and a front face which is flat and faces away from light guide 1404. In contrast to prism sheet 1310 the grooves in prism sheet 1410 are aligned along concentric circles, whose radii originate at the lamp 1402.

The deflectors 1406 shown in FIG. 14 are prism-like deflectors, similar to deflectors 401 or 451. In order to produce extraction angles that complement the turning film 1410 the angle between the front prism face and the horizontal plane of the light guide 1404 is held substantially below 45 degrees. The deflectors 1406 are aligned along concentric circles, parallel the grooves of prism sheet 1410.

A light ray, which is scattered by deflectors 1406, tends to exit the light guide 1404 at angles more than 20 degrees from the normal or z axis. The rear-facing prism sheet 1410 has the ability to re-direct the light from an off-axis trajectory and send it through the apertures 1413 along a path more parallel to the z-axis. The rear-facing prism sheet 1410 is therefore referred to as a turning film.

In an alternative embodiment the prism sheet 1410 is not added as a separate component, but rather the prisms shapes are molded into and form an integral part of either the light guide 1404 at its top surface or the light modulator plate 1408 at its bottom surface. In another alternative embodiment, the orientation of the prism sheet 1410 is reversed to form a front facing prism sheet, whose prism structures face away from the light guide 1404, but where the prism grooves remain aligned in circles parallel to the deflectors 1406.

The deflectors 1406 are designed with shapes that complement that of the turning film 1410. For instance deflectors shaped like deflectors 801, 821, 901, 921, and 941 tend to preferentially send their scattered light into oblique angles, i.e. directions substantially non-parallel to the z-axis, for instance at angles more that 20 degrees divergent to the z-axis. Such deflectors are ideally suited for combining in a display, such as display 1401, where a turning film is used to re-direct the light along the z-axis. Deflectors such as deflectors 401, 451, 501, 521, 541, 561, 601, 621, 641 can also be effective at creating a range of oblique exit angles that beneficially match with a turning film, like prism sheet 1410, as long as the angle between their respective front and rear faces is held substantially below 45 degrees with respect to the horizontal plane of the light guide 1404.

In alternate embodiments the prism angle formed by prisms in the turning film 1410 can also be adjusted to match the range of exit angle from the light guide 1404. The angle formed at the peak of the prisms in sheet 1410 can range anywhere from 60 to 120 degrees.

Figure 15:
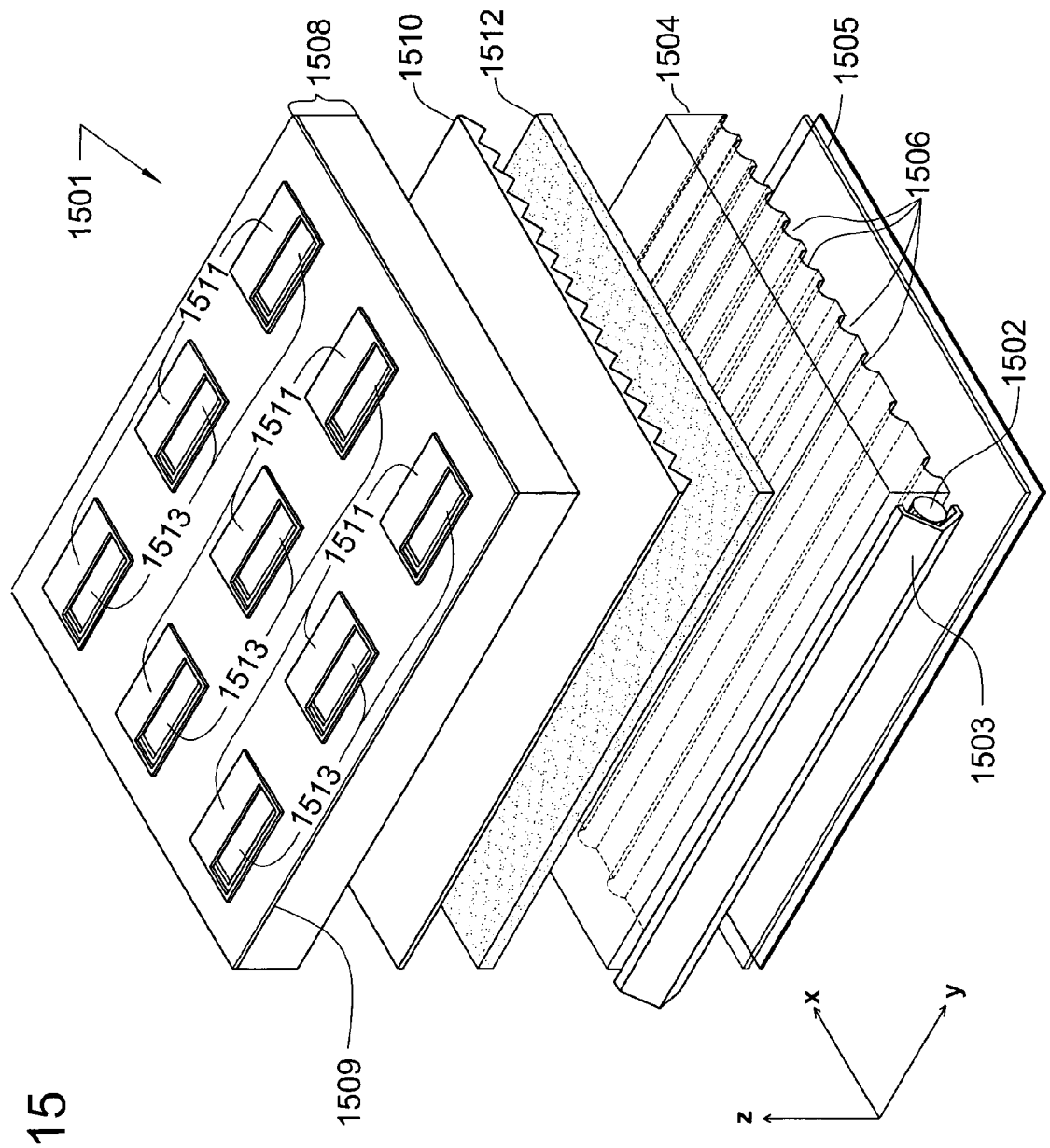
FIG. 15 is an assembly drawing of various components in a display apparatus according to an illustrative embodiment of the invention.

The display 1501 of FIG. 15 is another example of a display apparatus in which 3-dimensional control of angular divergence is established. The display 1501 includes a plurality of lamps 1502, a lamp housing 1503, a light guide 1504, a series of deflectors 1506, a light modulator plate 1508 with shutters 1511, a rear-facing prism sheet 1510, and a diffuser sheet 1512. The light modulator plate 1508 contains a reflective aperture layer 1509 that defines an array of apertures 1513.

The rear-facing prism sheet 1510 has two faces: a rear face, which includes a series of prism structures faces light guide 1504, and a front face which is flat and faces away from light guide 1504. The grooves between prisms in prism sheet 1510 are aligned parallel to the y-axis of backlight system 1501

In another alternative embodiment, the orientation of the prism sheet 1510 is reversed to form a front-facing prism sheet, whose prism structures face away from the light guide 1504.

The operation of display 1501 is similar to that of display 1301, with an added diffuser 1512. In some cases the range of angles that can be extracted from a backlight is extremely oblique, i.e. retained substantially within 30 degrees of the plane of the light guide 1504. In this case a diffuser sheet 1512 can be effective at increasing the spread of available angles so that the flux of light effectively re-directed by the rear-facing prism sheet 1510 is increased. The diffuser sheet 1512 is designed to spread the incoming light into a limited range of outgoing angles, for instance into a cone less than or equal to +/−20 degrees of the incident ray. The diffuser sheet 1512 does not create a broad Lambertian profile of outgoing rays and therefore does not overly broaden the distribution of rays that pass through it in the recycling process.

Crossed BEF or Crossed Turning Films

Figure 16:
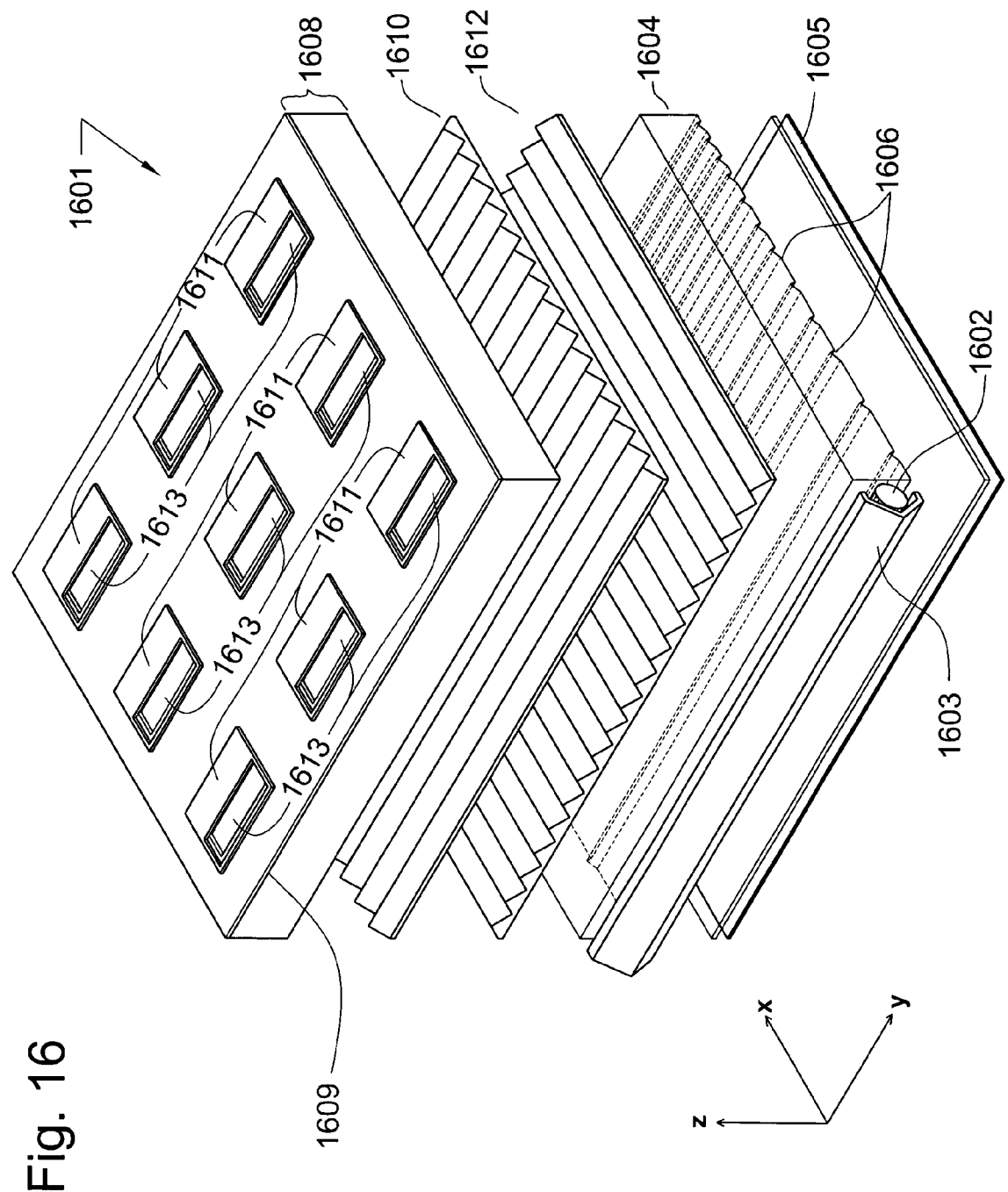
FIG. 16 is an assembly drawing of various components in a display apparatus according to an illustrative embodiment of the invention.

The display 1601 of FIG. 16 is another example of a display apparatus in which 3-dimensional control of angular divergence is established in an optical cavity. The display 1601 includes a plurality of lamps 1602, a lamp housing 1603, a light guide 1604, a series of deflectors 1606, a light modulator plate 1608 with shutters 1611, and two front-facing prism sheets 1610 and 1612. The light modulator plate 1608 contains a reflective aperture layer 1609 that defines an array of apertures 1613.

The front facing prism sheets 1610 and 1612 each have two faces: a rear face, which is flat and faces light guide 1604, and a front face, which includes a series of prism structures and which faces away from light guide 1604. The grooves or ridges in prism sheet 1210 are aligned parallel to the x axis. The grooves in prism sheets 1610 and 1612 are oriented in orthogonal or perpendicular directions.

With two prism sheets 1610 and 1612, the display 1601 has the capability of taking nearly random radiation out of the light guide 1604 and providing substantial collimation in both the x-z plane and the y-z plane.

In another alternative embodiment, the orientation of both of the prism sheets 1610 and 1612 are reversed to form rear-facing prism sheets, whose prism structures both face toward the light guide 1604.

When using radial deflector designs, such as in display assembly 1401, two perpendicularly oriented prism films can also be employed. One of these prism films would be oriented in a circumferential direction, such as prism sheet 1410, while the second prism sheet would include prisms that are oriented in the radial direction.

The displays in FIGS. 10 through 16 include various lamps. A large number of different types of lamps can be employed in these displays, including without limitation: incandescent lamps, fluorescent lamps, lasers, or light emitting diodes (LEDs). Further, any of the lamps, such as lamps 1002, 1022, 1042, or 1102 illustrated in FIGS. 10 through 16, can actually represent an assembly of multiple lamps. For instance a combination of red, green, and blue LEDs can be combined with or substituted for a white LED in a small semiconductor chip, or assembled into a small multi-lamp package. Similarly a lamp can represent an assembly of 4 or more color LEDs, for instance a combination of red, yellow, green, and blue LEDs.

In one operational implementation (called field sequential color) where multiple-color lamps are employed, light from each of the three different colors, e.g. red, green, and blue LEDs, is sequentially introduced into the optical cavity, alternating their illumination frequencies in the range of 20 to 600 Hz. When the different color fields are introduced at frequencies in excess of 100 Hz, generally faster than what the human eye can detect, the eye will tend to perceive them as a single-hued color image. The color perceived by the eye will depend on the relative intensities or durations employed by the pulses from the separately colored lamps.

Figure 17:
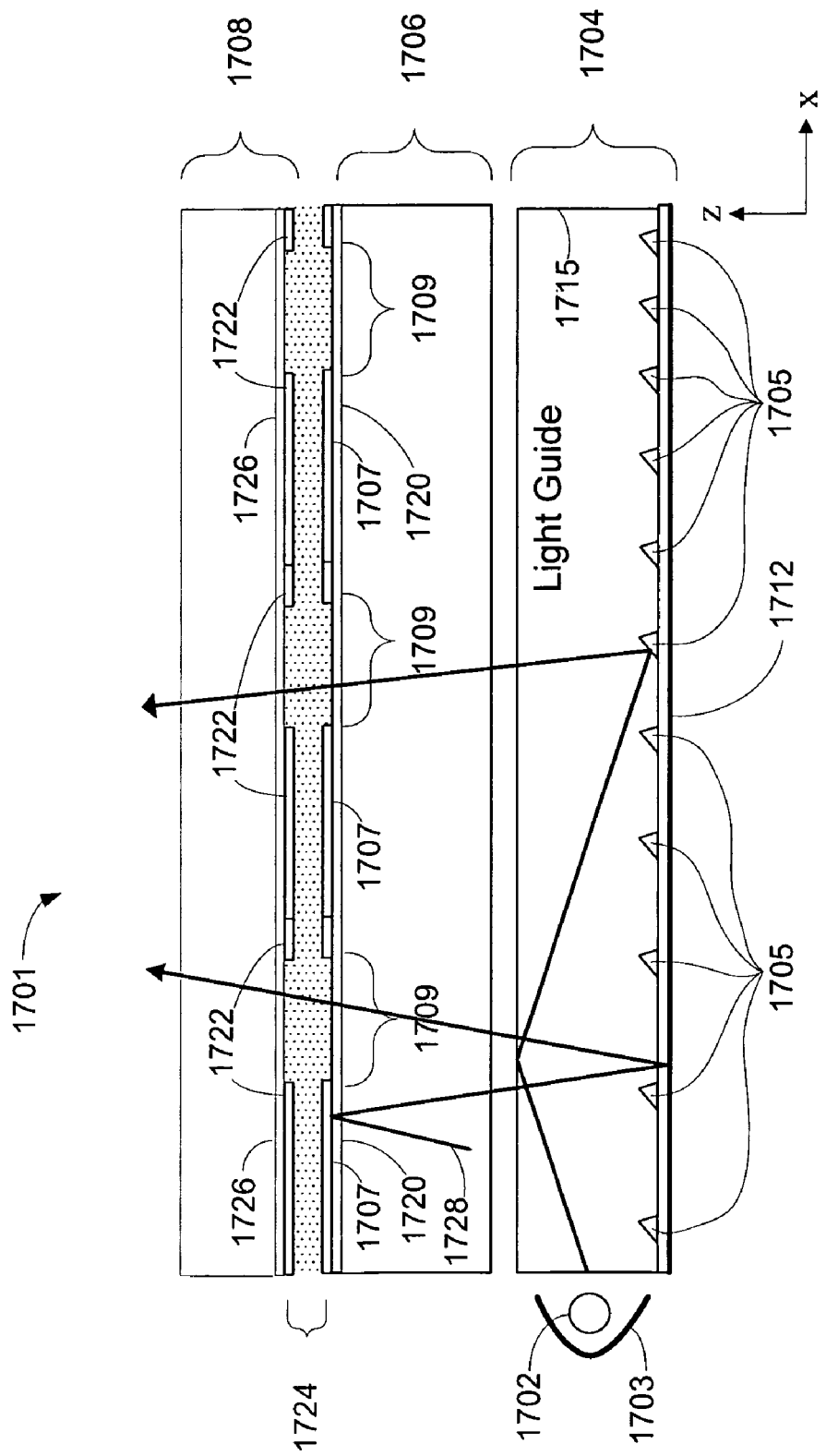
FIG. 17 is a cross sectional view of a display apparatus according to an illustrative embodiment of the invention.

The embodiments illustrated to this point have described displays that use MEMS-type or shutter-type light modulator substrates. FIG. 17 and display apparatus 1701 illustrate a display apparatus, with reflective apertures, that employs a liquid crystal light modulator according to an illustrative embodiment of the invention. The directionality and illumination efficiency of display apparatus 1701 also benefit from the use of geometric or smooth deflector structures and enhanced conical reflectivity.

Display apparatus 1701 includes a backlight 1704, a bottom modulator substrate 1706, and a top modulator substrate 1708. The backlight 1704 includes a lamp 1702, a lamp reflector 1703, a light guide 1704, and a series of specular deflectors 1705. The bottom modulator substrate 1706 includes a reflective aperture layer 1707, and a series of aperture openings 1709, and a transparent electrode for the liquid crystal 1720. The display apparatus also includes a back-reflector 1712, which is located in a plane substantially parallel to that of the aperture layer 1707. The top modulator substrate 1708 includes a patterned black matrix 1722 and a transparent electrode for the liquid crystal 1726. Between the substrate 1706 and 1708 there is placed a liquid crystal layer 1724. Not shown are polarizer layers and rubbing layers that accompany the liquid crystal layer 1724. The liquid crystal layer 1724 modulates the intensity of light that passes through apertures 1709 in response to voltages that are placed across the electrodes 1720 and 1726. The display 1701 includes apertures 1709 that comprise less than 70% of the area available on the surface of modulator substrate 1706.

Light injected from lamp 1702 is contained by total internal reflection inside of the light guide 1704 until it is extracted towards an aperture 1709 after scattering by one of the deflectors 1705. The deflectors 1705 present flat deflection surfaces with the similar angles of inclination. Efficient recycling, without degradation in the directionality, is achieved by reflections between the reflective aperture layer 1707 and the back reflective layer 1712, as shown by light ray 1728.

Around the perimeter of the display apparatus 1701 are a set of sides or edges 1715. These edges are surrounded by or coated by a reflective metal, so that light that travels the full width of the light guide 1704 can be returned by reflection into the light guide 1704.

In alternative embodiments of the invention, alternative light modulators are available, other than the liquid crystal light modulator of display apparatus 1701 or the mechanical shutters illustrated in display apparatus' 201 or 251. For instance liquid shutters can be employed, i.e. an opaque liquid or a liquid containing a dye can be selectively moved in front of or away from one of the corresponding apertures in the rear-facing reflective layer. Such liquid shutters can be actuated by means of electrowetting or by the opening or closing of a diaphragm.

FIGS. 18A-B illustrate the improvements that can be made to recycling efficiency in a backlight when attention is paid to the property of conical reflectance. FIGS. 18A and 18B illustrate cross sections of backlight components 1801 and 1851. One of these backlight components 1851, has a higher conical reflectance than the other backlight system, backlight system 1801. As a result, backlight system 1851 allows for increased efficiency in a display with a reflective aperture layer. Each backlight component 1801 and 1851 includes a set of prismatic deflector structures 1802 and 1852. The prismatic deflection structures 1802 and 1852 are long prism structures that extend out of the page of the illustrations in FIGS. 18A and 18B. The prismatic deflection structures are formed in the bottom surface of respective light guides 1803 and 1853. The bottom surface of each light guide 1803 and 1853 guide is coated with a metallic reflecting film 1804 and 1854. Connecting each of the prismatic deflector structure 1802 and 1852 in backlights 1801 and 1851 is a horizontal back reflecting surface 1805 and 1855, which is also coated with metallic reflecting film. The horizontal surfaces 1805 and 1855 are substantially parallel to a reflective aperture layer (not shown). Each prismatic deflector structure 1802 and 1852 contains a front prism surface (1806 and 1856) and a back prism surface (1808 and 1858). The shape of prismatic deflection structure 1802 is considered symmetrical in cross section, in that the projection or footprint of the front prism surface 1806 parallel to the horizontal surface 1805 of the backlight structure (denoted by the length of the dotted line 1807) is substantially the same length (or area when considered in 3 dimensions) as the projection or footprint 1809 of the back prism surface 1808. By contrast the shape of prismatic deflector structure 1852 is considered asymmetrical in cross section, in that the projection or footprint of the front prism surface 1856 parallel to the horizontal surface 1855 of the backlight structure (denoted by the length of the dotted line 1857) is considerably longer (or larger in area when considered in 3 dimensions) as the projection or footprint 1809 of the back prism surface 1808.

Both of the prismatic deflection structures 1802 and 1852 are designed to deflect light from a lamp (not shown) towards a viewer, as illustrated by light rays 1812 and 1862. Comparing backlight systems 1801 and 1851, the angle that the front prism surface 1806 forms with the horizontal 1805 is the same angle as that formed by the front prism surfaces 1856 in backlight 1851. The number density or mean spacing between prismatic deflector structures 1802 and 1852 is also the same in the two backlight systems 1801 and 1851. Therefore, the backlight systems 1801 and 1851 are designed for similar efficiencies and directivity when compared for their ability to re-direct light from a lamp towards the viewer.

With respect to conical reflectance (as described in regards to FIG. 2), the behavior of the backlight systems 1801 and 1851 are quite different. The total projected area of the prismatic deflector structures 1802 is much larger than the projected area of prismatic deflector structures 1852. As a consequence, the area of the horizontal back reflecting surfaces 1855 of backlight system 1851 is larger than the area of horizontal back reflecting surfaces 1805 of backlight system 1801. Since a larger proportion of the back surface in system 1851 is dedicated to the horizontal and smooth reflecting surface 1855, a much smaller relative fraction of random light scattering will occur in this system.

Modeling Conical Reflectance

The expected conical reflectance of a backlight can be estimated using the model described below. The model estimates the fraction light striking a backlight within a useful range of angles that is returned by the backlight also within a similar useful range of angles. For the illustrative model, the useful range of angles is +/−40 degrees from an axis perpendicular to the front surface of the back light (the "display normal"). That is, what fraction of light striking the backlight at angles within 40 degrees from the display normal is returned by the backlight at angles within 40 degrees of display normal. Alternative models may employ broader or narrower ranges of useful angles.

The model includes the following assumptions. Any light that strikes the light extraction elements, such as prismatic deflector structures 1802 and 1852, is deflected at oblique angles and becomes either stored by total internal reflection in the light guide or absorbed along the edges of the light guide. That is, the model ignores the possibility that recycled light deflecting off of light extraction elements can be returned to within the useful range of angles. Only horizontal back reflecting surfaces of a backlight, i.e., front-facing reflective surfaces perpendicular to the display normal, such as back reflecting surfaces 1805 and 1855, contribute to the conical reflectance of the backlight. Further, it is assumed that the horizontal back reflecting surfaces specularly reflect incident light with an efficiency of 95%. Thus, 95% of the light that strikes the horizontal back reflecting surfaces at angles within the useful range of angles is returned at angles within the useful range of angles. According to the model, conical reflectance of a backlight is equal to the percentage of the total area of a backlight taken up by horizontal back reflecting surfaces multiplied by the reflectivity of the horizontal back reflecting surfaces.

With respect to the backlight system 1801, the cross sectional area of the prismatic deflector structures 1802 takes up 60% of the total rear backlight area. The horizontal reflecting surfaces 1805 of the backlight system 1801 make up only 40%. Thus according to the model, the expected conical reflectance of backlight system 1801 is 38% (i.e., (40% horizontal back reflecting area)×(95% reflectivity)). In contrast, in backlight system 1852, the cross sectional area of the prismatic deflector structures 1852 has been reduced to 30% of the total rear area, while the back reflective surfaces 1855 make up 70% of the area. Thus backlight system 1852 is expected to have, according to the model, a conical reflectance of 66.5% (i.e., (70% horizontal back reflecting area)× (95% reflectivity)).

These values of conical reflectance obtained from the model can be input to a recycling model of a reflective aperture-based display system. The recycling model assumes a 10% aperture ratio (i.e., that the apertures in the reflective aperture layer make up 10% of the total area of the layer) and a reflectivity of the reflective aperture layer of 95%. The recycling model estimates that the recycling efficiency of the backlight within the useful range of angles, that is, the percentage of light introduced into the backlight at a useful angle that passes through an aperture at an angle within the useful range of angles.

Thus, according to this model, a reflective aperture-based display incorporating the backlight system 1801 would have a recycling efficiency of 12%. A reflective aperture-based display incorporating the backlight system 1851 would have a recycling efficiency of 19%. The backlight 1851 has improved the optical throughput to a value which is almost twice the throughput as would be expected from the 10% aperture ratio.

The 38% conical reflectance of backlight 1802 is only about the same as the conical reflectance that is achieved with a diffuse or Lambertian reflector over the same 40 degree solid angle. The improved result in directionality and efficiency from backlight 1851 is accomplished, in large part, by providing large proportions of area dedicated to horizontal, substantially parallel, and specular back-reflectors, which helps to preserve the incident angular distribution. The result, even after repeated bounces of recycling, is that the display built with backlight 1851 projects a higher-than-random fraction of light into directions favorable for the user.

Extending the observations made in relation to FIGS. 18A and 18B, Table 2 shows how the recycling efficiency of a display formed using an improved optical cavity as described herein improves as the area density of extraction elements (with a wide variety of shapes, including prismatic deflection structures 1852) in a backlight is decreased. The data in Table 2 was derived using the models described above. That is, the data is based on the assumptions that (i) deflector structures in the backlight of the display do not contribute to conical reflectance; (ii) horizontal back-reflecting surfaces in the backlight have 95% reflectivity (parallel to aperture); (iii) conical reflectance is measured along the over a +/−40 degree cone angle with respect to the display normal; and (iv) the display includes a reflective aperture layer having 95% reflectivity and a 10% aperture area.

TABLE 2

Effect of Deflector Density on Recycling Efficiency

| deflector area % | conical reflectance | recycling efficiency |
| --- | --- | --- |
| 60% | 38% | 12% |
| 50% | 47.5% | 13.5% |
| 40% | 57% | 16% |
| 30% | 67% | 19% |
| 20% | 76% | 25% |
| 10% | 86% | 34% |
| 5% | 90% | 42% |
| 2% | 93% | 47% |

From Table 2, strong benefits in recycling efficiency are evident, without loss of directivity, whenever the areas dedicated to the deflectors or extraction centers is kept below 50% of the backlight area. Better results are achieved when the deflector areas are kept below 20%, and even better results are achieved when the deflector areas are kept below 10%. Similarly, Table 2 indicates that strong benefits in recycling efficiency, without loss of directivity, can be achieved when the conical reflectance of a display backlight is brought above 50%. Better results are achieved when the conical reflectance is brought above 70%, and even better results are achieved when the conical reflectance is brought above 90%.

Similar conical reflectance results, and therefore recycling efficiencies, can be obtained from a wide variety of geometrical extraction structures, either reflective or refractive, including those described in FIGS. 4 through 9. Moreover, it is not necessary to assume, as was assumed for illustration purposes in Table 2, that the geometrical extraction centers have a completely absorptive effect. Extraction centers that return a portion of incident light at a useful angle improve the conical reflectance of a backlight. Rounded extraction centers like centers 901 and 921 are examples of extraction centers that can contribute positively toward the conical reflectance result. Trapezoidal structures like deflectors 561 also improve the conical reflectance result. Using such extraction centers, conical reflectances in excess of 95% become possible and recycling efficiencies above 50% can be achieved.

Light modulation films like the turning film 1310 and the BEF films 1210 are known to change the direction of incident light. Such modulation films are still useful in some reflective aperture displays, however, since their modulation effects are generally reversible as measured in a conical reflectance test. Light that is incident on the backlight system (with turning film 1310 for instance) might be re-directed by the turning film on its path into the light guide. However, after bouncing off of a parallel back-reflective surface in or behind the light guide, the light can reverse its course as it returns through the turning film so that it can still approach the aperture layer within the prescribed useful angular range, as long as random or diffuse scattering between the two reflective surfaces is avoided.

Description of Assemblies and Integrated Light Guides

Figure 19:
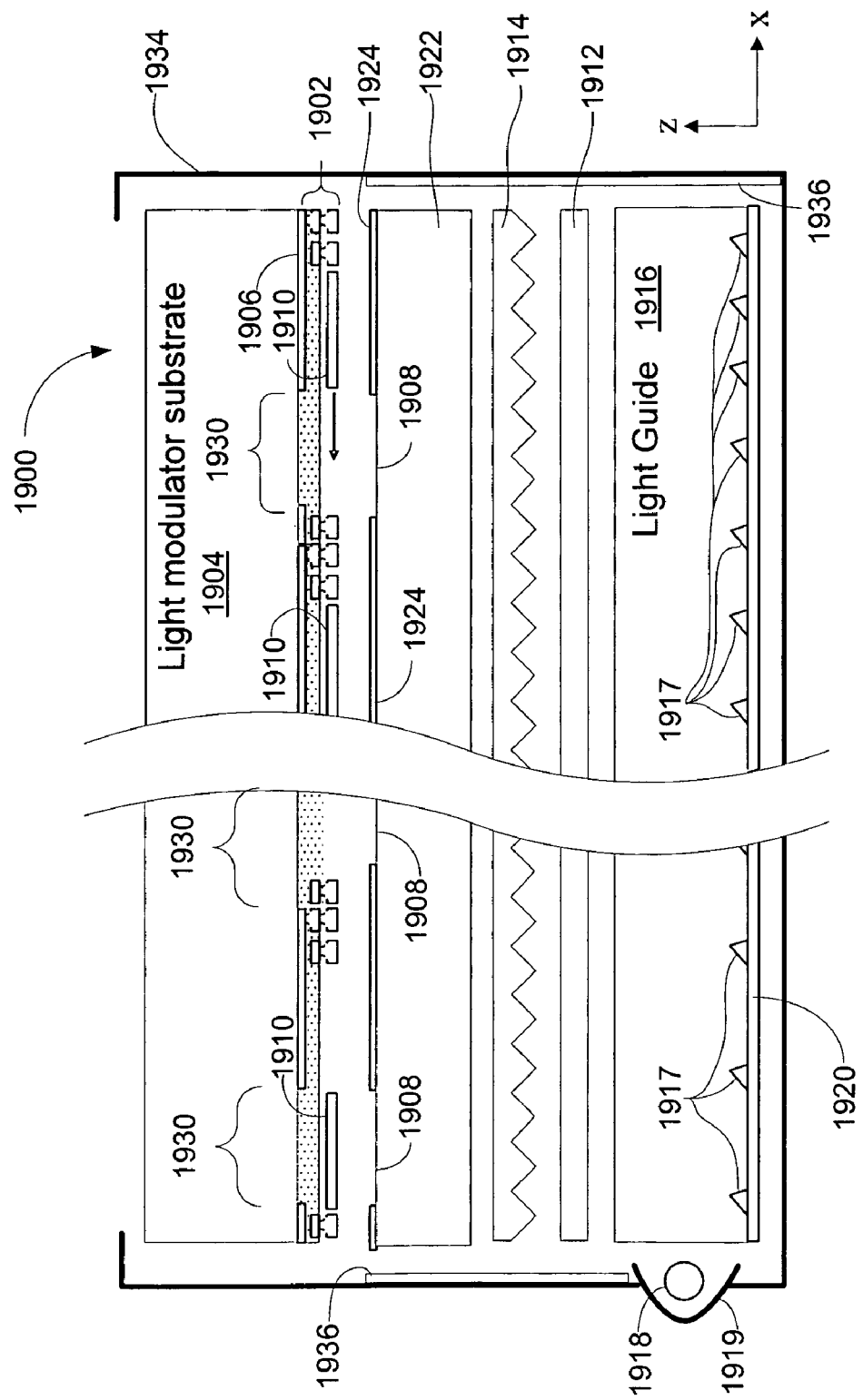
FIG. 19 is a cross sectional view of a display apparatus according to an illustrative embodiment of the invention.

FIG. 19 is a cross sectional view of a display assembly 1900, according to an illustrative embodiment of the invention referred to as a MEMS-down configuration. The display assembly 1900 features a light guide 1916, a reflective aperture layer 1924, and a set of shutter assemblies 1902, all of which are built onto separate substrates. The shutter assemblies 1902 are built onto substrate 1904 and positioned such that the shutter assemblies are faced directly opposite to the reflective aperture layer 1924. The vertical distance between the shutter assemblies and the reflective aperture layer is less than about 0.5 mm.

In an alternative embodiment the distance between the shutter assemblies and the reflective aperture layer is greater than 0.5 mm, but is still smaller than the display pitch. The display pitch is defined as the distance between pixels, and in many cases is established as the distance between apertures in the rear-facing reflective layer. When the distance between the shutter assemblies and the reflective aperture layer is less than the display pitch a larger fraction of the light that passes through the apertures will be intercepted by their corresponding shutter assemblies.

Display assembly 1900 includes a light guide 1916, which is illuminated by one or more lamps 1918. The lamps 1918 can be, for example, and without limitation, incandescent lamps, fluorescent lamps, lasers, or light emitting diodes. The lamp assembly includes a light reflector or collimator 1919 for introducing a cone of light from the lamp into the light guide within a predetermined range of angles.

The light guide includes a set of geometrical extraction structures or deflectors 1917 which serve to re-direct light out of the light guide and along the vertical or z-axis of the display. The optical shapes or structures employed in deflectors 1917 can be any of those described with respect to FIGS. 4 through 9 without limitation. The density of deflectors 1917 varies with distance from the lamp 1918.

The display assembly 1900 includes a front-facing reflective layer 1920, which is positioned behind the light guide 1916. In display assembly 1900, the front-facing reflective layer is deposited directly onto the back surface of the light guide 1916. In other implementations the back reflective layer 1920 is separated from the light guide by an air gap. The back reflective layer 1920 is oriented in a plane substantially parallel to that of the reflective aperture layer 1924.

Interposed between the light guide 1916 and the shutter assemblies 1902 is an optional diffuser 1912 and an optional turning film 1914.

Also interposed between the light guide 1916 and the shutter assemblies 1902 is an aperture plate 1922. Disposed on the top surface of the aperture plate 1922 is the reflective aperture or rear-facing reflective layer 1924. The reflective layer 1924 defines a plurality of surface apertures 1908, each one located directly beneath the closed position of one of the shutters 1910 of shutter assemblies 1902. An optical cavity is formed by the reflection of light between the rear-facing reflective layer 1924 and the front-facing reflective layer 1920.

The aperture plate 1916 can be formed from either glass or plastic. For the rear-facing reflective layer 1924, a metal layer or thin film can be deposited onto the plate 1916. Highly reflective metal layers can be fine-grained metal films without inclusions formed by a number of vapor deposition techniques including sputtering, evaporation, ion plating, laser ablation, or chemical vapor deposition. Metals that are effective for this reflective application include, without limitation, Al, Cr, Au, Ag, Cu, Ni, Ta, Ti, Nd, Nb, Si, Mo and/or alloys thereof. After deposition the metal layer can be patterned by any of a number of photolithography and etching techniques known in the microfabrication art to define the array of apertures 1908.

In another implementation, the rear-facing reflective layer 1924 can be formed from a mirror, such as a dielectric mirror. A dielectric mirror is fabricated as a stack of dielectric thin films which alternate between materials of high and low refractive index. A portion of the incident light is reflected from each interface where the refractive index changes. By controlling the thickness of the dielectric layers to some fixed fraction or multiple of the wavelength and by adding reflections from multiple parallel dielectric interfaces (in some cases more than 6), it is possible to produce a net reflective surface having a reflectivity exceeding 98%. Hybrid reflectors can also be employed, which include one or more dielectric layers in combination a metal reflective layer.

The substrate 1904 forms the front of the display assembly 1900. A low reflectivity film 1906, disposed on the substrate 1904, defines a plurality of surface apertures 1930 located between the shutter assemblies 1902 and the substrate 1904. The materials chosen for the film 1906 are designed to minimize reflections of ambient light and therefore increase the contrast of the display. In some embodiments the film 1906 is comprised of low reflectivity metals such as W or W—Ti alloys. In other embodiments the film 1906 is made of light absorptive materials or a dielectric film stack which is designed to reflect less than 20% of the incident light.

Additional optical films can be placed on the outer surface of substrate 1904, i.e. on the surface closest to the viewer. For instance the inclusion of circular polarizers or thin film notch filters (which allow the passage of light in the wavelengths of the lamps 1918) on this outer surface can further decrease the reflectance of ambient light without otherwise degrading the luminance of the display.

A sheet metal or molded plastic assembly bracket 1934 holds the aperture plate 1922, shutter assemblies 1902, the substrate 1904, the light guide 1916 and the other component parts together around the edges. The assembly bracket 1932 is fastened with screws or indent tabs to add rigidity to the combined display assembly 1900. In some implementations, the light source 1918 is molded in place by an epoxy potting compound.

The assembly bracket includes side-facing reflective films 1936 positioned close to the edges or sides of the light guide 1916 and aperture plate 1922. These reflective films reduce light leakage in the optical cavity by returning any light that is emitted out the sides of either the light guide or the aperture plate back into the optical cavity. The distance between the sides of the light guide and the side-facing reflective films is preferably less than about 0.5 mm, more preferably less than about 0.1 mm.

Figure 20:
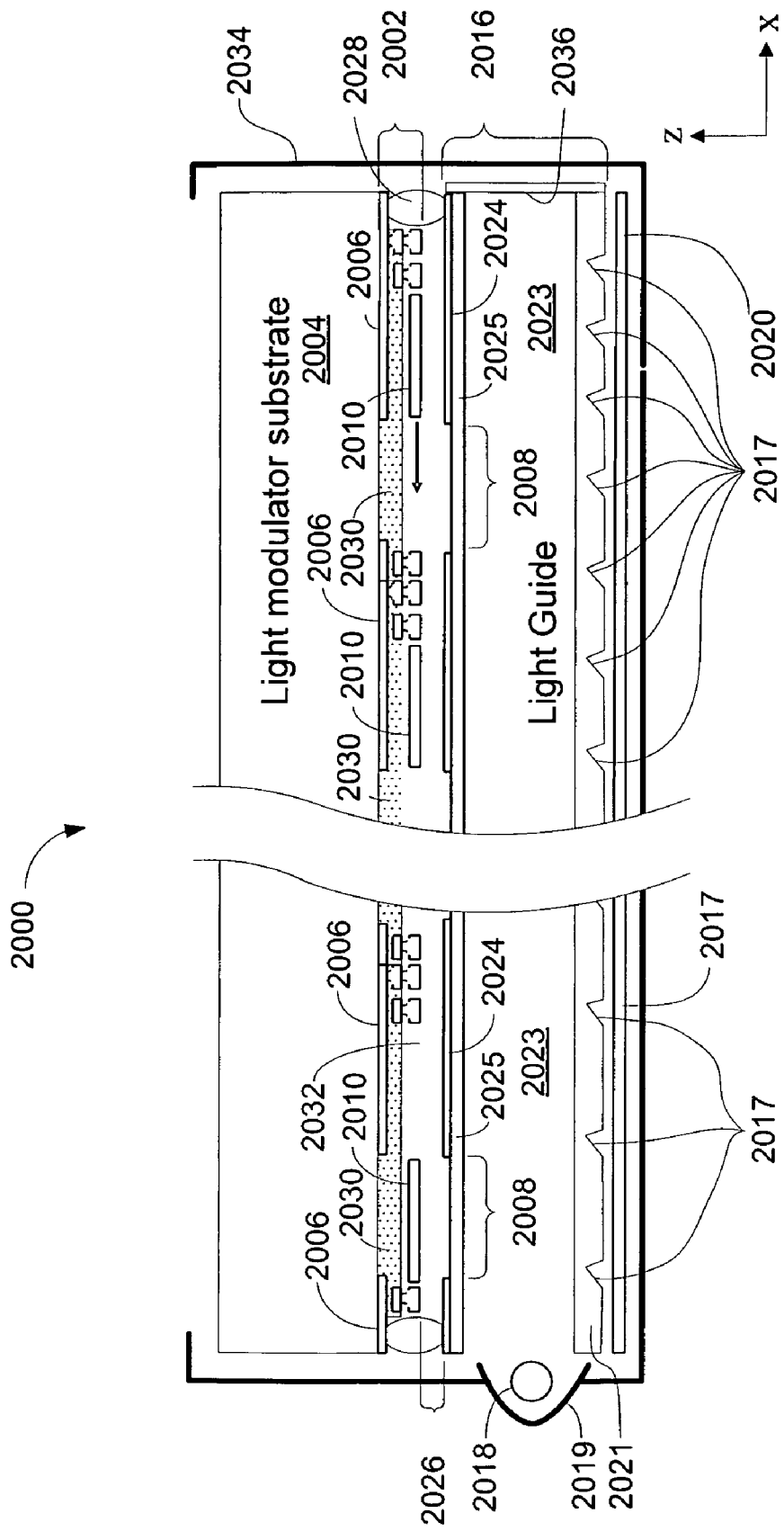
FIG. 20 is a cross sectional view of a display apparatus according to an illustrative embodiment of the invention.

FIG. 20 is a cross sectional view of a display assembly 2000, according to an illustrative embodiment of the invention. The display assembly 2000 features a reflective aperture layer 2024 integrated onto the same substrate as the light guide 2016. The shutter assemblies 2002 are built onto a separate substrate 2004 and positioned in the MEMS-down configuration, e.g. with the shutter assemblies facing directly opposite to the reflective aperture layer 2024. The apertures in the reflective aperture layer have a pitch, which is less than about 0.5 mm. The vertical distance between the shutter assemblies 2002 and the reflective aperture layer 2024 is less than the aperture pitch.

The shutter assembly substrate 2004 is aligned with the reflective aperture layer 2024 such that individual apertures in the aperture layer 2024 align with individual shutter assemblies. That is, due to the alignment of the shutter assemblies 2002 with apertures and the relativity proximity of the shutter assemblies to the reflective aperture layer, substantially all light passing through a given aperture is modulated by the shutter assembly 2002 positioned across from it. The light modulators, be they liquid crystal cells or shutter assemblies, described in the other embodiments included herein can likewise be aligned with the reflective aperture layers such that the individual or groups of apertures are associated with individual or groups of light modulators.

Display assembly 2000 includes a light guide 2016, which is illuminated by one or more lamps 2018. The lamps 2018 can be, for example, and without limitation, incandescent lamps, fluorescent lamps, lasers, or light emitting diodes. The lamp assembly includes a light reflector or collimator 2019 for introducing a cone of light from the lamp into the light guide within a predetermined range of angles.

The light guide includes a set of geometrical extraction structures or deflectors 2017 which serve to re-direct light out of the light guide and along the vertical or z-axis of the display. The optical shapes or structures employed in deflectors 2017 can be any of those described with respect to FIGS. 4 through 9 without limitation. The density of deflectors 2017 varies with distance from the lamp 2018.

The rear-facing reflective layer 2024 is a metal layer or thin film deposited directly on to the outer surface of light guide 2016. Highly reflective metal layers can include fine-grained metal films without inclusions formed by a number of vapor deposition techniques including sputtering, evaporation, ion plating, laser ablation, or chemical vapor deposition. Metals that are effective for this reflective application include, without limitation, Al, Cr, Au, Ag, Cu, Ni, Ta, Ti, Nd, Nb, Si, Mo and/or alloys thereof. After deposition the metal layer 2024 can be patterned by any of a number of photolithography and etching techniques known in the microfabrication art to define the array of apertures 2008.

In another implementation, the reflective layer 2024 can be formed from a mirror, such as a dielectric mirror. A dielectric mirror is fabricated as a stack of dielectric thin films which alternate between materials of high and low refractive index.

A portion of the incident light is reflected from each interface where the refractive index changes. By controlling the thickness of the dielectric layers to some fixed fraction or multiple of the wavelength and by adding reflections from multiple parallel dielectric interfaces (in some cases more than 6), it is possible to produce a net reflective surface having a reflectivity exceeding 98%. Hybrid reflectors can also be employed, which include one or more dielectric layers in combination a metal reflective layer.

Also shown in FIG. 20, a transparent and low-index dielectric layer 2025 is positioned and deposited on the substrate of the light guide directly before and underneath the reflective aperture layer 2024. The refractive index of the layer 2025 is less than that of the underlying light guide so that a condition for total internal reflection exists at the interface between the light guide and the low-index layer 2025. Total internal reflection is a lossless method by which light rays from the lamp 2018 can be distributed throughout the breadth of the light guide 2016. In display assembly 1900 the function of the low-index layer is performed by an air-gap between the light guide 1916 and the (optional) diffusive film 1914, or in alternate implementations by an air gap between the light guide 1916 and the aperture plate 1922. In display assembly 2000 the low index layer 2025 can be formed from a porous material such as a silica aerogel or from low-molecular weight methyl-siloxanes, or from fluoropolymers, or from any combinations of the above.

The light guide 2016 can be fabricated from a combination of either glass or plastic materials. For the display assembly 2000 of FIG. 20, the light guide 2016 is constructed as a 2-piece composite. The bottom layer of the composite light guide, layer 2021, is formed from a plastic body or a plastic film which has been molded, stamped, or embossed to form the prisms or geometrical extraction structures 2019. The top layer of the composite light guide, layer 2023, is made from glass. The glass layer 2023 provides a smooth surface for the formation of both the low-index layer 2025 and the reflective aperture layer 2024. Glass can also withstand higher processing temperatures than plastic, which makes it suitable to form the layers 2025 and 2024 from a wide variety of different thin and thick film materials.

The two layers of the composite light guide 2016 are bonded by means of a thin and transparent index-matching adhesive or epoxy. A bonding adhesive is chosen with a refractive index intermediate between that of the plastic layer 2021 and glass layer 2023, so that reflections are avoided at the interface between the two halves of the light guide.

In other implementations both the bottom and top layers 2021 and 2023 of light guide 2016 are formed from plastic. In still other implementations the bottom and top layers 2021 and 2023 of light guide 2016 are both formed from glass. In still other implementations the light guide 2016 can be formed from a single piece of either glass or plastic.

The edges of the composite light guide 2016 are coated with a side-facing reflective film 2036. Reflective films such as films 2036 reduces light leakage in the optical cavity by preventing emission out from the sides of the light guide and returning such light back to the optical cavity.

The display assembly 2000 includes a front-facing reflective layer 2020, which is positioned behind the light guide 2016. In display assembly 2000 the back reflective layer 2020 is separated from the light guide by an air gap. The back reflective layer 2020 is oriented in a plane substantially parallel to that of the reflective aperture layer 2024.

The reflective layer 2024 defines a plurality of surface apertures 2008, each one located directly beneath the closed position of one of the shutters 2010 of shutter assemblies 2002. The composite light guide 2016 is supported a predetermined distance away from the shutter assemblies 2002, forming a gap 2026. The gap 2026, preferably less than 0.5 mm, is maintained by mechanical supports and/or by the epoxy seal 2028 which attaches the light guide 2016 to the substrate 2004.

The shutter assembly substrate 2004 forms the front of the display assembly 2000. An absorbing film 2006, disposed on the substrate 2004, defines a plurality of surface apertures 2030 located between the shutter assemblies 2002 and the substrate 2004. The film 2006 is designed to absorb ambient light and therefore increase the contrast of the display.

The epoxy 2028 should have a curing temperature preferably below about 200 C, it should have a coefficient of thermal expansion preferably below about 50 ppm per degree C. and should be moisture resistant. An exemplary epoxy 2028 is EPO-TEK B9022-1, sold by Epoxy Technology, Inc.

The epoxy seal 2028 seals in a working fluid 2032. The working fluid 2032 is engineered with viscosities preferably below about 10 centipoise, with relative dielectric constant preferably above about 2.0, with dielectric breakdown strengths above about $10^4$ V/cm, and with an index of refraction that matches closely to that of substrate 2016. The working fluid 2032 can also serve as a lubricant. Its mechanical and electrical properties are effective at reducing the voltage necessary for moving the shutter between open and closed positions. In one implementation, the working fluid 2032 has a low refractive index, preferably less than about 1.5. In another implementation the working fluid 2032 has a refractive index that matches that of the substrate 2004. Suitable working fluids 2032 include, without limitation, de-ionized water, methanol, ethanol, silicone oils, fluorinated silicone oils, dimethylsiloxane, polydimethylsiloxane, hexamethyldisiloxane, and diethylbenzene.

A sheet metal or molded plastic assembly bracket 2034 holds the shutter assemblies 2002, the substrate 2004, the light guide 2016, that back reflective layer 2020 and the other component parts together around the edges. The assembly bracket 2032 is fastened with screws or indent tabs to add rigidity to the combined display assembly 2000. In some implementations, the light source 2018 is molded in place by an epoxy potting compound.

Figure 21:
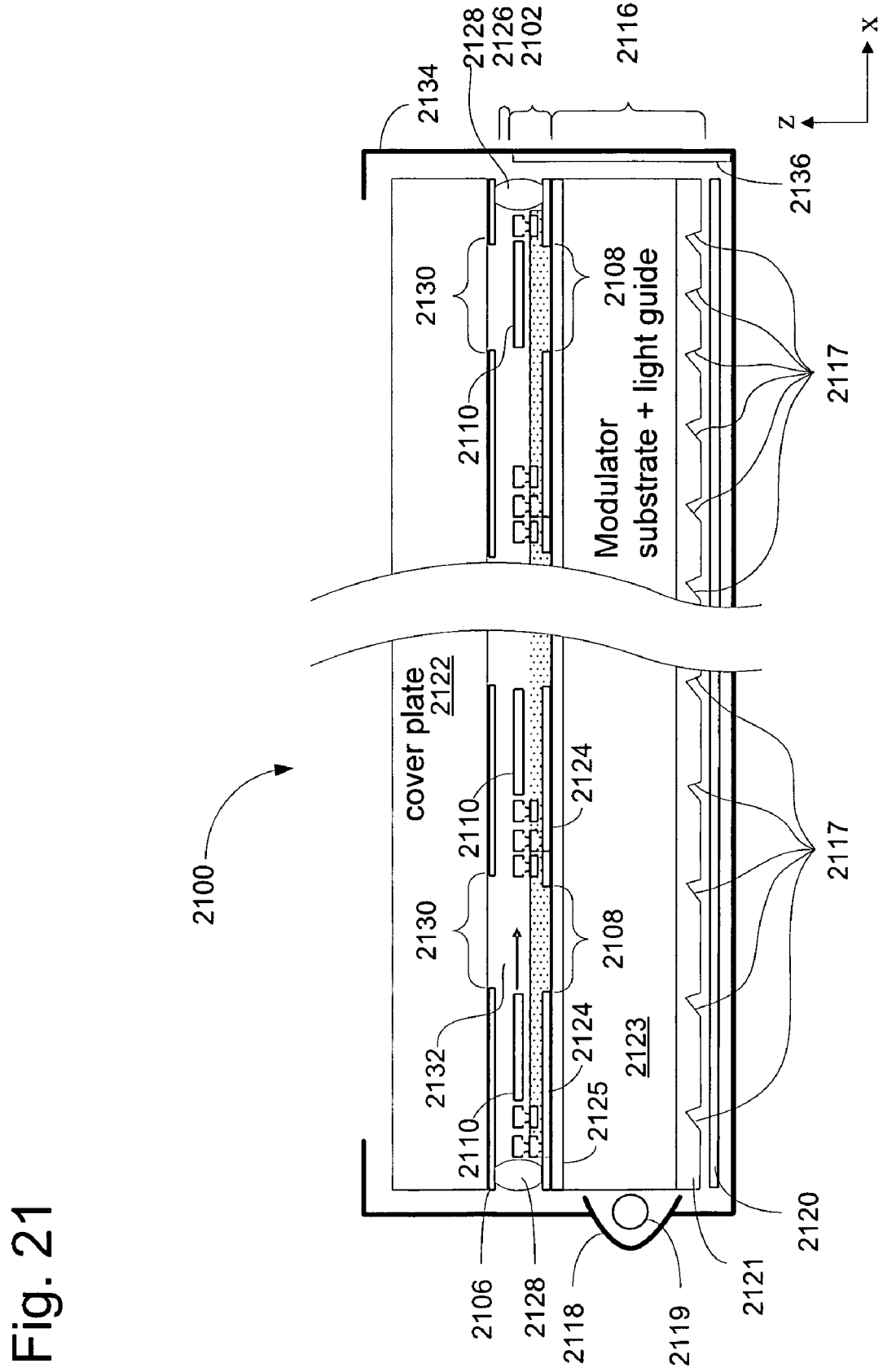
FIG. 21 is a cross sectional view of a display apparatus according to an illustrative embodiment of the invention.

FIG. 21 is a cross sectional view of a display assembly 2100, according to an illustrative embodiment of the invention. The display assembly 2100 features shutter assemblies 2102, a reflective aperture layer 2124, and a light guide 2116 all integrated onto the same substrate. The shutter assemblies 2102 are fabricated directly on top of the reflective aperture layer 2124, much as they were in display apparatus 201 and 251. The configurations of the shutter assemblies in displays 201, 251, and 2100 are referred to as MEMS-up configurations. The display assembly 2100 also includes a cover plate 2122 fabricated on a separate substrate and separated from the shutter assemblies 2102 by a gap.

Display assembly 2100 includes a light guide 2116, which is illuminated by one or more lamps 2118. The lamps 2118 can be, for example, and without limitation, incandescent lamps, fluorescent lamps, lasers, or light emitting diodes. The lamp assembly includes a light reflector or collimator 2119 for introducing a cone of light from the lamp into the light guide within a predetermined range of angles.

The light guide includes a set of geometrical extraction structures or deflectors 2117 which serve to re-direct light out of the light guide and along the vertical or z-axis of the display. The optical shapes or structures employed in deflectors 2117 can be any of those described with respect to FIGS.

4 through 9 without limitation. The density of deflectors 2117 varies with distance from the lamp 2118.

The rear-facing reflective layer 2124 is a metal layer or thin film deposited directly as part of the thin film structure on top of light guide 2116. Metal layers can include fine-grained metal films without inclusions formed by a number of vapor deposition techniques including sputtering, evaporation, ion plating, laser ablation, or chemical vapor deposition. Metals that are effective for this reflective application include, without limitation, Al, Cr, Au, Ag, Cu, Ni, Ta, Ti, Nd, Nb, Si, Mo and/or alloys thereof. After deposition the metal layer 2124 can be patterned by any of a number of photolithography and etching techniques known in the microfabrication art to define the array of apertures 2108.

In another implementation, the reflective layer 2124 can be formed from a mirror, such as a dielectric mirror. A dielectric mirror is fabricated as a stack of dielectric thin films which alternate between materials of high and low refractive index. A portion of the incident light is reflected from each interface where the refractive index changes. By controlling the thickness of the dielectric layers to some fixed fraction or multiple of the wavelength and by adding reflections from multiple parallel dielectric interfaces (in some cases more than 6), it is possible to produce a net reflective surface having a reflectivity exceeding 98%. Hybrid reflectors can also be employed, which include one or more dielectric layers in combination a metal reflective layer.

Also shown in FIG. 21, a transparent and low-index dielectric layer 2125 is positioned and deposited on the substrate of the light guide directly before and underneath the reflective aperture layer 2124. The refractive index of the layer 2125 is less than that of the underlying light guide so that a condition for total internal reflection exists at the interface between the light guide and the low-index layer 2125. Total internal reflection is a lossless method by which light rays from the lamp 2118 can be distributed throughout the breadth of the light guide 2116. In display assembly 1900 the function of the low-index layer is performed by an air-gap between the light guide 1916 and the (optional) diffusive film 1914, or in alternate implementations by an air gap between the light guide 1916 and the aperture plate 1922. In display assembly 2100 the low index layer 2125 can be formed from a porous material such as a silica aerogel or from low-molecular weight methyl-siloxanes, or from fluoropolymers, or from any combinations of the above.

The light guide 2116 can be fabricated from a combination of either glass or plastic materials. For the display assembly 2100 of FIG. 21, the light guide 2116 is constructed as a 2-piece composite. The bottom layer of the composite light guide, layer 2121, is formed from a plastic body or a plastic film which has been molded, stamped, or embossed to form the prisms or geometrical extraction structures 2119. The top layer of the composite light guide, layer 2123, is made from glass. The glass layer 2123 provides a smooth surface for the formation of both aperture layer 2124 and the shutter assemblies 2102. Glass can also withstand higher processing temperatures than plastic, which makes it suitable to form the layers 2124 and 2102 from a wide variety of different thin and thick film materials.

The two layers of the composite light guide 2116 are bonded by means of a thin and transparent index-matching adhesive or epoxy. A bonding adhesive is chosen with a refractive index intermediate between that of the plastic layer 2121 and glass layer 2123, so that reflections are avoided at the interface between the two halves of the light guide.

In other implementations the both the bottom and top layers 2121 and 2123 of light guide 2116 are formed from plastic. In still other implementations the bottom and top layers 2121 and 2123 of light guide 2116 are both formed from glass. In still other implementations the light guide 2116 can be formed from a single piece of either glass or plastic.

The display assembly 2100 includes a front-facing reflective layer 2120, which is positioned behind the light guide 2116. In display assembly 2100 the back reflective layer 2120 is separated from the light guide by an air gap. The back reflective layer 2120 is oriented in a plane substantially parallel to that of the reflective aperture layer 2124.

The reflective layer 2124 defines a plurality of surface apertures 2108, each one located directly beneath the closed position of one of the shutters 2110 of shutter assemblies 2102. A method for forming the reflective apertures 2108 as well as the shutter assemblies 2102 in sequential fashion on the same substrate has been disclosed in co-owned U.S. patent application Ser. No. 11/361,785, filed Feb. 23, 2006, incorporated herein by reference.

A cover plate 2122 forms the front of the display assembly 2100. The rear side of the cover plate 2122 can be covered with a black matrix 2124 to increase contrast. The cover plate 2122 is supported a predetermined distance away from the shutter assemblies 2102, forming a gap 2126. The gap 2126, preferably less than about 0.5 mm, is maintained by mechanical supports and/or by the epoxy seal 2128 which attaches the cover plate 2122 to the composite light guide 2116 containing shutter assemblies 2102.

The epoxy 2128 should have a curing temperature preferably below about 210 C, it should have a coefficient of thermal expansion preferably below about 50 ppm per degree C. and should be moisture resistant. An exemplary epoxy 2128 is EPO-TEK B9022-1, sold by Epoxy Technology, Inc.

The epoxy seal 2128 seals in a working fluid 2132. The working fluid 2132 is designed with specifications similar to and made from materials similar to working fluid 2032.

A sheet metal or molded plastic assembly bracket 2134 holds the shutter assemblies 2102, the composite light guide 2116, the cover plate 2122, and the back reflective layer 2121 together around the edges. The assembly bracket 2132 is fastened with screws or indent tabs to add rigidity to the combined display assembly 2100. In some implementations, the light source 2118 is molded in place by an epoxy potting compound.

The assembly bracket includes side-facing reflective films 2136 positioned close to the edges or sides of the composite light guide 2116. These reflective films reduce light leakage in the optical cavity by returning any light that is emitted out the sides of the light guide back into the optical cavity. The distance between the sides of the light guide and the side-facing reflective films is preferably less than about 0.5 mm, more preferably less than 0.1 mm.

The invention may be embodied in other specific forms without departing form the spirit or essential characteristics thereof. The forgoing embodiments are therefore to be considered in all respects illustrative, rather than limiting of the invention.

What is claimed is:
1. A display comprising:
an array of light modulators defining a display surface;
a light guide having front and rear surfaces and a plurality of geometric light redirectors formed therein;
a rear-facing reflective layer, positioned proximate to the display surface, wherein the rear-facing reflective surface has a plurality of apertures formed therein;
a front-facing reflective layer positioned proximate the rear surface of the light guide; and a light injection system including a lamp and a light collimator for introducing a non-random fraction of light output by the lamp into the light guide as collimated light within a predetermined range of angles.

2. The display of claim 1, wherein the array of light modulators comprises a plurality of MEMs-based light modulators for selectively allowing light passing through the plurality of apertures in the rear-facing reflective layer to contribute to the formation of an image.

3. The display of claim 1, wherein at least 50% of the rear surface of the light guide is substantially parallel to the display surface.

4. The display of claim 1, wherein the rear-facing reflective layer comprises a dielectric mirror.

5. The display of claim 1, wherein the rear-facing reflective layer comprises a metal layer.

6. The display of claim 1, comprising a refractive layer, having a refractive index less than that of a refractive index of the light guide, disposed between the rear-facing reflective layer and the front surface of the light guide.

7. The display of claim 1, wherein the plurality of geometric light redirectors comprise substantially smooth reflective surfaces.

8. The display of claim 1, comprising a prismatic turning film positioned between the light guide and the rear-facing reflective layer.

9. The display of claim 1, comprising a brightness enhancement film positioned between the light guide and the rear-facing reflective layer.

10. The display of claim 1, comprising a side-facing reflective layer positioned proximate to a side of the light guide.

11. The display of claim 1, wherein the plurality of geometric light redirectors comprise prismatic light redirectors.

12. A display comprising:
an array of light modulators defining a display surface;
a light guide having front and rear surfaces and a plurality of geometric light redirectors formed therein;
a rear-facing reflective layer, positioned proximate to the display surface, wherein the rear-facing reflective surface has a plurality of apertures formed therein; and
a front-facing reflective layer positioned proximate the rear surface of the light guide, wherein at least 50% of light reflecting off of the rear-facing reflective layer within 40 degrees of an axis perpendicular to the display surface is redirected back towards the rear-facing reflective layer within 40 degrees of the axis.

13. The display of claim 12, wherein at least 50% of light reflecting off of the rear-facing reflective layer within 30 degrees of an axis perpendicular to the display surface is redirected back towards the rear-facing reflective layer within 30 degrees of the axis.

14. The display of claim 12, wherein at least 50% of light reflecting off of the rear-facing reflective layer within 20 degrees of an axis perpendicular to the display surface is redirected back towards the rear-facing reflective layer within 20 degrees of the axis.

15. The display of claim 12, wherein at least 70% of light reflecting off of the rear-facing reflective layer within 40 degrees of an axis perpendicular to the display surface is redirected back towards the rear-facing reflective layer within 40 degrees of the axis.

16. The display of claim 12, wherein at least 70% of light reflecting off of the rear-facing reflective layer within 30 degrees of an axis perpendicular to the display surface is redirected back towards the rear-facing reflective layer within 30 degrees of the axis.

17. The display of claim 12, wherein the array of light modulators has a light modulator pitch, and the distance between the rear-facing reflective surface and the display surface is less than the light modulator pitch.

18. The display of claim 12, wherein the array of light modulators is formed on a substrate, and the distance between the rear-facing reflective layer and the display surface is less than the thickness of the substrate.

19. The display of claim 12, wherein the array of light modulators comprises a plurality of MEMs-based light modulators for selectively allowing light passing through the plurality of apertures in the rear-facing reflective layer to contribute to the formation of an image.

20. The display of claim 12, wherein the rear-facing reflective layer comprises a dielectric mirror.

21. The display of claim 12, wherein the rear-facing reflective layer comprises a metal layer.

22. The display of claim 12, comprising a refractive layer, having a refractive index less than that of a refractive index of the light guide, disposed between the rear-facing reflective layer and the front surface of the light guide.

23. The display of claim 12, wherein the light guide comprises a composite of at least first and second layers.

24. The display of claim 23, wherein the first layer of the light guide comprises one of glass and plastic.

25. The display of claim 23, wherein the second layer of the light guide comprises one of glass and plastic.

26. The display of claim 12, wherein the plurality of geometric light redirectors comprise substantially smooth reflective surfaces.

27. The display of claim 12, wherein the rear-facing and front-facing reflective layers comprise specular reflective layers.

28. The display of claim 12, wherein at least one of the front-facing and rear-facing reflective layers comprise substantially diffusive reflective material.

29. The display of claim 12, comprising a light injection system including a lamp and a light collimator for introducing a non-random fraction of light output by the lamp into the light guide as collimated light within a predetermined range of angles.

30. The display of claim 12, comprising a prismatic turning film positioned between the light guide and the rear-facing reflective layer.

31. The display of claim 12, comprising a brightness enhancement film positioned between the light guide and the rear-facing reflective layer.

32. The display of claim 12, comprising a side-facing reflective layer positioned proximate to a side of the light guide.

33. The display of claim 12, wherein the plurality of geometric light redirectors comprise prismatic light redirectors.

34. The display of claim 33, wherein the prismatic light directors have a first surface facing a lamp and a second surface facing away from the lamp, wherein the area of the footprint of the first surface projected onto the front-facing reflective surface is greater than the area of the footprint of the second surface projected onto the front-facing reflective surface.

35. The display of claim 33, wherein the prismatic light directors have a first surface facing a lamp and a second surface facing away from the lamp, wherein the area of the footprint of the first surface projected onto the front-facing reflective surface is substantially equal to the area of the footprint of the second surface projected onto the front-facing reflective surface.

36. The display of claim 12, wherein the plurality of geometric light redirectors comprise refractive light redirectors.

37. A display comprising:
an array of light modulators defining a display surface;
a light guide having front and rear surfaces and a plurality of geometric light redirectors formed therein;
a rear-facing reflective layer, positioned proximate to the display surface, wherein the rear-facing reflective surface has a plurality of apertures formed therein; and
a front-facing reflective layer positioned proximate the rear surface of the light guide,
wherein the plurality of geometric light redirectors comprise prismatic light redirectors, and wherein the prismatic light redirectors have a first surface facing a lamp and a second surface facing away from the lamp, wherein the area of the footprint of the first surface projected onto the front-facing reflective surface is greater than the area of the footprint of the second surface projected onto the front-facing reflective surface.

38. The display of claim 37, wherein the array of light modulators comprises a plurality of MEMs-based light modulators for selectively allowing light passing through the plurality of apertures in the rear-facing reflective layer to contribute to the formation of an image.

39. The display of claim 37, wherein at least 50% of the rear surface of the light guide is substantially parallel to the display surface.

40. The display of claim 37, wherein at least 70% of the rear surface of the light guide is substantially parallel to the display surface.

41. The display of claim 37, wherein at least 90% of the rear surface of the light guide is substantially parallel to the display surface.

42. The display of claim 37, comprising a refractive layer, having a refractive index less than that of a refractive index of the light guide, disposed between the rear-facing reflective layer and the front surface of the light guide.

43. The display of claim 37, wherein the plurality of geometric light redirectors comprise substantially smooth reflective surfaces.

44. The display of claim 37, comprising a light injection system including a lamp and a light collimator for introducing a non-random fraction of light output by the lamp into the light guide as collimated light within a predetermined range of angles.

45. The display of claim 37, comprising a prismatic turning film positioned between the light guide and the rear-facing reflective layer.

46. The display of claim 37, comprising a brightness enhancement film positioned between the light guide and the rear-facing reflective layer.

47. The display of claim 37, comprising a side-facing reflective layer positioned proximate to a side of the light guide.

48. The display of claim 37, wherein the plurality of geometric light redirectors comprise prismatic light redirectors.

49. A display comprising:
an array of light modulators defining a display surface;
a light guide having front and rear surfaces and a plurality of geometric light redirectors formed therein;
a rear-facing reflective layer, positioned proximate to the display surface, wherein the rear-facing reflective surface has a plurality of apertures formed therein; and
a front-facing reflective layer positioned proximate the rear surface of the light guide, wherein the array of light modulators has a light modulator pitch, and the distance between the rear-facing reflective surface and the display surface is less than the light modulator pitch.

50. The display of claim 49, wherein the array of light modulators comprises a plurality of MEMs-based light modulators for selectively allowing light passing through the plurality of apertures in the rear-facing reflective layer to contribute to the formation of an image.

51. The display of claim 49, wherein the rear-facing reflective layer comprises a dielectric mirror.

52. The display of claim 49, wherein the rear-facing reflective layer comprises a metal layer.

53. The display of claim 49, wherein the plurality of geometric light redirectors comprise substantially smooth reflective surfaces.

54. The display of claim 49, wherein the plurality of geometric light redirectors comprise prismatic light redirectors.

55. The display of claim 49, wherein each aperture in the plurality of apertures allows a flux of light to pass through the aperture, and wherein the association between a respective aperture and a respective at least one light modulators comprises a relationship in which substantially the entire flux of light allowed to pass through the respective aperture is modulated by the respective at least one light modulator.

56. A display comprising:
an array of light modulators defining a display surface;
a light guide having front and rear surfaces and a plurality of geometric light redirectors formed therein;
a rear-facing reflective layer, positioned proximate to the display surface, wherein the rear-facing reflective surface has a plurality of apertures formed therein; and
a front-facing reflective layer positioned proximate the rear surface of the light guide, wherein the rear-facing and front-facing reflective layers comprise specular reflective layers.

57. A display comprising:
an array of light modulators defining a display surface;
a light guide having front and rear surfaces and a plurality of geometric light redirectors formed therein;
a rear-facing reflective layer, positioned proximate to the display surface, wherein the rear-facing reflective surface has a plurality of apertures formed therein;
a front-facing reflective layer positioned proximate the rear surface of the light guide, and
a refractive layer, having a refractive index less than that of a refractive index of the light guide, disposed between the rear-facing reflective layer and the front surface of the light guide.

* * * * *